(12) United States Patent
Levite

(10) Patent No.: US 12,455,279 B2
(45) Date of Patent: Oct. 28, 2025

(54) PERSONALIZED IMMUNOTHERAPY FOR REJUVENATING ACTIVATING AND STRENGTHENING EXHAUSTED AND DYSFUNCTIONAL T CELLS, REDUCING PD-1, AND IMPROVING IMMUNE FUNCTION

(71) Applicant: Mia Levite, Savyon (IL)

(72) Inventor: Mia Levite, Savyon (IL)

( * ) Notice: Subject to any disclaimer, the term of this patent is extended or adjusted under 35 U.S.C. 154(b) by 1279 days.

(21) Appl. No.: 17/424,499

(22) PCT Filed: Jan. 24, 2019

(86) PCT No.: PCT/IL2019/050104
§ 371 (c)(1),
(2) Date: Jul. 21, 2021

(87) PCT Pub. No.: WO2019/145956
PCT Pub. Date: Aug. 1, 2019

(65) Prior Publication Data
US 2022/0072042 A1    Mar. 10, 2022

Related U.S. Application Data

(60) Provisional application No. 62/621,805, filed on Jan. 25, 2018.

(51) Int. Cl.
*A61K 40/42* (2025.01)
*A61K 40/11* (2025.01)
*G01N 33/50* (2006.01)

(52) U.S. Cl.
CPC .......... *G01N 33/5047* (2013.01); *A61K 40/11* (2025.01); *A61K 40/42* (2025.01); *A61K 2239/53* (2023.05)

(58) Field of Classification Search
None
See application file for complete search history.

(56) References Cited

U.S. PATENT DOCUMENTS

| | | | |
|---|---|---|---|
| 4,666,828 A | 5/1987 | Gusella | |
| 4,683,202 A | 7/1987 | Mullis | |
| 4,801,531 A | 1/1989 | Frossard | |
| 5,192,659 A | 3/1993 | Simons | |
| 5,272,057 A | 12/1993 | Smulson et al. | |
| 2014/0065096 A1 | 3/2014 | Ichim et al. | |
| 2020/0179451 A1 | 6/2020 | Rosen et al. | |

FOREIGN PATENT DOCUMENTS

| WO | WO 2003/037247 A2 | 5/2003 |
|---|---|---|
| WO | WO 2006/111967 A2 | 10/2006 |
| WO | WO 2007/019266 A2 | 2/2007 |
| WO | WO 2007/019267 A1 | 2/2007 |
| WO | WO 2015/104711 A1 | 7/2015 |
| WO | WO 2017/066561 A2 | 4/2017 |
| WO | WO 2017/127755 A1 | 7/2017 |
| WO | WO 2018/049025 A2 | 3/2018 |
| WO | WO 2019/018603 A2 | 1/2019 |

OTHER PUBLICATIONS

Saussez et al. Towards Neuroimmunotherapy for Cancer: the Neurotransmitters Glutamate, Dopamine and GnRH-II augment substantially the ability of T cells of few Head and Neck cancer patients to perform spontaneous migration, chemotactic. J Neural Transm (2014) 121:1007-1027.*
Simon et al. PD-1 expression on tumor-specific T cells: Friend or foe for immunotherapy? Oncoimmunology. Sep. 14, 2017;7(1): e1364828. doi: 10.1080/2162402X.2017.1364828. eCollection 2017.*
Chen et al. "Programmed cell death protein-1/programmed death-ligand 1 blockade enhances the antitumor efficacy of adoptive cell therapy against non-small cell lung cancer" Journal of thoracic disease. Dec. 2018;10(12):6711.
International Search Report for PCT Application No. PCT/IL2019/050104 dated Jul. 9, 2019.
Levite M. "Neurotransmitters activate T-cells and elicit crucial functions via neurotransmitter receptors" Current opinion in pharmacology. Aug. 1, 2008;8(4):460-71.
Levite M, editor "Nerve-driven immunity: Neurotransmitters and neuropeptides in the immune system" Book Chapter: Dopamine in the Immune System. Springer Science & Business Media; Feb. 16, 2012.

(Continued)

*Primary Examiner* — Nianxiang Zou
(74) *Attorney, Agent, or Firm* — FISHERBROYLES, LLP; Roger L. Browdy

(57) ABSTRACT

Methods of adoptive NeuroImmunotherapy, selecting a subject suitable for adoptive NeuroImmunotherapy, selecting a molecule or combination of molecules for improving therapeutic immune cell potential, and decreasing PD-1 expression on a surface of an immune cell, comprising contacting immune cells with at least one molecule selected from a neurotransmitter or analog thereof, a neuropeptide or analog thereof, or a modulator of a voltage gated ion channel are provided. Kits comprising at least one of those molecules or comprising at least two of those molecules and optionally a PD-1 detecting agent are also provided.

13 Claims, 21 Drawing Sheets

(56) References Cited

OTHER PUBLICATIONS

Saussez et al. "Towards neuroimmunotherapy for cancer: the neurotransmitters glutamate, dopamine and GnRH-II augment substantially the ability of T cells of few head and neck cancer patients to perform spontaneous migration, chemotactic migration and migration towards the autologous tumor, and also elevate markedly the expression of CD3zeta and CDSepsilon TCR-associated chains" Journal of Neural Transmission. Aug. 2014;121(8):1007-27.

Levite M., et al., "Extracellular K1 And Opening of Voltage-gated Potassium Channels Activate T Cell Integrin Function: Physical and Functional Association Between Kv1.3 Channels and b1 Integrins," Journal of Experimental Medicine, The Rockefeller University Press, Apr. 3, 2000, vol. 191(7), pp. 1167-1176.

* cited by examiner

Figure 5G

| T cells | Origin of serum/plasma (heat inctivated) in the medium (60hr 37C) | Total number of T cells | No of small live T cells | % change in small live T cells | No of big live T cells | % change in big T cells |
|---|---|---|---|---|---|---|
| Resting CD3+ normal human T cells of Healthy Ind. 1 Blood type A+ | Fetal Calf Serum<br><br><br>AVERAGE<br>SD | 14130<br>18045<br>17265<br>16480<br>1692 | 5238<br>6701<br>6472<br>6137<br>643 | | 8047<br>10563<br>9894<br>9501<br>1064 | |
| Resting CD3+ normal human T cells of Healthy Ind. 1 Blood type A+ | Human plasma of Healthy Ind. 1 - Blood type A+ i.e. Syngeneic healthy human plasma<br>AVERAGE<br>SD | 15315<br>14430<br>14460<br>14735<br>410 | 6389<br>5665<br>5671<br>5908<br>340 | %<br>Reduction<br>3.7 | 7680<br>7575<br>7623<br>7626<br>43 | %<br>Reduction<br>19.7 |
| Resting CD3+ normal human T cells of Healthy Ind. 1 Blood type A+ | Human plasma of Healthy Ind. 2 - Blood type O+ i.e. Allogeneic healthy human plasma<br>AVERAGE<br>SD | 14040<br>14490<br>13740<br>14090<br>308 | 5323<br>5378<br>5103<br>5213<br>110 | %-<br>Reduction<br>15.1 | 7740<br>8045<br>7579<br>7660<br>81 | %-<br>Reduction<br>19.4 |
| Resting CD3+ normal human T cells of Healthy Ind. 1 Blood type A+ | Human plasma of Healthy Ind. 2 - Blood type B+ i.e. Allogeneic healthy human plasma<br>AVERAGE<br>SD | 13485<br>14445<br>15090<br>14340<br>659 | 4806<br>5029<br>5481<br>5105<br>281 | %<br>Reduction<br>16.8 | 7599<br>8285<br>8479<br>8121<br>378 | %<br>Reduction<br>14.5 |
| Resting CD3+ normal human T cells of Healthy Ind. 1 Blood type A+ | Human plasma of Liver cancer patient 1, L.F. i.e. Allogeneic human plasma of liver cancer patient<br>AVERAGE<br>SD | 10871<br>11565<br>11820<br>11419<br>401 | 5316<br>5437<br>5709<br>5487<br>164 | %<br>Reduction<br>10.6 | 4636<br>5186<br>5205<br>5009<br>264 | %<br>Reduction<br>47.3 |

Figure 5G continued

| T cells | Origin of serum/plasma (heat inctivated) in the medium (60hr 37C) | Total number of T cells | No of small live T cells | % change in small live T cells | No of big live T cells | % change in big T cells |
|---|---|---|---|---|---|---|
| Resting CD3+ | Human plasma of Liver cancer patient 2, A.G. | 15000 | 6780 | | 6884 | |
| normal human | i.e. Allogeneic human plasma | 13020 | 6001 | %- | 5947 | -% |
| T cells of | of liver cancer patient | 14940 | 6967 | Reduction | 6681 | Reduction |
| Healthy Ind. 1 | AVERAGE | 14970 | 6583 | -7.3 | 6504 | 31.5 |
| Blood type A+ | SD | 920 | 418 | | 402 | |
| Resting CD3+ | Human plasma of Liver cancer patient 3, B.S. | 14940 | 6038 | | 7929 | |
| normal human | i.e. Allogeneic human plasma | 15420 | 6145 | % | 8148 | % |
| T cells of | of liver cancer patient | 15435 | 6290 | Reduction | 8122 | Reduction |
| Healthy Ind. 1 | AVERAGE | 15265 | 6158 | -0.3 | 8066 | 15.1 |
| Blood type A+ | SD | 230 | 103 | | 98 | |

| T cells | Origin of serum/plasma (heat inactivated) in the medium (60hr 37C) | Total number of T cells | No of small live T cells | % reduction in small live T cells | No of big live T cells | % reduction in big live T cells | Significance of reduction |
|---|---|---|---|---|---|---|---|
| Resting CD3+ normal human T cells of Healthy Ind. 1 Blood type A+ | Fetal Calf Serum | 16650<br>17880<br>17760 | 12653<br>13782<br>13837 | | 3419<br>3647<br>3603 | | |
| | AVERAGE | 17430 | 13424 | | 3556 | | |
| | SD | 554 | 546 | | 99 | | |
| Resting CD3+ normal human T cells of Healthy Ind. 1 Blood type A+ | Human plasma of Healthy Ind. 1 - Blood type A+ i.e. Syngeneic healthy human plasma | 11685<br>13110<br>12705 | 8951<br>8723<br>10123 | | 2450<br>4090<br>2295 | | |
| | AVERAGE | 12500 | 9266 | 31.0% | 2945 | 17.2 | |
| | SD | 600 | 613 | | 812.1 | | |
| Resting CD3+ normal human T cells of Healthy Ind. 1 Blood type A+ | Human plasma of Healthy Ind. 2 - Blood type O+ i.e. Allogeneic healthy human plasma | 13710<br>13650<br>13985 | 9743<br>8487<br>9972 | | 3669<br>4898<br>3672 | | |
| | AVERAGE | 13782 | 9858 | 26.6% | 3671 | -3.2% | |
| | SD | 146 | 115 | | 578.7 | | |
| Resting CD3+ normal human T cells of Healthy Ind. 1 Blood type A+ | Human plasma of Healthy Ind. 3 - Blood type B+ i.e. Allogeneic healthy human plasma | 12705<br>11370<br>12630 | 7940<br>6600<br>8057 | | 4467<br>4531<br>4289 | | |
| | AVERAGE | 12235 | 7532 | 43.9% | 4429 | -24.5% | 0.014 |
| | SD | 612 | 661 | | 102.4 | | |

Figure 5H

| T cells | Origin of serum/plasma (heat inactivated) in the medium (60hr 37C) | Total number of T cells | No of small live T cells | % reduction in small live T cells | No of big live T cells | % reduction in big live T cells | Significance of reduction |
|---|---|---|---|---|---|---|---|
| Resting CD3+ normal human T cells of Healthy Ind. 1 Blood type A+ | Human plasma of Liver cancer patient 1, L.F. i.e. Allogeneic human plasma of liver cancer patient | 10770 | 9204 | | 1296 | | |
| | | 9300 | 7654 | | 1417 | | |
| | | 9450 | 8297 | | 902 | | |
| | AVERAGE | 9840 | 8385 | 37.5% | 1205 | 66.1% | 0.006 |
| | SD | 660 | 636 | | 219.9 | | |
| Resting CD3+ normal human T cells of Healthy Ind. 1 Blood type A+ | Human plasma of Liver cancer patient 2, A.G. i.e. Allogeneic human plasma of liver cancer patient | 14625 | 12505 | | 1713 | | |
| | | 13245 | 10602 | | 2275 | | |
| | | 12225 | 10715 | | 1180 | | |
| | AVERAGE | 13425 | 11274 | 16.0% | 1722.7 | 51.6% | 0.027 |
| | SD | 983 | 872 | | 447.1 | | |
| Resting CD3+ normal human T cells of Healthy Ind. 1 Blood type A+ | Human plasma of Liver cancer patient . 3 B.S. i.e. Allogeneic human plasma of liver cancer patient | 16365 | 14769 | | 1202 | | |
| | | 15195 | 13328 | | 1535 | | |
| | | 16185 | 14771 | | 1049 | | |
| | AVERAGE | 15915 | 14289 | -6.4% | 1262 | 64.5% | 0.003 |
| | SD | 514 | 680 | | 202.9 | | |

Figure 5H continued

PERSONALIZED IMMUNOTHERAPY FOR REJUVENATING ACTIVATING AND STRENGTHENING EXHAUSTED AND DYSFUNCTIONAL T CELLS, REDUCING PD-1, AND IMPROVING IMMUNE FUNCTION

CROSS REFERENCE TO RELATED APPLICATIONS

This application claims the benefit of priority of U.S. Provisional Patent Application No. 62/621,805, filed Jan. 25, 2018, the contents of which are all incorporated herein by reference in their entirety.

FIELD OF INVENTION

The present invention is directed to the field of immunotherapy.

BACKGROUND OF THE INVENTION

T cells are crucially needed for proper ongoing body function, and for overcoming numerous diseases and other pathological conditions of various different types, among them: cancer, infectious diseases, autoimmune diseases, degenerative diseases, immunodeficiency diseases, metabolic diseases, genetic diseases, injures and wounds, and others. T cells are especially important for recognition and eradication of cancer and infectious agents.

Yet, in many pathologies, the crucially needed T cells are in suboptimal condition, due to suboptimal number, or suboptimal function, caused by various different factors.

In all these conditions, improving beneficial T cell function, especially in a safe, painless and physiological manner and whenever needed, is a huge desired clinical goal, which, if successful, can help overcome the disease, injury or wound, and as such be lifesaving, or at least turn the disease into a less severe and manageable one, and by so doing improve the quality of life of the patient.

Increasing beneficial T cell function in cancer patients is especially important, since in cancer patients, the badly needed T cells work insufficiently, 'allowing' cancer to propagate and metastasize, due to multiple detrimental effects imposed on the T cells by all of the following: the cancer cells (secreting factors hostile to T cells), stress, anxiety, sleep impairments and various infections. In addition, various materials and procedures used for therapeutic destruction of the cancer cells, also have undesired detrimental effects on the beneficial T cells, among them: molecules used for chemotherapy, various other drugs, radiation, surgery and others. Furthermore, the patient's tumor-specific T cells are exhausted due to continuous/chronic exposure to tumor antigens, whose quantity/load increases when cancer cells proliferate. This continuous T cell activation by tumor antigens causes T cell death, by "Activation Induced Cell Death (AICD)". Additionally, CD3zeta expression in T cells has been reported to be markedly down-regulated in many types of human cancers, among them: head and neck cancer, melanoma, ovarian cancer, prostate cancer, cervical cancer, renal-cell carcinoma, hepatic colorectal carcinoma metastases, colorectal cancer, and other miscellaneous tumors. Importantly, CD3zeta loss is considered a key defect in T cells of cancer patients, as it impairs their ability to eradicate the cancer.

Adoptive immune-cell therapy, called generally adoptive immunotherapy, is one of the major avenues of cancer therapy that is currently under scientific and clinical investigation, and is in its first steps of clinical use. There are various different modes of adoptive immunotherapy, differing from one another by many parameters, among them: 1) the type of cancer the immunotherapy is focused on, targeted to or restricted to; 2) the type of immune cells purified from the patients and then manipulated in vitro for subsequent therapeutic use; 3) the precise in vitro procedure and reagents being used for augmenting the therapeutic potential of the patient's immune cells; 4) the length of "in vitro parking"—the time required for the in vitro manipulation and expansion of the immune cells for augmenting their therapeutic potential and number; 5) the pre-immunotherapy treatment that the cancer patient has to undergo, before the therapeutic immune cells can be injected into his body, 6) the supporting post-immunotherapy treatment that the cancer patient has to undergo, after therapeutic immune cells were injected into his body, for allowing them to function better and for longer time periods in the patient's body, 7) the number of therapeutic immune cells injected to the patient, 8) the number of times the therapeutic cells are injected to the patient, and the frequency between the injections, 9) whether the therapeutic cells are injected together with or in between other therapeutic molecules or procedures, being given to or performed on the patient.

In most instances of adoptive immunotherapy, the in vitro manipulations and culturing of the immune cells, primarily T cells, is not exclusively for increasing their number. Rather, the in vitro manipulations of the patient's T cells, such as genetic engineering or others, are used for enhancing their ability to recognize and eradicate cancer cells, by endowing the cells with abilities they did not have before. Most types of T cell-mediated adoptive immunotherapies require classical activation of the T cells via their T cell receptor (TCR) for the manipulation itself, and then expansion of the manipulated T cells, to obtain sufficiently high number of therapeutic T for injection into the patient.

In some modes of T cell mediated immunotherapy, a specific subset of T cells, e.g. cytotoxic CD8+ T cells, are selected. In still others, the cells in culture are treated by artificial non-physiological reagents and procedures so as to improve their functionality.

Patients suffering from cancer often have an impaired immune response toward the cancer. This can be due to a weakened immune system or due to the tumor evading immune surveillance. Many tumors are known to express high levels of PD-Li, a ligand for the programmed cell death—1 (PD-1) protein found on the surface of cytotoxic immune cells. In general, all the adoptive immune-cell therapies aim to improving the function of the immune cells, so that when administered to the host they can initiate a beneficial immune response against the tumor.

One form of suggested adoptive immune-cell therapy, not yet tested in clinical settings, involves administering a neurotransmitter or a neuropeptide to the immune cells while they are in in vitro tissue culture. Neurotransmitters are chemical messengers of very small size (about the size of one amino acid) that coordinate the transmission of signals, from one neural cell (primarily neurons), to another brain cell. Neurotransmitters also have very potent and important effects on T cells and other immune cells. In addition, neurotransmitters have strong effects on a kaleidoscope of other bodily cells and systems. All the neurotransmitters induce their specific effects by binding to their highly specific neurotransmitter receptors expressed on the cell surface of their target cells. Neuropeptides, also sometimes called neurohormones, are larger peptidergic neurotransmitters. Neuropeptides have also numerous highly potent and important effects. Various single neurotransmitters and neuropeptides have been shown to induce de novo, and/or improve T cell function by increasing T cell's zeta-chain expression, chemotactic and spontaneous migration, adhesion, cytokine secretion and additional features and functions. However, a difficulty still exists in knowing which neurotransmitters and neuropeptides would best improve immune cell function of a given patient. Since individuals vary in the magnitude/level of expression of specific neurotransmitter's receptors and their responses to specific neurotransmitters. Further, it is not known which patients are best suited for this therapy, or when is a good time and condition to augment the cells of certain individuals by neurotransmitters and/or neuropeptides. Last, though it is known that neurotransmitters and neuropeptides can induce and/or augment T cell function, other ways in which the evasion of immune surveillance can be overcome are not. Methods of inducing and/or improving immune cell function and therapeutic potential, as well as selecting patients for neurotransmitter/neuropeptide-induced adoptive immune cell therapy, called adoptive NeuroImmunotherapy and selecting the neurotransmitter, neuropeptides or combinations thereof to be used, is greatly needed.

SUMMARY OF THE INVENTION

The present invention provides methods of adoptive NeuroImmunotherapy for any disease, injury, or wound in which improved immune cells in general, and T cells in particular, can be therapeutic and beneficial to the patient; methods for selecting a subject suitable for NeuroImmunotherapy, selecting a molecule or combination of molecules for improving therapeutic immune cell potential, and decreasing PD-1 expression on a surface of an immune cell, comprising contacting immune cells with at least one molecule selected from a neurotransmitter or analog thereof, a neuropeptide or analog thereof, or a modulator of a voltage gated ion channel. Kits comprising at least one of those molecules or comprising at least two of those molecules and optionally a PD-1 detecting agent for testing and selecting to which molecule or combinations of molecules a patient's T cells respond best are also provided.

The present invention is based, in part, on the surprising finding that neurotransmitters, neuropeptides and modulators of voltage gated ion channels can decrease the expression of PD-1 on the surface of immune cells, thus increasing their ability to function beneficially, and improving their therapeutic effectiveness. Further, PD-1 expression, after in vitro treatment of a subject's immune cells with these molecules, is a useful readout for determining if a subject is suitable for improved immunotherapy, and the timing of the therapy, and for selecting a molecule or combinations of molecules to use in that therapy.

The methods of the invention are effective in decreasing PD-1 in T cells, increasing the immunotherapeutic potential of immune cells, improving a patient's pathological condition, improving pre-selection of molecules and/or combinations of molecules that induce such effects and selecting candidate patients responsive to such methods, and the timing of therapy, i.e. when the patient's T cells are responsive to the molecules or combinations of molecules.

The methods of the invention use either the patient's own T cells, or T cells of a different source that would be advantageous to the patient, or immune cells other than T cells that can be made/become therapeutic by using the methods as used for T cells. The T cells, or other immune cells are incubated with at least one molecule selected from a neurotransmitter or analog thereof, a neuropeptide or analog thereof, or a modulator of a voltage gated ion channel.

The method can comprise two stages. The first stage is a diagnostic phase, that reveals the best molecules of those tested, and/or their combinations which decrease PD-1 and subsequently increase T cells function and their immunotherapy potential. The second stage is a therapeutic stage, that translates the diagnostic results into practical treatment. Thus, the therapeutic protocol is dependent on, and designed according to, the diagnostic results. The diagnostic phase teaches with which molecules it is advantages to incubate/treat the T cells in vitro, and which types of treated T cells should be later injected to the patient. The diagnostic phase can also be performed several times, at different time points and conditions, and only when the patient's T cells will be responsive to the tested molecules the patient would continue to the therapeutic stage.

Response of the T cells to the molecule/s in vitro, in the diagnostic stage, determines: 1) whether a subject can benefit from, and therefore should be treated with, the adoptive NeuroImmunotherapy at the time the diagnosis is performed; 2) which of the tested molecule/s or their combinations, should be used to treat/augment the T cells and thereby increase their immunotherapy potential; and 3) which types of treated T cells should be ultimately injected to the patient. The therapeutic method can be employed repeatedly, at any desired frequency and overall treatment period. The therapeutic method can be used for treating various types of diseases and injuries in any stage of the disease, or injury or wound, either as a sole treatment, or in between or ever simultaneously with other treatments. The method of inducing or improving T cell's features and functions and their therapeutic potential can be used for improving any T cells or other immune cell, for any scientific, medical and/or commercial purpose.

According to a first aspect, there is provided a method of adoptive NeuroImmunotherapy in a subject in need thereof, the method comprising:
  a. providing a first immune cell;
  b. contacting the first immune cell with at least one molecule selected from a neurotransmitter or analog thereof, a neuropeptide or analog thereof, and a modulator of a voltage gated ion channel;
  c. measuring at least one of:
     i. Programmed Cell Death 1 (PD-1) expression level or functional level in the immune cell;
     ii. proliferation of the immune cell in coculture with a cancerous cell; and
     iii. cell death of cancerous cells in coculture with the immune cell;
  d. providing a second immune cell whose origin is the same as the first immune cell;
  e. contacting the second immune cell with the at least one molecule wherein the at least one molecule decreased PD-1 expression or function in the first immune cell, increased proliferation of the first immune cell, increased cancerous cell death in coculture with the first immune cell or a combination thereof; and
  f. administering the contacted second immune cell to the subject;
  thereby performing adoptive NeuroImmunotherapy in the subject in need thereof.

According to another aspect, there is provided a method of adoptive NeuroImmunotherapy in a subject in need thereof, the method comprising:

a. providing a first immune cell;
b. contacting the first immune cell with at least two molecules selected from a neurotransmitter or analog thereof, and a neuropeptide or analog thereof, or at least one modulator of a voltage gated ion channel;
c. measuring at least one of:
  i. PD-1 expression level or functional level in the immune cell;
  ii. proliferation of the immune cell in coculture with a cancerous cell; and
  iii. cell death of cancerous cells in coculture with the immune cell;
  iv. proliferation of the immune cell alone in culture;
  v. expression of CD3 zeta-chain in the immune cell;
  vi. migration of the immune cell;
  vii. adhesion of the immune cell;
  viii. homing of the immune cell;
  ix. penetration of the immune cell;
  x. secretion of at least one cytokine by the immune cell;
  xi. secretion of at least one therapeutic protein by the immune cell; and
  xii. an expression level or a functional level in the immune cells of at least one protein or gene involved in the processes of i to xi;
d. providing a second immune cell whose origin is the same as the first immune cell;
e. contacting the second immune cell with the at least two molecules wherein the at least two molecules decreased PD-1 expression level or functional level in the first immune cell, increased proliferation of the first immune cell, increased cancerous cell death in coculture with the first immune cell alone or in coculture, increased zeta-chain expression in the first immune cell, increased migration of the first immune cell, increased cytokine secretion by the first immune cell, increased adhesion of the first immune cell, increased homing of the first immune cell, increased secretion of at least one therapeutic protein by the immune cell, increased expression level or functional level in the immune cell of at least one protein or gene involved in processes i to xi, or a combination thereof; and
f. administering the contacted second immune cell to the subject;
thereby performing adoptive NeuroImmunotherapy in the subject in need thereof.

According to another aspect, there is provided a method of selecting a subject suitable for NeuroImmunotherapy, the method comprising,
a. providing an immune cell from the subject;
b. contacting the immune cell with at least one molecule selected from a neurotransmitter or analog thereof, a neuropeptide or analog thereof, and a modulator of a voltage gated ion channel;
c. measuring at least one of:
  i. programmed cell death 1 (PD-1) expression on the immune cell;
  ii. proliferation of the immune cell in coculture with a cancerous cell; and
  iii. cell death of cancerous cells in coculture with the immune cell;
wherein at least one of a decrease in PD-1 expression or function, an increase in proliferation, an increase in cancerous cell death and a combination thereof indicates the subject is suitable for NeuroImmunotherapy.

According to another aspect, there is provided a method of selecting a subject suitable for NeuroImmunotherapy, the method comprising,
a. providing an immune cell from the subject;
b. contacting the immune cell with at least two molecules selected from a neurotransmitter or analog thereof, and a neuropeptide or analog thereof, or at least one modulator of a voltage gated ion channel;
c. measuring at least one of:
  i. PD-1 expression or activity on the immune cell;
  ii. proliferation of the immune cell in coculture with a cancerous cell; and
  iii. cell death of cancerous cells in coculture with the immune cell;
  iv. proliferation of the immune cell alone in culture;
  v. expression of CD3 zeta-chain in the immune cell;
  vi. migration of the immune cells
  vii. adhesion of the immune cells;
  viii. homing of the immune cells;
  ix. penetration of the immune cells
  x. secretion of cytokines by the immune cells;
  xi. secretion of therapeutic proteins by the immune cells; and
  xii. expression levels and functional levels of proteins and genes involved in processes i to xi;
wherein at least one of a decrease in PD-1 expression or activity, an increase in proliferation of the immune cell alone or in coculture, an increase in cancerous cell death, an increase in zeta-chain expression, an increase in migration, an increase in cytokine secretion, an increase in adhesion, an increase in homing, an increase in secretion of at least one therapeutic protein, a decrease in expression or function of at least one protein or gene involved in the process of i, or an increase in expression or function of at least one protein or gene involved in the processes of ii to xi indicates the subject is suitable for NeuroImmunotherapy.

According to another aspect, there is provided a method of selecting a molecule for improving immunotherapy potential, the method comprising:
a. providing an immune cell;
b. contacting the immune cell with at least one molecule selected from a neurotransmitter or analog thereof, a neuropeptide or analog thereof, and a modulator of a voltage gated ion channel;
c. measuring at least one of:
  i. programmed cell death 1 (PD-1) expression on the immune cell;
  ii. proliferation of the immune cell in coculture with a cancerous cell; and
  iii. cell death of cancerous cells in coculture with the immune cell;
wherein at least one of a decrease in PD-1 expression or function, an increase in proliferation, an increase in cancerous cell death and a combination thereof indicates the at least one molecule improves therapeutic potential of the immune cell.

According to another aspect, there is provided a method of selecting a combination of molecules for improving therapeutic immune cell potential, the method comprising:
a. providing an immune cell;
b. contacting the first immune cell with at least two molecules selected from a neurotransmitter or analog thereof, and a neuropeptide or analog thereof, or a modulator of a voltage gated ion channel;
c. measuring at least one of:
  i. PD-1 expression or activity on the immune cell;
  ii. proliferation of the immune cell in coculture with a cancerous cell; and iii. cell death of cancerous cells in coculture with the immune cell;
iv. proliferation of the immune cell alone in culture;
v. expression of CD3 zeta-chain in the immune cell;
vi. migration of the immune cells
vii. adhesion of the immune cells;
viii. homing of the immune cells;
ix. penetration of the immune cells
x. secretion of cytokines by the immune cells;
xi. secretion of therapeutic proteins by the immune cells; and
xii. expression levels and functional levels of proteins and genes involved in the above processes;

wherein at least one of a decrease in PD-1 expression or activity, an increase in proliferation of the immune cell alone or in coculture, an increase in cancerous cell death, an increase in zeta-chain expression, an increase in migration, an increase in cytokine secretion, an increase in adhesion, an increase in homing, an increase in secretion of at least one therapeutic protein, a decrease in expression or function of at least one protein or gene involved in the process of i, or an increase in expression or function of at least one protein or gene involved in the processes of ii to xi indicates the at least one molecule improves therapeutic potential of the immune cell.

According to another aspect, there is provided a method of decreasing PD-1 expression on a surface of an immune cell, the method comprising administering to the immune cell at least one molecule selected from a neurotransmitter or analog thereof, a neuropeptide or analog thereof, or a modulator of a voltage gated ion channel.

According to another aspect, there is provided a method of augmenting immune cell function, the method comprising:
a. providing an immune cell; and
b. contacting the immune cell with at least two molecules selected from a neurotransmitter or analog thereof, a neuropeptide or analog thereof, and a modulator of a voltage gated ion channel.

According to another aspect, there is provided a kit comprising at least one neurotransmitter or analog thereof, at least one neuropeptide or analog thereof and at least one modulator of a voltage gated ion channel. In some embodiments, the kit further comprises a PD-1 detecting agent.

According to some embodiments, the subject suffers from a disease, condition, injury or wound has, or is suspected to have, suboptimal T cell number, activity or both. According to some embodiments, the disease, condition, injury or wound is selected from the group consisting of: a cancer, an infectious disease, a genetic immunodeficiency, an acquired immunodeficiency, a degenerative disease, autoimmune disease, metabolic disease, genetic disease, a neurological or neuropsychiatric disease, and post-organ transplant accompanied by immune incompetence. According to some embodiments, the disease, condition, injury or wound is an infectious disease. According to some embodiments, the disease, condition, injury or wound is cancer. According to some embodiments, the disease, condition, injury or wound requires tissue or organ repair, or delivery of a T cell-derived factor.

According to some embodiments, the immune cell is an immune cell that expresses PD-1. According to some embodiments, the immune cell is a T cell. According to some embodiments, the first and second immune cells are from the patient. According to some embodiments, the first and second immune cells are from a healthy donor. According to some embodiments, the first provided immune cell is not pre-activated before the contacting.

According to some embodiments, the first provided immune cell is multiple immune cells and further comprising selecting from the first provided immune cells a subset of immune cells. According to some embodiments, the subset of immune cells is selected from the group comprising: effector T cells, helper T cells, cytotoxic T cells, regulator T cells, suppressor T cells, natural killer T cell, inflammatory T cells, memory T cells, gamma delta T cells, tissue/organ-infiltrating T cells, tumor-infiltrating T cells, repairing T cells and pro-regenerative T cells, mucosal associated T cells, repairing T cells, pro-regenerative T cells, activated T cells, and inactivated T cells.

T According to some embodiments, the methods of the invention further comprise culturing the provided immune cells in immune cell media. According to some embodiments, the immune cell media comprises human plasma or serum.

According to some embodiments, the methods of the invention further comprising expanding the provided immune cells. According to some embodiments, the expanding comprises stimulation of the immune cells, and the method further comprising culturing for a period of time sufficient to bring at least 50% of the provided immune cells to a resting state. According to some embodiments, the further culturing is for between 1 and 7 days. According to some embodiments, the stimulating comprises activating the immune cell. According to some embodiments, the stimulating is by at least one of CD3, CD28, mitogen, a growth factor and a cytokine.

According to some embodiments, the contacting is incubating the immune cell with the molecule or combination of molecules. According to some embodiments, the first immune cell is multiple immune cells, and the first immune cells are divided and cultured separately; different molecules or combinations of molecules are contacted to each of the divided immune cells, and the molecule or combination of molecules which effects the largest increase or decrease is contacted. According to some embodiments, the second immune cell is multiple immune cells, and the second immune cells are divided and contacted with different molecules or combinations of molecules and administered to the subject sequentially. According to some embodiments, the administering sequentially is to at least one site in the subject and by at least one mode of administration.

According to some embodiments, the analog of a neurotransmitter is a neurotransmitter receptor agonist, or a neurotransmitter receptor antagonist. According to some embodiments, the neurotransmitter or analog thereof is selected from: dopamine, glutamate, a dopamine receptor agonist, a glutamate/AMPA/NMDA receptor agonist, a glutamate/AMPA/NMDA receptor antagonist, and a dopamine receptor antagonist. According to some embodiments, the dopamine receptor agonist is selected from a dopamine D1/5 receptor agonist, a dopamine D2 receptor agonist, a dopamine D3 receptor agonist, and a dopamine D4 receptor agonist. According to some embodiments, the dopamine D1/5 receptor agonist is selected from dopamine, fenoldopam, corlopam, A77636, and SKF38393. According to some embodiments, the dopamine D2 receptor agonist is sumanirole. According to some embodiments, the dopamine D3 receptor agonist is selected from PD 128907 and 7-OH-DPAT. According to some embodiments, the dopamine D4 receptor agonist is selected from PD 168077 and A412997. According to some embodiments, the glutamate/AMPA/NMDA receptor agonist is selected from glutamate, AMPA, and NMDA. According to some embodiments, the glutamate/AMPA/NMDA receptor antagonist is selected from CNQX, MK801. According to some embodiments, the dopamine receptor antagonist is selected from a dopamine D1/5 receptor antagonist, a dopamine D2 receptor antagonist, a dopamine D3 receptor antagonist, and a dopamine D4 receptor antagonist. According to some embodiments, the dopamine D1/5 receptor antagonist is SCH 39166. According to some embodiments, the dopamine D2 receptor antagonist is L-741626. According to some embodiments, the dopamine D3 receptor antagonist is NGB 2904. According to some embodiments, the dopamine D4 receptor antagonist is L-741742.

According to some embodiments, the neuropeptide or analog thereof is selected from GnRH-I, GnRH-II, CGRP, somatostatin, and Neuropeptide Y. According to some embodiments, the voltage gated ion channel is selected from the group consisting of a voltage-gated sodium channel, calcium channel, potassium channel (Kv) and chloride channel. According to some embodiments, the voltage gated ion channel is a voltage-gated potassium channel. According to some embodiments, the voltage gated potassium channel is a potassium voltage-gated channel of subfamily A. According to some embodiments, the potassium voltage-gated channel of subfamily A is Kv1.1. According to some embodiments, the modulator of a voltage gated ion channel is an ion channel blocker. According to some embodiments, the ion channel antagonist is a voltage-gated Kv1.1 ion channel blocker. According to some embodiments, the Kv1.1 ion channel blocker is selected from dendrotoxin K (DTX-K) and an anti-Kv1.1 blocking antibody.

According to some embodiments, the administering comprises selecting and administering a subset of the second contacted immune cells. According to some embodiments, administering the contacted second immune cell comprises administering between $2 \times 10^6$ and $10^9$ immune cells. According to some embodiments, the administering comprises repeated administering of contacted immune cells. According to some embodiments, the administering comprises administering indefinitely.

According to some embodiments, the first immune cell has been frozen and thawed before step b. According to some embodiments, the frozen immune cells is frozen in freezing media comprising human plasma or serum.

According to some embodiments, the treating is first-line treatment or the exclusive treatment of the disease, condition, injury or wound. According to some embodiments, the treating is before, during, simultaneous with or after a different therapy for the disease, condition, injury or wound.

According to some embodiments, the immune cell's immunotherapy potential is the cell's potential for treating a disease, condition, wound or injury in which there is or is suspected to be suboptimal T cell number, activity or both. According to some embodiments, the administered cells perform at least one of the following functions in the subject:
 a. kill disease-causing cells;
 b. kill an infectious organism;
 c. cure the disease or condition;
 d. repair a tissue or organ;
 e. replace damaged cells, or tissue;
 f. compensate for a loss or deficiency;
 g. prevent the disease or condition; and
 h. regenerate a tissue or organ.

According to some embodiments, the kit is for use in selecting a molecule for increasing therapeutic immune cell potential. According to some embodiments, the kit is for use in improving immune cell function during NeuroImmunotherapy. According to some embodiments, the kit is for use in determining if a subject in need thereof is suitable for NeuroImmunotherapy. According to some embodiments, the kit is for use in treating or preventing reoccurrence of a disease, condition, wound or injury in which there is, or is suspected to be suboptimal T cell activity, number or both in a subject in need thereof.

According to some embodiments, the PD-I detecting agent is an anti-PD-I antibody. According to some embodiments, the PD-I detecting agent comprises a tag. According to some embodiments, the tag is a fluorescent tag.

According to some embodiments, the kits of the invention comprising at least two of the molecules. According to some embodiments, the neurotransmitter or analog thereof, neuropeptide or analog thereof, and modulator of a voltage gated ion channel are provided at a concentration of at most $10^{-7}$ molar (M).

According to some embodiments, the kit further comprises at least one combination of at least one neurotransmitter or analog thereof, at least one neuropeptide or analog thereof, and at least one modulator of a voltage gated ion channel. According to some embodiments, the kit further comprises a tissue culture plate, wherein a separate well of the plate contains a separate molecule or combination of molecules.

According to another aspect, there is provided a method of selecting a subject suitable for adoptive immunotherapy, the method comprising,
 a. providing a healthy immune cell;
 b. contacting the healthy immune cell with plasma or serum from the subject; and
 c. measuring survival of the immune cell;
 wherein a decrease in survival of the healthy immune cell indicates that within the subject's body, his immune cells are exposed to detrimental effects induced by factors within his plasma or serum, and thus the subject is suitable for adoptive immunotherapy.

According to another aspect, there is provided a method of immunotherapy in a subject in need thereof, the method comprising:
 a. providing an immune cell from the subject;
 b. culturing the immune cell in media comprising plasma or serum from a healthy allogenic individual;
 c. returning the cultured immune cell back to the subject;
 thereby performing immunotherapy in the subject in need thereof.

According to another aspect, there is provided a method of selecting a subject suitable for immunotherapy, the method comprising:
 a. providing an immune cell;
 b. culturing the immune cell in media comprising plasma or serum from the subject; and
 c. monitoring survival of the immune cell;
 wherein a decrease in survival of the immune cell as compared to an immune cell cultured in media not comprising plasma or serum from the subject indicates the subject is suitable for immunotherapy.

According to another aspect, there is provided a method for storing immune cells for immunotherapy, the method comprising culturing or freezing immune cells in media comprising human plasma or serum.

According to some embodiments, the human plasma or serum is from a subject that provided the immune cells. According to some embodiments, the human plasma or serum is from a healthy allogenic individual.

According to some embodiments, the immune cell is from a healthy donor. According to some embodiments, the immune cell is a large proliferating T cell. According to some embodiments, the immune cell is multiple immune cells and wherein decreased survival comprises at least a 30% reduction in the number of surviving immune cells. According to some embodiments, the culturing is for at least two and a half days. According to some embodiments, the immunotherapy is NeuroImmunotherapy and comprises any one of the methods of the invention.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description together with the drawings makes apparent to those skilled in the art how embodiments of the invention may be practiced.

FIGS. 5A-I: Replacing fetal calf serum (FCS) with human plasma in the growth medium in which human cells are kept in vitro. Representative dot plots of forward and side scatter FACS analysis of cells grown in culture containing FCS for (5A) 5 and (5C) 9 days, cells grown in culture containing human plasma of a healthy subject (blood donor) for (5B) 5 and (5D) 9 days, and cells grown in culture containing plasma of a cancer patient for (5E) 5 and (5F) 9 days. Tables summarizing the survival of total T cells, as well as small and big T cells from a healthy donor cultured for (5G) 2.5 days and (5H) 6 days in tissue culture media containing FCS, or human plasma from healthy and live cancer subjects. (5I) Bar chart showing the survival of large and likely proliferative T cells after 6 days in culture.

DETAILED DESCRIPTION OF THE INVENTION

Figure 1:
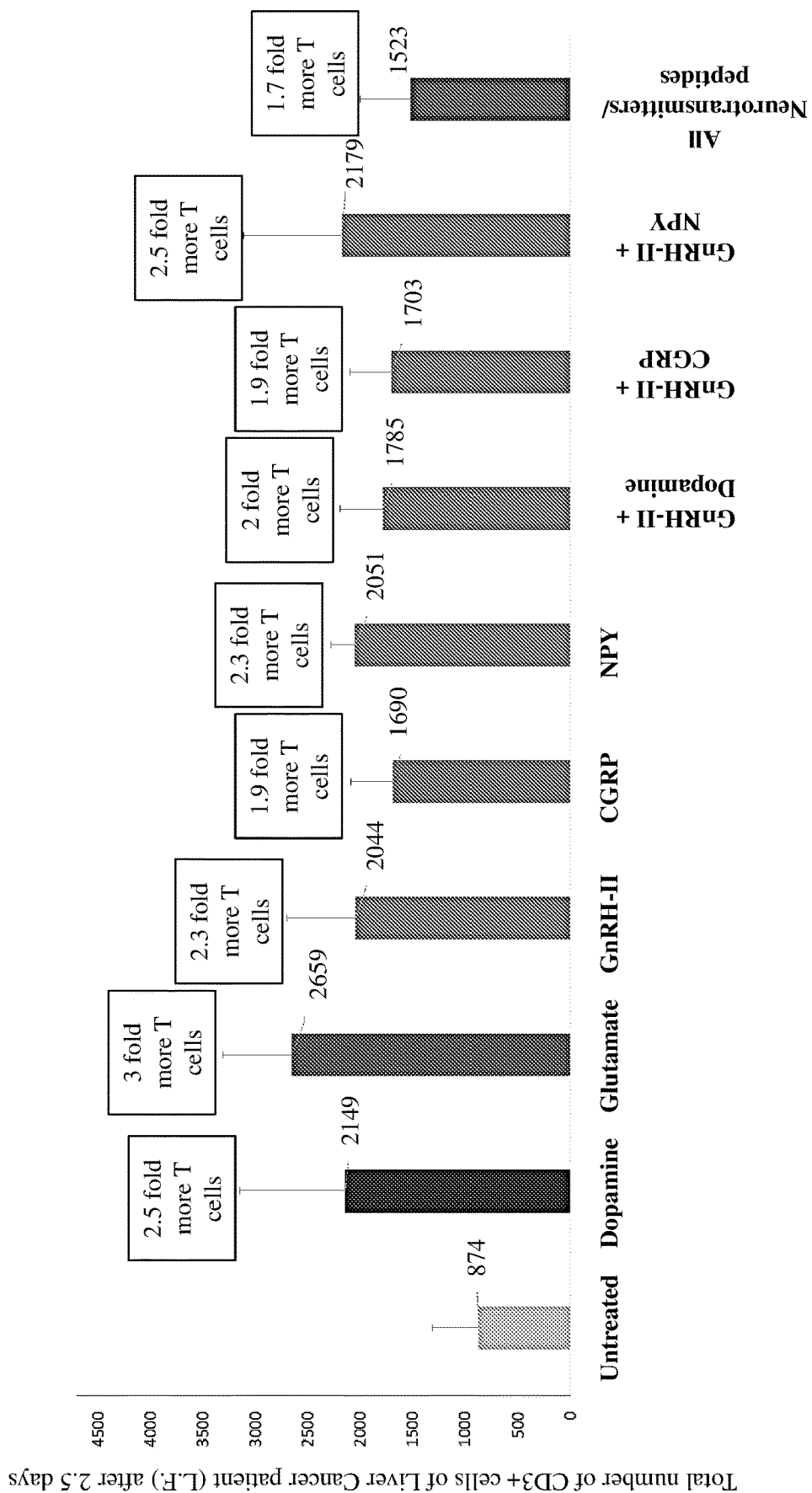
FIG. 1: Neurotransmitters enhance proliferation of T cells of cancer patients. A bar chart showing the number of CD3 positive cells of a liver cancer patient L.F. after 60 hours of culture with various neurotransmitters or combinations of neurotransmitters.

The present invention provides, in some embodiments, methods of adoptive NeuroImmunotherapy, selecting a subject suitable for adoptive NeuroImmunotherapy, selecting a molecule or combination of molecules for improving therapeutic immune cell potential, and decreasing PD-1 expression on a surface of an immune cell, comprising contacting immune cells with at least one molecule selected from a neurotransmitter or analog thereof, a neuropeptide or analog thereof, or a modulator of a voltage gated ion channel. Kits comprising at least one of those molecules, or comprising at least two of those molecules, and optionally a PD-1 detecting agent are also provided.

By a first aspect, there is provided a method of selecting a molecule for improving therapeutic immune cell potential, the method comprising:
   a. providing an immune cell;
   b. contacting the immune cell with at least one molecule selected from a neurotransmitter or analog thereof, a neuropeptide or analog thereof, or a modulator of a voltage gated ion channel;
   c. measuring at least one of:
      i. programmed cell death 1 (PD-1) expression level or functional level in the immune cell;
      ii. proliferation of the immune cell in coculture with a cancerous cell; and
      iii. cell death of cancerous cells in coculture with the immune cell;
   wherein at least one of a decrease in PD-1 expression, an increase in proliferation of the immune cell, and an increase in cancerous cell death indicates the at least one molecule improves therapeutic potential of the immune cell.

By another aspect, there is provided a method of selecting a combination of molecules for improving therapeutic immune cell potential, the method comprising:
   a. providing an immune cell;
   b. contacting the immune cell with at least two molecules selected from a neurotransmitter or analog thereof, and a neuropeptide or analog thereof, or a modulator of a voltage gated ion channel;
   c. measuring at least one of:
      i. PD-1 expression level or functional level in the immune cell;
      ii. proliferation of the immune cell in coculture with a cancerous cell; and
      iii. cell death of cancerous cells in coculture with the immune cell;
      iv. proliferation of the immune cell alone in culture;
      v. expression of CD3 zeta-chain in the immune cell;
      vi. migration of the immune cell;
      vii. adhesion of the immune cell;
      viii. homing of the immune cell;

ix. penetration of the immune cell;
x. secretion of at least one cytokine by the immune cell;
xi. secretion of at least one therapeutic protein by the immune cell; and
xii. an expression level or a functional level in the immune cell of at least one protein or gene involved in the processes of i to xi;

wherein at least one of a decrease in PD-I expression level or functional level, an increase in proliferation of the immune cell alone or in coculture, an increase in cancerous cell death, an increase in zeta-chain expression, an increase in migration, an increase in cytokine secretion, an increase in adhesion, an increase in homing, an increase in secretion of at least one therapeutic protein, a decrease in expression level or functional level in the immune cell of at least one protein or gene involved in the process of i, or an increase in expression level or functional level in the immune cell of at least one protein or gene involved in the processes of ii to xi indicates the combination of at least two molecules improves therapeutic potential of the immune cell.

By another aspect, there is provided a method of selecting a subject suitable for adoptive NeuroImmunotherapy, the method comprising,
a. providing an immune cell from the subject;
b. contacting the immune cell with at least one molecule selected from a neurotransmitter or analog thereof, a neuropeptide or analog thereof, and a modulator of a voltage gated ion channel;
c. measuring at least one of:
   i. programmed cell death 1 (PD-1) expression level or functional level in the immune cell;
   ii. proliferation of the immune cell in coculture with a cancerous cell; and
   iii. cell death of cancerous cells in coculture with the immune cell;
wherein at least one of a decrease in PD-1 expression level or functional level, an increase in proliferation, an increase in cancerous cell death and a combination thereof indicates the subject is suitable for adoptive NeuroImmunotherapy.

By another aspect, there is provided a method of selecting a subject suitable for adoptive NeuroImmunotherapy, the method comprising,
a. providing an immune cell from the subject;
b. contacting the immune cell with at least two molecules selected from a neurotransmitter or analog thereof, and a neuropeptide or analog thereof, or a modulator of a voltage gated ion channel;
c. measuring at least one of:
   i. PD-I expression level or functional level on the immune cell;
   ii. proliferation of the immune cell in coculture with a cancerous cell; and
   iii. cell death of cancerous cells in coculture with the immune cell;
   iv. proliferation of the immune cell alone in culture;
   v. expression of CD3 zeta-chain in the immune cell;
   vi. migration of the immune cell;
   vii. adhesion of the immune cell;
   viii. homing of the immune cell;
   ix. penetration of the immune cell;
   x. secretion of at least one cytokine by the immune cell;
   xi. secretion of at least one therapeutic protein by the immune cell; and
   xii. an expression level or a functional level in the immune cell of at least one protein or gene involved in the processes of i to xi;

wherein at least one of a decrease in PD-I expression level or functional level, an increase in proliferation of the immune cell alone or in coculture, an increase in cancerous cell death, an increase in zeta-chain expression, an increase in migration, an increase in cytokine secretion, an increase in adhesion, an increase in homing, an increase in secretion of at least one therapeutic protein, a decrease in expression level or functional level of at least one protein or gene involved in the process of i or an increase in expression level or functional level of at least one protein or gene involved in the processes of ii to xi indicates the subject is suitable for adoptive NeuroImmunotherapy.

In some embodiments, the methods of the invention are performed in vitro. It will be understood however, that any steps comprising administering to a subject cannot be performed in vitro. In some embodiments, all steps of the methods of the invention that do not comprise administering to a subject are performed in vitro. In some embodiments, coculture with a cancer cell may be coculture with any diseased cell. In some embodiments, a diseased cell is a cell infected by an infectious organism. In some embodiments, the measuring of the invention may also be measuring cell death of diseased cells in coculture with the immune cell. All methods of the invention herein described may also include this measuring as one of the measurings that may be performed.

By another aspect, there is provided a method of adoptive NeuroImmunotherapy in a subject in need thereof, the method comprising:
a. providing a first immune cell;
b. contacting the first immune cell with at least one molecule selected from a neurotransmitter or analog thereof, a neuropeptide or analog thereof, and a modulator of a voltage gated ion channel;
c. measuring at least one of:
   i. Programmed Cell Death 1 (PD-1) expression level or function level in the immune cell;
   ii. proliferation of the immune cell in coculture with a cancerous cell; and
   iii. cell death of cancerous cells in coculture with the immune cell;
d. providing a second immune cell whose origin is the same as the first immune cell;
e. contacting the second immune cell with the at least one molecule wherein the at least one molecule decreased PD-1 expression level or functional level in the first immune cell, increased proliferation of the first immune cell, increased cancerous cell death in coculture with the first immune cell or a combination thereof; and
f. administering the contacted second immune cell to the subject;
thereby performing adoptive NeuroImmunotherapy in the subject in need thereof.

By another aspect, there is provided a method of adoptive NeuroImmunotherapy in a subject in need thereof, the method comprising:
a. providing a first immune cell;
b. contacting the first immune cell with at least two molecules selected from a neurotransmitter or analog thereof, and a neuropeptide or analog thereof, or a modulator of a voltage gated ion channel;

c. measuring at least one of:
  i. PD-1 expression level or function level in the immune cell;
  ii. proliferation of said immune cell in coculture with a cancerous cell; and
  iii. cell death of cancerous cells in coculture with the immune cell;
  iv. proliferation of the immune cell alone in culture;
  v. expression of CD3 zeta-chain in the immune cell;
  vi. migration of the immune cell;
  vii. adhesion of the immune cell;
  viii. homing of the immune cell;
  ix. penetration of the immune cell;
  x. secretion of at least one cytokine by the immune cell;
  xi. secretion of at least one therapeutic protein by the immune cell; and
  xii. an expression level or a functional level in the immune cell of at least one protein or gene involved in the processes of i to xi;
d. providing a second immune cell whose origin is the same as the first immune cell;
e. contacting the second immune cell with the at least two molecules wherein the at least two molecules decreased PD-1 expression level or functional level in the first immune cell, increased proliferation of the first immune cell, increased cancerous cell death in coculture with the first immune cell alone or in coculture, increased zeta-chain expression in the first immune cell, increased migration of the first immune cell, increased cytokine secretion by the first immune cell, increased adhesion of the first immune cell, increased homing of the first immune cell, increased secretion of at least one therapeutic protein by the first immune cell, decreased expression level or functional level in the first immune cell of at least one protein or gene involved in the process of i, increased expression level or functional level in the first immune cell of at least one protein or gene involved in the processes of ii to xi or a combination thereof; and
f. administering the contacted second immune cell to the subject;
thereby performing adoptive NeuroImmunotherapy in the subject in need thereof.

By another aspect, there is provided a method of adoptive NeuroImmunotherapy in a subject in need thereof, the method comprising:
a. providing a first immune cell;
b. contacting the first immune cell with at least one molecule selected from a neurotransmitter or analog thereof, and a neuropeptide or analog thereof, or a modulator of a voltage gated ion channel;
c. measuring at least one of:
  i. PD-1 expression level or functional level in the immune cell;
  ii. proliferation of the immune cell in coculture with a cancerous cell; and
  iii. cell death of cancerous cells in coculture with the immune cell;
  iv. proliferation of the immune cell alone in culture;
  v. expression of CD3 zeta-chain in the immune cell;
  vi. migration of the immune cell;
  vii. adhesion of the immune cell;
  viii. homing of the immune cell;
  ix. penetration of the immune cell;
  x. secretion of at least one cytokine by the immune cell;
  xi. secretion of at least one therapeutic protein by the immune cell; and
  xii. an expression level or a functional level in the immune cell of at least one protein or gene involved in the processes of i to xi;
d. providing at least a second and a third immune cell whose origin is the same as the first immune cells;
e. contacting at least the second immune cell and the third immune cell with different at least one molecule wherein the at least one molecule decreased PD-1 expression level or functional level in the first immune cell, increased proliferation of the first immune cell, increased cancerous cell death in coculture with the first immune cell alone or in coculture, increased zeta-chain expression in the first immune cell, increased migration of the first immune cell, increased cytokine secretion by the first immune cell, increased adhesion of the first immune cell, increased homing of the first immune cell, increased secretion of at least one therapeutic protein by the immune cell, decreased expression level or functional level in the first immune cell of at least one protein or gene involved in the process of i, increased expression level or functional level in the first immune cell of at least one protein or gene involved in the processes of ii to xi or a combination thereof; and
f. administering at least the contacted second immune cell to the subject and subsequently administering the contacted third immune cell to the subject;
thereby performing adoptive NeuroImmunotherapy in the subject in need thereof.

By another aspect, there is provided a use of an immune cell contacted with at least one molecule selected from a neurotransmitter or analog thereof, and a neuropeptide or analog thereof, or a modulator of a voltage gated ion channel for adoptive NeuroImmunotherapy in a subject in need thereof. By another aspect, there is provided a use of an immune cell contacted with at least one molecule selected from a neurotransmitter or analog thereof, and a neuropeptide or analog thereof, or a modulator of a voltage gated ion channel for treating, preventing or preventing reoccurrence of a disease, condition, wound or injury that has, or is suspected to have, suboptimal T cell activity in a subject in need thereof.

In some embodiments, the contacted cell comprises at least one of: decreased PD-I expression level or function level, increased proliferation when in coculture with a cancerous cell; and increased cytotoxic effect on cancerous cells in coculture with it. In some embodiments, the contacted cell is contacted with a combination of a neurotransmitter or analog thereof, and a neuropeptide or analog thereof, or a modulator of a voltage gated ion channel. In some embodiments, the combined contacted cell comprises at least one of: decreased PD-I expression level or function level, increased proliferation when in coculture with a cancerous cell; and increased cytotoxic effect on cancerous cells in coculture with it, increased proliferation when alone in culture, increased expression of CD3 zeta-chain, increased migration, increased adhesion, increased homing, increased penetration, increased secretion of at least one cytokine, increased secretion of at least one therapeutic protein, decreased expression level or a functional level of at least one protein or gene involved PD-I expression and/or function, increased expression level or functional level of at least one protein or gene involved proliferation in coculture with a cancer cell, cytotoxic effect on cancer cells, proliferation in culture, expression of CD3 zeta-chain, migration, adhesion, homing, penetration, secretion of at least one cytokine, and secretion of at least one therapeutic protein.

In some embodiments, the contacted cell is contacted with a molecule or combination of molecules selected by one of the methods of the invention.

In some embodiments, the second immune cell is contacted with the molecule or combination of molecules that caused the greatest measured effect. In some embodiments, the second immune cell is contacted with the molecule or combination of molecules that caused the greatest measured and/or desired effect that is associated with, or leads to, an increase in the beneficial activity of the cell, and to an increase in its therapeutic potential. In some embodiments, the second immune cell is contacted with the molecule or combination of molecules that caused the greatest measured and/or desired effect, and the third immune cell is contacted with the molecule of combination of molecules that had the second greatest effect. In some embodiments, the second immune cell is contacted with the molecule or combination of molecules that caused the greatest effect to one measured criterion, and the third immune cell is contacted with the molecule of combination of molecules that had the greatest effect on a different measured criterion. In some embodiment, a fourth or more immune cells are contacted with different molecules or combinations of molecules and administered sequentially.

In some embodiments, the at least one molecule is at least one neurotransmitter or analog thereof. In some embodiments, the at least one molecule is at least one neuropeptide or analog thereof. In some embodiments, the at least one molecule is at least one modulator of a voltage gated ion channel.

In some embodiments, the two molecules or combination of molecules are not only neurotransmitters or analogs thereof. In some embodiments, the two molecules or combination of molecules are not only neuropeptides or analogs thereof. In some embodiments, the two molecules or combination of molecules are not only neurotransmitters or analogs thereof or are not only neuropeptides or analogs thereof. In some embodiments, the two molecules or combination of molecules are at least one neurotransmitter and one neuropeptide. In some embodiments, the two molecules or combination of molecules are at least one neurotransmitter and one modulator of a voltage gated ion channel. In some embodiments, the two molecules or combination of molecules are at least one neuropeptide and one modulator of a voltage gated ion channel.

In some embodiments, the methods of the invention are for use in selecting a subject suitable for improved immunotherapy, wherein the immune cell is from the subject. In some embodiments, the methods of the invention are for use in selecting a subject that can benefit from adoptive NeuroImmunotherapy, wherein the immune cell is from the subject. In some embodiments, the methods of the invention are for use in improving immune cell function during immunotherapy in a subject in need thereof.

In some embodiments, the measuring is measuring programmed cell death 1 (PD-1) expression level on the surface of the immune cells, and wherein a decrease in PD-1 expression level indicates that the at least one molecule increases suitability of the immune cells for cancer immunotherapy, increases immunotherapeutic potential of the immune cells, increases suitability of the immune cells for immunotherapy on any disease, injury, or would in which improved or augmented function of beneficial immune cells can improve the subject's condition. Each possibility represents a separate embodiment of the invention. In some embodiments, the measuring is measuring programmed cell death 1 (PD-1) expression level on the surface of the immune cells and wherein a decrease in PD-1 expression level indicates the subject is suitable for improved immunotherapy. In some embodiments, the measuring is measuring PD-1 expression level on the immune cell. In some embodiments, the measuring is measuring PD-1 functional level in the immune cell. Measuring PD-1 function is well known in the art and methods of measuring PD-1 function include, but are not limited to measuring downstream markers such as IL-2 and TNF-α, and a PD-1 reporter assay such as one employing NFAT (Nuclear Factor of Activated T-cells) response elements.

In some embodiments, the measuring is measuring proliferation of the immune cell in coculture with a cancerous cell. In some embodiments, the measuring is measuring proliferation of the immune cell alone in culture. Proliferation can be measured by any means known in the art, including, but not limited to, by FACS, cell sorting, counting cells under a microscope, an automated cell counter, or by detecting the level of various markers which increase in proportion to the cell number. In some embodiments, increased proliferation indicates that the at least one molecule increases suitability of the immune cells for cancer immunotherapy, increases immunotherapeutic potential of the immune cells, increases suitability of the immune cells for immunotherapy on any disease, injury, or would in which improved or augmented function of beneficial immune cells can improve the subject's condition. Each possibility represents a separate embodiment of the invention.

In some embodiments, the measuring is measuring the cell death of cancerous cells in coculture with the immune cells. In some embodiments, the number of dead cancer cells is measured. In some embodiments, the rate at which the cancer cells die is measured. In some embodiments, both the rate of death and the number of dead cells is counted. Measuring cell death is well known in the art and can be performed by, but is not limited to, such assay as propidium iodide staining, methylene blue staining, Hoechst staining, or any live/dead assay such is known in the art. In some embodiments, increased cell death of cancerous cells in coculture indicates that the at least one molecule increases suitability of the immune cells for cancer immunotherapy, increases immunotherapeutic potential of the immune cells, increases suitability of the immune cells for immunotherapy on any disease, injury, or would in which improved or augmented function of beneficial immune cells can improve the subject's condition. Each possibility represents a separate embodiment of the invention.

In some embodiments, the measuring is measuring CD3 zeta-chain expression level. In some embodiments, the measuring is measuring protein or mRNA expression. Methods of measuring protein, gene and/or mRNA expression are well known in the art, and any method known may be employed. Non-limiting examples of such methods include, real-time PCR, sequencing, western blot, northern blot, and ELISA. In some embodiments, increased CD3 zeta-chain expression level indicates that the at least one molecule increases suitability of the immune cells for cancer immunotherapy, increases immunotherapeutic potential of the immune cells, increases suitability of the immune cells for immunotherapy on any disease, injury, or would in which improved or augmented function of beneficial immune cells can improve the subject's condition. Each possibility represents a separate embodiment of the invention.

In some embodiments, the measuring is measuring at least one of migration, adhesion, homing and penetration by the immune cell. In some embodiments, the measuring is measuring migration of the immune cell. In some embodiments, the measuring is measuring adhesion of the immune cell. In some embodiments, the measuring is measuring homing of the immune cell. In some embodiments, the measuring is measuring penetration of the immune cell. In some embodiments, migration comprises at least one of spontaneous migration, chemotactic migration and migration towards cancer cells and/or tissue. Methods of measuring homing, adhesion, migration and penetration are well known in the art, and any known method may be used. Non-limiting examples of such methods include Boyden Chamber assays, Gap Closure assays, and plate binding assays. In some embodiments, increased migration, adhesion, homing or penetration by the immune cell indicates that the at least one molecule increases suitability of the immune cells for cancer immunotherapy, increases immunotherapeutic potential of the immune cells, increases suitability of the immune cells for immunotherapy on any disease, injury, or would in which improved or augmented function of beneficial immune cells can improve the subject's condition. Each possibility represents a separate embodiment of the invention.

In some embodiments, the measuring is measuring secretion of at least one cytokine by the immune cells. In some embodiments, the cytokine is a proinflammatory cytokine. In some embodiments, the cytokine is an anti-inflammatory cytokine. In some embodiments, the cytokine is a proinflammatory or an anti-inflammatory cytokine. In some embodiments, the cytokine secretion is measured by ELISA. In some embodiments, the increased cytokine secretion is measured by western blot. In some embodiments, secretion of at least one cytokine by the immune cell indicates that the at least one molecule increases suitability of the immune cells for cancer immunotherapy, increases immunotherapeutic potential of the immune cells, increases suitability of the immune cells for immunotherapy on any disease, injury, or would in which improved or augmented function of beneficial immune cells can improve the subject's condition. Each possibility represents a separate embodiment of the invention.

In some embodiments, the measuring is measuring secretion of at least one therapeutic molecule by the immune cells. In some embodiments, the therapeutic molecule is a therapeutic protein. As used herein, a "therapeutic molecule" refers to a molecule produced by an immune cell that has beneficial effect either on the same cell that secreted it (autocrine), or on other cells (paracrine) and thus augments the therapeutic potential of the immune cells. Examples of therapeutic molecules include, but are not limited to, growth factors, cytokines, metalloproteases, matrix-degrading enzymes and granzymes. In some embodiments, increased secretion of at least one therapeutic molecule by the immune cell indicates that the at least one molecule increases suitability of the immune cells for cancer immunotherapy, increases immunotherapeutic potential of the immune cells, increases suitability of the immune cells for immunotherapy on any disease, injury, or would in which improved or augmented function of beneficial immune cells can improve the subject's condition. Each possibility represents a separate embodiment of the invention.

In some embodiments, the measuring is measuring the expression level, or functional level, or status of at least one gene or protein involved in the above described processes that demonstrate immune cell augmentation. In some embodiments, those processes are the processes of i though xi. Methods of measuring protein, gene and/or mRNA expression are well known in the art and any method known may be employed. Non-limiting examples of such methods include, real-time PCR, sequencing, western blot, northern blot, and ELISA. The genes and proteins involved in these processes are also well known. For example, adhesion molecules, such as integrins and also ICAMs are known to be involved in adhesion and homing, Ki67, and PCNA are known markers of proliferation, and upregulation of cytokine gene expression is a marker for increased cytokine secretion. Measuring protein function is also well known in the art and will vary according to the protein. In some cases, protein function can be measured by examining activation markers such as phosphorylation, or localization of the molecule. Assays to measure protein function are also protein dependent and known in the art, and may include, but are not limited to, adhesion assays, cell killing assays, proliferation assays and mobility assays. In some embodiments, secretion of at least one cytokine by the immune cell indicates that the at least one molecule increases suitability of the immune cells for cancer immunotherapy, increases immunotherapeutic potential of the immune cells, increases suitability of the immune cells for immunotherapy on any disease, injury, or would in which improved or augmented function of beneficial immune cells can improve the subject's condition. Each possibility represents a separate embodiment of the invention. In some embodiments, increased expression level, or functional level, or status of at least one gene or protein involved in proliferation of an immune cell in coculture, cell death of cancerous cells in coculture, proliferation, CD3 zeta-chain expression, migration, adhesion, homing, penetration, secretion of at least one cytokine, or secretion of at least one therapeutic protein, indicates that the at least one molecule increases suitability of the immune cells for cancer immunotherapy, increases immunotherapeutic potential of the immune cells, increases suitability of the immune cells for immunotherapy on any disease, injury, or would in which improved or augmented function of beneficial immune cells can improve the subject's condition. Each possibility represents a separate embodiment of the invention. In some embodiments, decreased expression level, or functional level, or status of at least one gene or protein involved in PD-I expression or function indicates that the at least one molecule increases suitability of the immune cells for cancer immunotherapy, increases immunotherapeutic potential of the immune cells, increases suitability of the immune cells for immunotherapy on any disease, injury, or would in which improved or augmented function of beneficial immune cells can improve the subject's condition. Each possibility represents a separate embodiment of the invention.

By another aspect, there is provided a method of treating, preventing or preventing reoccurrence of a disease, condition, wound or injury that has, or is suspected to have, suboptimal T cell activity in a subject in need thereof, the method comprising:
  a. providing immune cells from the subject;
  b. contacting the immune cells with at least one molecule selected from a neurotransmitter or analog thereof, a neuropeptide or analog thereof, or a modulator of a voltage gated ion channel wherein the molecule does at least one of the following:
    i. decreases PD-1 expression level or functional level on the immune cells;
    ii. increases proliferation of the immune cells in coculture with a cancerous cell associated with the cancer; and iii. increases cytotoxicity of the immune cells; and
c. administering the contacted immune cells to the subject;
thereby of treating, preventing or preventing reoccurrence of a disease, condition, wound or injury.

By another aspect, there is provided a method of treating, preventing or preventing reoccurrence of a disease, condition, wound or injury that has, or is suspected to have, suboptimal T cell activity in a subject in need thereof, the method comprising:
a. providing immune cells from the subject;
b. contacting the immune cells with at least one molecule selected by the methods of the invention; and
c. administering the contacted immune cells to the subject;
thereby of treating, preventing or preventing reoccurrence of a disease, condition, wound or injury.

By another aspect, there is provided a method of treating, preventing or preventing reoccurrence of a disease, condition, wound or injury that has, or is suspected to have, suboptimal T cell activity in a subject in need thereof, the method comprising:
a. providing immune cells from the subject;
b. contacting the immune cells with at least two molecules selected by the methods of the invention; and
c. administering the contacted immune cells to the subject;
thereby of treating, preventing or preventing reoccurrence of a disease, condition, wound or injury.

In some embodiments, the immune cells are contacted with at least one molecule that decreases PD-1 expression levels on the immune cells. In some embodiments, the method further comprises a step of selecting the at least one neurotransmitter. In some embodiments, the selecting is by one of the methods of the invention.

By another aspect, there is provided a method of decreasing PD-1 expression levels on a cell surface of an immune cell, the method comprising administering to the immune cell at least one molecule selected from a neurotransmitter or analog thereof, a neuropeptide or analog thereof, or a modulator of a voltage gated ion channel.

By another aspect, there is provided a use of at least one molecule selected from a neurotransmitter or analog thereof, a neuropeptide or analog thereof, or a modulator of a voltage gated ion channel for decreasing PD-1 expression levels on a cell surface of an immune cell.

In some embodiments, the administering to the immune cell is performed in vitro. In some embodiments, the administering to the immune cell is performed ex vivo. In some embodiments, the administering to the immune cell is performed in vivo. In some embodiments, the immune cell is any cell of the immune system. In some embodiments, the immune cell is selected from a T cell, a natural killer (NK) cell, a B cell, a dendritic cell, a macrophage, and a glial cell. In some embodiments, the immune cell is selected from a T cell and a NK-cell. In some embodiments, the immune cell is any cell of the immune system that expresses PD-1. In some embodiments, the immune cell is a T cell. In some embodiments, the T cell is a large proliferating T cell. A skilled artisan will be able to distinguish between large and smaller T cells by techniques such as microscopy, FACS and cell sorting. When a flow cytometer is being used, forward scatter, or forward and side scatter may be used to distinguish between these T cells of different sizes. The large T cells are considered to be T cell blasts, and these are the activate and proliferating T cells. These large T cells have a higher forward scatter and also tend to have a lower degree of granularity as measured by side scatter. In this way the large proliferating population of T cells having high forward scatter and lower side scatter can be easily identified as exemplified herein in FIGS. 5A-F. In some embodiments, the immune cell is a beneficial T cell. In some embodiments, the immune cell is from a subject suffering from a disease, condition wound, or injury characterized by, or wherein there is, or is suspected to be suboptimal T cell number and/or activity, or wherein a clinical benefit is achieved by augmented number and/or function of beneficial T cells. Each possibility represents a separate embodiment of the invention. In some embodiments, the immune cells are of a subject suffering from cancer. In some embodiments, the immune cells are from a healthy donor. In some embodiments, the immune cells have regenerative or repairing potential. In some embodiments, the immune cells are from a relative of a subject suffering from a disease, condition, injury or wound characterized by, or wherein there is, or is suspected to be suboptimal T cell activity or number, or that can benefit from improved or augmented function of beneficial immune cells. Each possibility represents a separate embodiment of the invention. In some embodiments, the immune cells are autologous to a subject suffering from a disease or condition characterized by, or wherein there is, or is suspected to be suboptimal activity or number of beneficial T cells. Each possibility represents a separate embodiment of the invention. In some embodiments, the immune cells are allogenic to the subject. In some embodiments, the immune cells are from an immortalized immune cell line. In some embodiments, the immune cells are from a universal donor cell line. Such a line would be propagated for therapeutic donation to any subject in need thereof. In some embodiments, the universal donor cell line, does not express, or lowly expresses, MHC molecules. In some embodiments, the MHC molecules are MHC class II molecules. In some embodiments, the universal donor line is not or lowly immunogenic. In some embodiments, the cell line is a healthy immune cell line. In some embodiments, the cell line is a non-immunogenic cell line. In some embodiments the immune cell is not immunogenic. In some embodiments, the immune cell is not genetically modified. In some embodiments, the immune cell has been genetically modified. In some embodiments, the genetic modification improves the therapeutic potential of the immune cell. In some embodiments, the genetic modification reduces the immunogenicity of the immune cell. The methods of the invention may be used with any immune cell that can provide a benefit to a subject when administered. In some embodiments, the immune cells are in culture. In some embodiments, the immune cells are in a subject. In some embodiments, the methods of the invention are performed in vitro.

As used herein, the term "beneficial T cell" refers to a T cell that can be a benefit to the subject in overcoming, either by itself or in combination with other cells of the body, a pathological condition and/or improving the subject's condition. In some embodiments, the beneficial T cell functions by eradicating the disease-causing infectious organism or cancer, or by operating/functioning as a regenerating or repairing therapeutic cell. In some embodiments, the beneficial T cell functions by eradicating the disease-causing infectious organism or cancer. In some embodiments, the beneficial T cell functions/operates as a regenerating or repairing therapeutic cell. In some embodiments, a beneficial T cell is not an autoimmune T cell, a cancerous T cell, nor any other pathological T cell that could harm the subject. In some embodiments, a beneficial T cell is a healthy T cell.

As used herein, a "neurotransmitter" is a small molecule that is secreted by a neuron to communicate with another cell. In some embodiments, a neurotransmitter is a chemical. In some embodiments, a neurotransmitter has a size of at most 1, 2, 3, 4, or 5 amino acids. Each possibility represents a separate embodiment of the invention. In some embodiments, a neurotransmitter has a size at most 1 amino acid. In some embodiments, a neurotransmitter does not comprise an amino acid. In some embodiments, a neurotransmitter is a naturally occurring molecule.

As used herein, an "analog" of a neurotransmitter and/or neuropeptide is any molecule that it is capable of binding to the neurotransmitter or neuropeptide cognate receptor. In some embodiments, the analog modifies receptor function. In some embodiments, the analog blocks the receptor. In some embodiments, the analog activates the receptor. In some embodiments, the analog is a mimic. In some embodiments, the analog is a receptor agonist. In some embodiments, the analog is a full or partial receptor antagonist. In some embodiments, the analog is a receptor agonist or antagonist. In some embodiments, the analog is a receptor agonist and antagonist. In some embodiments, the analog is an antibody that binds the receptor. In some embodiments, the analog is a receptor-blocking antibody. In some embodiments, the analog is a receptor-activating antibody. In some embodiments, the function of the analog depends on the context and/or specific cell and or cell condition.

The term "agonist" generally refers to a molecule, compound or agent that binds to a receptor at the same site as the natural ligand and activates, fully or partially, the receptor. The term "antagonist" generally refers to a molecule, compound or agent that binds to a receptor at the same site as an agonist or another site and does one or more of the following: does not activate the receptor, interferes with or blocks activation of the receptor by a natural ligand, and interferes with or blocks activation of the receptor by a receptor agonist.

The term "mimic" generally refers to a molecule, compound or agent that binds to a receptor of the neuropeptide and aviates, fully or partially, the receptor and thus induces the same cell function as the neuropeptide. In some embodiments, the mimic activates the receptor as the neuropeptide does. In some embodiments, the mimic blocks the receptor as the neuropeptide does.

As used herein, a "neuropeptide" is a peptide secreted by a neuron to communicate with another cell. In some embodiments, the neuropeptide is at least 5, 10, 15, 20, 30, 35, or 40 amino acids long. Each possibility represents a separate embodiment of the invention. In some embodiments, the neuropeptide is at least 40 amino acids long. In some embodiments, the neuropeptide is at most 40, 50, 60, 70, 80, 90 or 100 amino acids long. Each possibility represents a separate embodiment of the invention. In some embodiments, the neuropeptide is a neurohormone. As used herein, a "neurohormone" is a hormone secreted by a neuron to communicate with another target cell. In some embodiments, the target cell is far away from the secreting cell.

As used herein, the terms "immunotherapy" and "immune cell therapy" are synonymous and interchangeable and refer to treatment of disease disorder or condition by administering to the subject immune cells that have beneficial therapeutic activity in the subject. In some embodiments, the immune cells attack pathological cells. In some embodiments, the immune cells kill the pathological cells or infectious organism. In some embodiments, the immune cells are from the subject. In some embodiments, the immune cells are enhanced to increase their efficacy in inducing an immune response. In some embodiments, the immune cells have regenerating activity, repairing activity, or protective activity.

As used herein, the terms "adoptive NeuroImmunotherapy" and "NeuroImmunotherapy" are synonymous and interchangeable and refer to immunotherapy in which an immune cell is contacted with a molecule selected from a neurotransmitter or analog thereof, a neuropeptide or analog thereof, or a modulator of a voltage gated ion channel to improve its therapeutic potential and the improved immune cell is then administered to a subject in need thereof. In some embodiments, NeuroImmunotherapy is adoptive NeuroImmunotherapy. In some embodiments, NeuroImmunotherapy is cellular NeuroImmunotherapy. NeuroImmunotherapy should not be construed to be immunotherapy that is merely performed in the brain or on neurons, but rather is the treatment of immune cells with the molecules described herein. In some embodiments, the methods of the invention are for selected a molecule to use in NeuroImmunotherapy. In some embodiments, the methods of the invention are for improving or augmenting an immune cell, so it can be used in NeuroImmunotherapy. In some embodiments, the methods of the invention are for improving or augmenting an immune cell during NeuroImmunotherapy. In some embodiments, the methods of the invention are for improving or augmenting immune cell number, so the immune cells can be used in NeuroImmunotherapy. In some embodiments, the methods of the invention are for improving or augmenting immune cell number during NeuroImmunotherapy. In some embodiments, the methods of the invention are for selected a subject suitable for NeuroImmunotherapy.

As used herein, the term "therapeutic potential" refers to a cells ability to treat and or prevent a disease, disorder or pathological condition as well as improve a subject's overall condition. As used herein, the terms "immunotherapy potential" and "therapeutic immune cell potential" are synonymous and refer to the qualitative and/or quantitative therapeutic potential of a beneficial T cell to be, or to become, therapeutic toward a subject's pathology. In some embodiments, therapeutic potential comprises at least one of the ability to kill a pathological cell, the ability to kill a pathogen, the ability to proliferate, expression of CD3 zeta chain, migration, cytokine secretion, cellular adhesion and cellular homing. In some embodiments, improved therapeutic potential is at least one of improved cytotoxicity of the immune cell, improved proliferation by the immune cell, improved proliferation by the immune cell in response to a target, decreased expression of PD-1, increased CD3 zeta chain expression, increased migration, increased cytokine secretion, increased cellular adhesion and increased homing. In some embodiments, the therapeutic potential is any one of regenerating, repairing, replacing, preventing, or protecting potential or a combination thereof.

In some embodiments, decreased PD-1 expression comprises a decrease in a level of PD-1 expression on the surface of an immune cell. In some embodiments, decreased PD-1 expression comprises a decrease in the number of PD-1 expressing immune cells. In some embodiments, decreased PD-1 expression comprises a decrease in a level of PD-1 expression on the surface of an immune cell and a decrease in the number of PD-1 expressing immune cells. In some embodiments, decreased PD-1 expression comprises a decrease in a level of PD-1 expression on the surface of an immune cell or a decrease in the number of PD-1 expressing immune cells. In some embodiments, decreased PD-1 expression comprises a decrease in a level of PD-1 expression on the surface of an immune cell, a decrease in the number of PD-1 expressing immune cells or both. In some embodiments, a decrease in PD-1 function comprises decreased PD-1 function, or function of down-stream pathways or molecules coupled to PD-1 in the cell.

In some embodiments, an increase in cell death comprises an increase in apoptosis, necrosis or both. In some embodiments, an increase in cell death comprises an increase in apoptosis. In some embodiments, an increase in cell death comprises an increase in necrosis. In some embodiments, an increase in cell death comprises an increase in apoptosis and necrosis.

In some embodiments, an immune cell's therapeutic potential is its potential for treating a disease, condition, injury or wound that has, or is suspected to have, suboptimal T cell number and/or activity. In some embodiments, an immune cell's therapeutic potential is its potential for treating a disease, condition, injury or wound characterized by suboptimal T cell number and/or activity. In some embodiments, an immune cell's therapeutic potential is its potential for treating a disease, condition, injury or wound wherein a clinical benefit can be achieved by augmented T cell number and/or activity. In some embodiments, an immune cell's therapeutic potential is its potential benefit the patient in any way. Such benefits can be translated clinically to or documented by; augmented killing of the disease-causing cells or infectious organisms, or by any cure, repair, replacement, compensation for a loss or deficiency, or regeneration or prevention which improves a patient's condition.

In some embodiments, a subject in need thereof is a subject that can benefit in any way from the methods of the invention or adoptive NeuroImmunotherapy. In some embodiments, the subject suffers from a disease, condition, injury or wound that has, or is suspected to have, suboptimal T cell number and/or activity. In some embodiments, the subject suffers from a disease, condition, injury or wound that can benefit from therapeutic immune cells. In some embodiments, the subject suffers from a disease, condition, injury or wound characterized by or associated with suboptimal T cell number and/or activity. In some embodiments, the subject suffers from a disease, condition, wound or injury wherein a clinical benefit can be achieved by T cell activation. In some embodiments, the subject suffers from a disease, condition, wound or injury wherein a clinical benefit can be achieved by augmented number and/or function of beneficial T cells. As used herein, a "disease, condition, wound or injury in which there is or is suspected to be suboptimal T cell activity or number" is any disease, disorder, condition or injury which results in or is caused by the T cells of the person suffering from it being impaired in at least one T cell function and/or number. As used herein, a "disease, condition, wound or injury wherein a clinical benefit can be achieved by augmented number and/or function of beneficial T cells" is a disease that improves, in any measurable way, by activation or augmentation of beneficial T cells within the suffer of the disease. Such diseases and conditions are well known in the art and can be determined empirically by testing at least one characteristic of T cells from the subject, or by measuring T cell number either in peripheral blood or in a tissue. In some embodiments, the decreased T cell number is in peripheral blood. In some embodiments, the decreased T cell number is in a tissue. In some embodiments, the decreased T cell number is in a tissue effected by the disease, condition, wound or injury. Such tests of T cell function include but are not limited to, measuring T cell cytotoxicity of targets, measuring T cell inflammatory cytokine secretion, measuring T cell chemotaxis, measuring T cell migration ability, and measuring T cell CD3 zeta chain expression. In some embodiments, the disease, wound, injury or condition is a disease or condition that can be treated by healthy T cells. In some embodiments, the disease, condition, wound or injury is a disease or condition that can be treated by immunotherapy.

As used herein, the term "activation" refers to classical activation of T cells by their T cell receptors (TCR). In some embodiments, activation comprises co-stimulation by other receptors and/or pathways. In some embodiments, the other receptors and/or pathways are such as are known in the art. T cell activation should not be considered to include augmentation of T cell function by adoptive NeuroImmunotherapy or the methods of the invention. In some embodiments, the provided cell has not had its TCR activated. In some embodiments, the provided cell has had its TCR activated, but has then been cultured for a time sufficient for the cell to return to a resting state. In some embodiments, this occurs before contacting the immune cell with the molecules.

In some embodiments, a disease, condition, wound or injury is selected from the group consisting of: a cancer, an infectious disease, a genetic immunodeficiency, an acquired immunodeficiency, a degenerative disease, autoimmune disease, metabolic disease, genetic disease, a neurological or neuropsychiatric disease, and post-organ transplant accompanied by immune incompetence. In some embodiments, the disease is a neurological or neuropsychiatric disease. In some embodiments, the neurological or psychiatric disease or damage requires better beneficial T cell function. In some embodiments, the neurological or psychiatric disease is selected from: Alzheimer's disease, schizophrenia, coma, brain cancer, Amyotrophic Lateral Sclerosis (ALS), dementia, epilepsy, Huntington's disease, meningitis, Multiple Sclerosis (MS) and Parkinson disease. In some embodiments, the neurological damage is selected from nervous system axotomy and CNS trauma. In some embodiments, a disease, condition, wound or injury is cancer.

In some embodiments, the disease is an infectious disease. In some embodiments, the infectious disease is selected from a viral infection, a bacterial infection, and a fungal infection. In some embodiments, the disease is an immunodeficiency. In some embodiments, the immunodeficiency is an acquired immunodeficiency. In some embodiments, the immunodeficiency is a genetic immunodeficiency. In some embodiments, the immunodeficiency is a genetic immunodeficiency or an acquired immunodeficiency. In some embodiments, an immunodeficiency is selected from, T cell deficiency, severe combined immunodeficiency (SCID), Omenn syndrome, cartilage-hair hypoplasia, acquired immune deficiency syndrome (AIDS), DiGeorge syndrome, chromosomal breakage syndrome, ataxia-telangiectasia, Wiskott-Aldrich syndrome, cancer induced immunodeficiency, chemotherapy induced immunodeficiency, and glucocorticoid therapy induced immunodeficiency.

In some embodiments, the disease is an autoimmune disease. In some embodiments, the disease is an autoimmune disease in which beneficial T cells can improve a subject's condition. In some embodiments, wherein the disease is an autoimmune disease, the autoimmune cells of the subject should not be used as a beneficial immune cell. In some embodiments, wherein the disease is an autoimmune disease, the autoimmune cells of the subject can be used. In such embodiments, the autoimmune cells still have therapeutic function, such as "protective autoimmunity". As used herein, "protective autoimmunity" refers to a condition in which cell of the adoptive immune system primarily autoimmune T cells, contribute to the integrity of a tissue, or facilitate its repair, following an insult or injury, primarily to the brain and/or spinal cord.

In some embodiments, the disease is a degenerative disease. Examples of degenerative diseases include, but are not limited to, Alzheimer's disease, retinal degeneration, Parkinson's disease, macular degeneration, osteoarthritis, a muscular dystrophy, ALS, osteoporosis and heart disease.

In some embodiments, the disease is a metabolic disease. Examples of metabolic diseases include, but are not limited to, diabetes, insulin resistance, metabolic syndrome, mitochondrial disease, and glycogen storage disease.

In some embodiments, the disease is a genetic disease. Examples of genetic diseases include, but are not limited to, cystic fibrosis, Huntington's disease, down syndrome, muscular dystrophy, Gaucher's disease and thalassemia.

As used herein, a "wound" refers to any physical injury or lesion. In some embodiments, a wound is an injury whose healing comprises recruitment of immune cells or T cells to the wound site. In some embodiments, the disease, condition, injury or wound requires tissue or organ repair, replacement or regeneration, or delivery of a T cell-derived factor that would lead to therapeutic activity.

In some embodiments, the cancer is any cancer. In some embodiments, the cancer is a solid cancer. In some embodiments, the cancer is a blood cancer. In some embodiments, the cancer is any one of head and neck cancer, melanoma, ovarian cancer, prostate cancer, cervical cancer, renal-cell carcinoma, hepatic colorectal carcinoma, colorectal cancer, hepatocellular carcinoma, liver cancer, and metastases thereof. In some embodiments, the cancer is selected from hepatocellular carcinoma and other types of liver cancer. In some embodiments, the cancer is liver cancer. In some embodiments, the cancer is carcinoma. In some embodiments, the cancer is hepatocellular carcinoma. In some embodiments, the cancer is a PD-1L expressing cancer. In some embodiments, the cancer highly expressed PD-1L. In some embodiments, the subject has previously undergone a PD-1 based therapy. In some embodiments, a PD-1 based therapy is any one of: a PD-1 blocking antibody, a PD-1 ligand (PD-1L) blocking antibody, and PD-1 blockade. In some embodiments, a PD-1 based therapy is any therapy that involves the PD-1/PD-1L axis. In some embodiments, the subject was not responsive or lowly responsive to PD-1 based therapy. In some embodiments, the subject was responsive or was highly responsive to PD-1 based therapy. In some embodiments, the subject has not previously received any anti-cancer therapy. In some embodiments, the methods of the invention further comprise standard cancer therapy. In some embodiments, the methods of the invention further comprise administering another anti-cancer therapeutic. In some embodiments, the anti-cancer therapeutic is a PD-1 or PD-1L blocking antibody.

In some embodiments, the methods of the invention are performed ex vivo. In some embodiments, the methods of the invention are performed in vitro. In some embodiments, the methods of the invention are performed in vivo. In some embodiments, the methods of the invention are performed in immune cell growth media. In some embodiments, the methods of the invention are performed in a bodily fluid. In some embodiments, the methods of the invention are performed in blood. In some embodiments, the methods of the invention are performed in a solution comprising human plasma. In some embodiments, the methods of the invention are performed in a solution comprising human serum.

In some embodiments, the cocultured cancer cell is a primary cancer cell. In some embodiments, the cocultured cancer cell is from the cancer of the subject. In some embodiments, the cocultured cancer cell is a daughter or descendant cell from a primary cell from the patient's cancer. In some embodiments, the primary cell is from the subject. In some embodiments, the primary cell is from a biopsy from the subject. In some embodiments, the cocultured cancer cell is a cell of a cell line. In some embodiments, the cell line is from the same type of cancer as the cancer of the subject. In some embodiments, the cell line is a cancer cell line of another type of cancer than that of the subject. In some embodiments, the cell line is from the same tissue of origin as the cancer of the subject. In some embodiments, the cell line has similar PD-1L surface levels as the cancer of the subject. In some embodiments, in spite of the similar PD-1L surface levels the cancer cell line cells can still be eradicated in vitro by the immune cells whose activity was improved by the NeuroImmunotherapy procedure. In some embodiments, the cocultured cancer cell is unrelated to the cancer of the subject. In some embodiments, the subject does not have cancer and the ability of the immune cell to kill a cancer cell is measured. One skilled in the art will appreciate that the methods of the invention seek to determine if an immune cell has been improved in any possible way. As such any method that monitors the therapeutic potential of the immune cell can be used, if that method is unrelated to the condition of the patient. Thus, cancer killing can be measured to check therapeutic potential of the immune cells even for a subject that does not have cancer.

In some embodiments, the providing comprises extracting a bodily fluid. In some embodiments, the providing comprises isolating immune cells from a bodily fluid. Methods of immune cell isolation are well known in the art, and comprise for example, Ficol separation, centrifugation, FACS cell sorting and magnetic bead coupled antibody isolation. In some embodiments, the bodily fluid is selected from blood, serum, lymph, cerebral spinal fluid, gastric fluid, saliva, breast milk, tumor secretion, fluids extracted from a solid organ and semen. In some embodiments, the bodily fluid is blood. In some embodiments, after immune cells are isolated from a bodily fluid they are frozen for later use. In some embodiments, the providing comprises thawing frozen immune cells. In some embodiments, the immune cells are frozen before contacting with at least one molecule. In some embodiments, the methods of the invention comprise freezing the contacted immune cells before administration.

In some embodiments, CD3 positive T cells are isolated. In some embodiments, the provided immune cells are not activated. In some embodiments, the provided immune cells are not pre-activated before the contacting. In some embodiments, inactive immune cells are isolated. In some embodiments, resting immune cells are isolated. In some embodiments, naïve immune cells are isolated. In some embodiments, resting naïve inactive immune cells are isolated. In some embodiments, this activation is classical activation of the TCR. In some embodiments, the provided immune cells are activated via the TCR to induce proliferation and cell number, allowed to rest for a period of time sufficient to return the immune cells to a resting naïve state, and then treated with the at least one or at least two molecules. In some embodiments, the provided immune cells are naïve to cancer. A skilled artisan will appreciate that by isolating peripheral immune cells, such as from blood, it is assumed that the majority of immune cells isolated have not been in contact with the cancer as they have not homed to the cancer niche. In some embodiments, the methods of the invention further comprise selecting from the provided immune cells non-activated immune cells, before performing the contacting.

In some embodiments, the provided immune cells are cultured in vitro in media before the contacting. In some embodiments, the media is suitable cell culture media. In some embodiments, the media is immune cell culturing media. In some embodiments, the culturing is for at most 1 hour, 4 hours, 6 hours, 12 hours, 24 hours, 36 hours, 48 hours, 60 hours, 72 hours, 84 hours or 96 hours. Each possibility represents a separate embodiment of the invention. In some embodiments, the media is immune cell media. In some embodiments, the culturing is for a period of time sufficient to expand the immune cell population. In some embodiments, after expansion further culturing is for a period of time sufficient to bring at least 50%, 60%, 70%, 75%, 80%, 85%, 90%, 95%, 97%, 99% or 100% of the expanded immune cells to a resting, non-activated and/or naïve state. Each possibility represents a separate embodiment of the invention. In some embodiments, the further culturing is for a period of time sufficient to bring at least 50% of the expanded immune cells to a resting state. In some embodiments, the period of time sufficient to return the cells to a resting, non-activated and/or naïve state is at least 1, 2, 3, 4, 5, 6, or 7 days. Each possibility represents a separate embodiment of the invention. In some embodiments, the period of time sufficient to return the cells to a resting, non-activated or naïve state is between 1 and 3, 1 and 4, 1 and 5, 1 and 6, 1 and 7, 1 and 8, 1 and 9 and 1 and 10 days. Each possibility represents a separate embodiment of the invention. In some embodiments, the period of time sufficient to return the cells to a resting state is between 1 and 7 days.

In some embodiments, the provided immune cell is multiple provided immune cells. In some embodiments, the method further comprises selecting from the first provided immune cells a subset of immune cells. In some embodiments, the subset is T cells. In some embodiments, the subset is CD4 positive T cells. In some embodiments, the subset is CD8 positive T cells. In some embodiments, the subset is non-activated immune cells. In some embodiments, the subset is selected from: effector T cells, helper T cells, cytotoxic T cells, regulator T cells, suppressor T cells, natural killer T cell, inflammatory T cells, memory T cells, gamma delta T cells, tissue/organ-infiltrating T cells, tumor-infiltrating T cells, repairing T cells and pro-regenerative T cells, and mucosal associated T cells. As used herein, "repairing T cells" refers to a subpopulation of T cells capable of potentiating tissue repair. As used herein, "pro-regenerative T cells" refers to a subpopulation of T cells capable of potentiating tissue regeneration. In some embodiments, the tissue repair and/or regeneration is muscle repair and/or regeneration. In some embodiments, the repairing and/or pro-regenerative T cells express Foxp3 and CD4.

As used herein, a "resting state" refers to a state in which the immune cell is not presently activated. In some embodiments, a resting state is a naïve state. In some embodiments, activation is classical activation of the TCR. In some embodiments, T cell activation comprises increased surface expression of CD25 or CD69. CD69 is a very early activation marker and is detectable within hours of TCR ligation/activation, then expression is lost after 48-72 hours. CD25 is the alpha chain of the IL-2 receptor and is up regulated a bit later than CD69—it is detectable on day 1 and up regulated ~day 2 following TCR ligation. CD25 expression remains high until day 4-5 then starts to go down on day 7. By day f lit is back to baseline. In some embodiments, T cell activation comprises surface expression of at least one surface molecule selected from the group consisting of: CD25, CD69, CD44, CD137, CD154 and CD27. In some embodiments, activation comprises high surface expression of these molecules. In some embodiments, activation comprises decreased surface expression of CD62L or CCR7.

In some embodiments, the methods of the invention further comprise expanding the provided immune cells. In some embodiments, the methods of the invention further comprise expanding the provided second immune cells. In some embodiments, the expanding is preformed to increase the number of cells that will later be contacted by the molecules described herein for augmenting immunotherapeutic potential. In some embodiments, expanding the immune cells comprises stimulating the immune cells. In some embodiments, expanding the immune cells comprises stimulating the immune cells and further culturing the immune cells for a period of time such that they return to a resting state. In some embodiments, expanding the immune cells comprises stimulating the immune cells and further culturing the immune cells until they return to a resting state. In some embodiments, stimulating the immune cells comprises contacting the immune cells with a stimulating molecule selected from: a cytokine and a growth factor. In some embodiments, stimulating the immune cells comprises contacting the immune cells with at least one of an injury/wound-induced factor, a stress-induced factor, a T cell-activating enzyme, a T cell-activating ion, a viral-borne T cell-activating molecule, a bacteria-borne T cell-activating molecule. In some embodiments, the cytokine is IL-2. In some embodiments, stimulating the immune cells comprises activating the immune cells. In some embodiments, stimulating the immune cells comprises at least one of CD3 stimulation, and CD28 stimulation. In some embodiments, stimulating the immune cells comprises at least one of antigen stimulation, mitogen stimulation and cytokine stimulation. In some embodiments, the stimulating is by at least one of CD3, CD28, mitogen, a growth factor and a cytokine. In some embodiments, stimulating is not by a molecule that binds to a neurotransmitter or neuropeptide receptor. In some embodiments, stimulating is not by a molecule that binds to a voltage gated ion channel. In some embodiments, stimulating is not by a molecule that binds to a neurotransmitter or neuropeptide receptor or a voltage gated ion channel.

In some embodiments, the neurotransmitter or analog thereof is selected from: dopamine, glutamate, a dopamine receptor agonist, a dopamine receptor antagonist, a glutamate receptor agonist, a AMPA receptor agonist, a NMDA receptor agonist, a glutamate/AMPA/NMDA receptor agonist, a glutamate receptor antagonist, a AMPA receptor antagonist, a NMDA receptor antagonist, and a glutamate/AMPA/NMDA receptor antagonist. In some embodiments, the neurotransmitter or analog thereof is selected from: dopamine, glutamate, a dopamine receptor agonist, a glutamate/AMPA/NMDA receptor agonist, a glutamate/AMPA/NMDA receptor antagonist, and a dopamine receptor antagonist. In some embodiments, the neurotransmitter or analog thereof is selected from: dopamine, glutamate, a dopamine receptor agonist, and a glutamate/AMPA/NMDA receptor agonist.

In some embodiments, the neurotransmitter analog is a dopamine receptor agonist. In some embodiments, the dopamine receptor agonist is selected from a dopamine D1/5 receptor agonist, a dopamine D2 receptor agonist, a dopamine D3 receptor agonist, and a dopamine D4 receptor agonist. In some embodiments, the dopamine receptor agonist is a dopamine D115 receptor agonist. In some embodiments, the dopamine receptor agonist is a dopamine D2 receptor agonist. In some embodiments, the dopamine receptor agonist is a dopamine D3 receptor agonist. In some embodiments, the dopamine receptor agonist is a dopamine D4 receptor agonist.

In some embodiments, the dopamine D1/5 receptor agonist is selected from fenoldopam, corlopam, A77636, and SKF38393. In some embodiments, the dopamine D1/5 receptor agonist is selected from fenoldopam, A77636, and SKF38393. In some embodiments, the neurotransmitter is dopamine. In some embodiments, the dopamine D1/5 receptor agonist is fenoldopam. In some embodiments, the dopamine D1/5 receptor agonist is A77636. In some embodiments, the dopamine D1/5 receptor agonist is SKF38393.

In some embodiments, the dopamine D2 receptor agonist is sumanirole. In some embodiments, the dopamine D3 receptor agonist is selected from PD 128907 and 7-OH-DPAT. In some embodiments, the dopamine D3 receptor agonist is PD 128907. In some embodiments, the dopamine D3 receptor agonist is 7-OH-DPAT. In some embodiments, the dopamine D4 receptor agonist is selected from PD 168077 and A412997. In some embodiments, the dopamine D4 receptor agonist is PD 168077. In some embodiments, the dopamine D4 receptor agonist is A412997.

In some embodiments, the neurotransmitter analog is a dopamine receptor antagonist. In some embodiments, the dopamine receptor antagonist is selected from a dopamine D1/5 receptor antagonist, a dopamine D2 receptor antagonist, a dopamine D3 receptor antagonist, and a dopamine D4 receptor antagonist. In some embodiments, the dopamine receptor antagonist is a dopamine D1/5 receptor antagonist. In some embodiments, the dopamine receptor antagonist is a dopamine D2 receptor antagonist. In some embodiments, the dopamine receptor antagonist is a dopamine D3 receptor antagonist. In some embodiments, the dopamine receptor antagonist is a dopamine D4 receptor antagonist.

In some embodiments, the dopamine D1/5 receptor antagonist is SCH 39166. In some embodiments, the dopamine D2 receptor antagonist is L-741626. In some embodiments, the dopamine D3 receptor antagonist is NGB 2904. In some embodiments, the dopamine D4 receptor antagonist is L-741742.

In some embodiments, the neurotransmitter analog is a glutamate receptor agonist. In some embodiments, the neurotransmitter analog is a AMPA receptor agonist. In some embodiments, the neurotransmitter analog is a NMDA receptor agonist. In some embodiments, the neurotransmitter analog is a glutamate/AMPA/NMDA receptor agonist. In some embodiments, the neurotransmitter is glutamate. In some embodiments, AMPA receptor agonist is alph-amino-3-hydroxy-5-methyl-4-isoxazalepropinoic acid (AMPA). In some embodiments, the NMDA receptor agonist is N-methyl-D-aspartic acid (NMDA). In some embodiments, the glutamate receptor agonist is selected from AMPA and NMDA. In some embodiments, the glutamate/AMPA/NMDA receptor agonist is selected from AMPA and NMDA.

In some embodiments, the neurotransmitter analog is a glutamate receptor antagonist. In some embodiments, the neurotransmitter analog is a AMPA receptor antagonist. In some embodiments, the neurotransmitter analog is a NMDA receptor antagonist. In some embodiments, the neurotransmitter analog is a glutamate/AMPA/NMDA receptor antagonist. In some embodiments, the glutamate/AMPA/NMDA receptor antagonist is selected from CNQX and MK801.

In some embodiments, the neuropeptide is a G protein-coupled receptor ligand. In some embodiments, the neuropeptide is selected from GnRH-I, GnRH-II, Calcitonin gene-related peptide (CGRP), Somatostatin, and Neuropeptide Y (NPY). In some embodiments, the G protein-coupled receptor ligand is selected from GnRH-I, GnRH-II, Calcitonin gene-related peptide (CGRP), Somatostatin and NPY. In some embodiments, the neuropeptide is CGRP. In some embodiments, the neuropeptide is NPY. In some embodiments, the neuropeptide is GnRH-I, or GnRH-II. In some embodiments, the neuropeptide is GnRH-I. In some embodiments, the neuropeptide is GnRH-II. In some embodiments, the neuropeptide is Somatostatin.

In some embodiments, the neuropeptide analog is a GnRH-I receptor agonist or antagonist. In some embodiments, the neuropeptide analog is a GnRH-II receptor agonist or antagonist. In some embodiments, the neuropeptide analog is a CGRP receptor agonist or antagonist. In some embodiments, the neuropeptide analog is a Somatostatin receptor agonist or antagonist. In some embodiments, the neuropeptide analog is a NPY receptor agonist or antagonist. In some embodiments, the neuropeptide analog is selected from a GnRH-I receptor agonist or antagonist, a GnRH-II receptor agonist or antagonist, a CGRP receptor agonist or antagonist, a Somatostatin receptor agonist or antagonist, and a NPY receptor agonist or antagonist.

In some embodiments, the ion channel is selected from a sodium channel, a calcium channel a potassium channel and a chloride channel. In some embodiments, the ion channel is a potassium channel. In some embodiments, the voltage-gated potassium channel (Kv) is selected from a potassium voltage-gated channel of subfamily A, Shab-related subfamily, subfamily C, Shal-related subfamily, subfamily F, subfamily G, subfamily G, subfamily KQT, subfamily V, subfamily S, and subfamily H. In some embodiments, the voltage-gated potassium channel is a potassium voltage-gated channel of subfamily A. In some embodiments, subfamily A is also known as the Kv1 subfamily and comprises Kv1.1, Kv1.2, Kv1.3, Kv1.4, Kv1.5, Kv1.6, Kv1.7, and Kv1.8. In some embodiments, subfamily A is also known as the Kv1 subfamily and consists of Kv1.1, Kv1.2, Kv1.3, Kv1.4, Kv1.5, Kv1.6, Kv1.7, and Kv1.8. In some embodiments, the voltage-gated potassium channel is Kv1.1. In some embodiments, the ion channel is a slowly inactivating ion channel. In some embodiments, the voltage-gated potassium channel is a shaker-related channel.

In some embodiments, the modulator of a voltage gated ion channel is an ion channel blocker. In some embodiments, the modulator of a voltage gated ion channel is an ion channel opener. In some embodiments, the modulator of a voltage gated ion channel blocks the opening of the ion channel. In some embodiments, the modulator of a voltage gated ion channel opens the ion channel. In some embodiments, ion channel blocker is a voltage-gated Kv1.1 ion channel antagonist. In some embodiments, the voltage-gated Kv1.1 ion channel blocker is selected from dendrotoxin K (DTX-K) and an anti-Kv1.1 blocking antibody. In some embodiments, the voltage-gated Kv1.1 ion channel blocker is DTX-K. In some embodiments, the voltage-gated Kv1.1 ion channel blocker is an anti-Kv1.1 blocking antibody. In some embodiments, the anti-Kv1.1 blocking antibody binds the extracellular domain of Kv1.1. Non-limiting examples of such antibodies include antibody APC-161 made by Allomone Labs (Israel) and antibody GTX54875 made by GeneTex (USA).

In some embodiments, a combination of molecules is contacted. In some embodiments, the combination is at least two neurotransmitters or analogs thereof. In some embodiments, the combination is at least two neurotransmitters or analogs thereof. In some embodiments the combination is at least two modulators of a voltage-gated ion channel. In some embodiments, the combination is at least one neurotransmitters or analogs thereof, and at least one neurotransmitters or analogs thereof. In some embodiments, the combination is at least one neurotransmitters or analogs thereof, and at least one modulator of a voltage-gated ion channel. In some embodiments, the combination is at least one neuropeptide of analog thereof and at least one modulator of a voltage-gated ion channel.

In some embodiments, the combination is GnRH-II+dopamine, GnRH-II+CGRP, GnRH-II+NPY, GnRH-II+glutamate, GNRH-II+dopamine+CGRP+NPY, GNRH-II+dopamine+glutamate+CGRP+NPY, dopamine+glutamate, dopamine+somatostatin, dopamine+CGRP, dopamine+GnRH-II, dopamine+GnRH-I, dopamine+NPY, dopamine+GnRH-I+GnRH-II, dopamine+glutamate+, GnRH-I+GnRH-II+somatostatin+CGRP, dopamine+SCH 39166, dopamine+L-741626, dopamine+NGB 2904, dopamine+L-741742, MK 801+CNQX, glutamate+CGRP, or glutamate+NPY. Each possibility represents a separate embodiment of the invention.

In some embodiments, the contacted molecule is at a very low concentration. In some embodiments, the concentration of the contacted molecule is not more than $10^{-5}$ molar (M), $0.5\times10^{-5}$ M, $10^{-6}$ M, $0.5\times10^{-6}$ M, $10^{-7}$ M, $0.5\times10^{-7}$ M, or $10^{-8}$ M. Each possibility represents a separate embodiment of the invention. In some embodiments, the concentration of the contacted molecule is about $10^{-5}$ M, $0.5\times10^{-5}$ M, $10^{-6}$ M, $0.5\times10^{-6}$ M, $10^{-7}$ M, $0.5\times10^{-7}$ M, or $10^{-8}$ M. Each possibility represents a separate embodiment of the invention. In some embodiments, the concentration of the contacted molecule is between $10^{-5}$ M and $10^{-9}$ M, $0.5\times10^{-5}$ M and $10^{-9}$ M, $10^{-6}$ M and $10^{-9}$ M, $0.5\times10^{-6}$ M and $10^{-9}$ M, $10^{-7}$ M and $10^{-9}$ M, $0.5\times10^{-7}$ M and $10^{-9}$ M, $10^{-8}$ and $10^{-9}$, $10^{-5}$ M and $0.5\times10^{-8}$ M, $0.5\times10^{-5}$ M and $0.5\times10^{-8}$ M, $10^{-6}$ M and $0.5\times10^{-8}$ M, $0.5\times10^{-6}$ M and $0.5\times10^{-8}$ M, $10^{-7}$ M and $0.5\times10^{-8}$ M, $0.5\times10^{-7}$ M and $0.5\times10^{-8}$ M, $10^{-8}$ and $0.5\times10^{-8}$, $10^{-5}$ M and $10^{-8}$ M, $0.5\times10^{-5}$ M and $10^{-8}$ M, $10^{-6}$ M and $10^{-8}$ M, $0.5\times10^{-6}$ M and $10^{-8}$ M, $10^{-7}$ M and $10^{-8}$ M, or $0.5\times10^{-7}$ M and $10^{-8}$ M. Each possibility represents a separate embodiment of the invention.

In some embodiments, the contacting is incubating the immune cell with the molecule or combination of molecules. In some embodiments, the incubating is for a time sufficient to decrease PD-1 expression on the surface of the immune cell. In some embodiments, the incubation is for at least 30 seconds, 1, 3, 5, 10, 15, 20, 25, 30, 45 minutes, 1, 2, 4, 6, 12, 24, 36, 48, 60, 72, 84 or 96 hours. Each possibility represents a separate embodiment of the invention. In some embodiments, the incubation is for not more than 30 seconds, 1, 3, 5, 10, 15, 20, 25, 30, 45 minutes, 1, 2, 4, 6, 12, 24, 36, 48, 60, 72, 84 or 96 hours. Each possibility represents a separate embodiment of the invention. In some embodiments, the contacting is for between 30 seconds and 30 minutes. In some embodiments, the contacting is for between 30 seconds and 60 minutes. In some embodiments, the contacting is for between 30 minutes and 60 minutes. In some embodiments, the contacting is for at least 1 day. In some embodiments, the contacting is for at least 2 days. In some embodiments, the contacting is for at most 60 hours.

In some embodiments, the first provided immune cells are divided and cultured separately. In some embodiments, the separately cultured cells are contacted by different molecules or combinations of molecules. In some embodiments, the molecule or combination of molecules that affects the largest increase or decrease is selected. In some embodiments, the molecule or combination of molecules that affect the largest improvement in therapeutic potential is selected. In some embodiments, the separately cultured cells are contacted for different amounts of time. In some embodiments, the incubation time that affects the largest increase or decrease is selected. In some embodiments, the incubation time that affect the largest improvement in therapeutic potential is selected.

In some embodiments, the second provided immune cells are divided and cultured separately. In some embodiments, the separately cultured cells are contacted by different molecules or combinations of molecules. In some embodiments, the separately cultured cells are contacted for different amounts of time. In some embodiments, the separately contacted cells are administered to the subject sequentially. In some embodiments, the gap between each administration is at most 1, 5, 10, 15, 20 25, 30, 35, 40, 45, 50, 55, or 60 minutes. Each possibility represents a separate embodiment of the invention. In some embodiments, administering comprises repeated administering of more contacted immune cells. In some embodiments, administering comprises administering indefinitely.

In some embodiments, the methods of the invention are performed more than once to the same subject over an interval of time. In some embodiments, the subject receives immune cells that were contacted with one molecule or combination of molecules at one administration and an immune cell contacted with a different molecule or combination of molecules at a second administration. In some embodiments, the interval between performance of the methods of the invention is at least 1 day, 2 days, 3 days, 1 week, 2 weeks, 1 month, 2 months, or 3 months. Each possibility represents a separate embodiment of the invention. In some embodiments, the subject is treated at least once a year, twice a year, once every six months, once every three months, once every other month, one a month, twice a month, once a week, or twice a week. Each possibility represents a separate embodiment of the invention. In some embodiments, the subject is treated twice a week.

In some embodiments, only one molecule is contacted. In some embodiments, at least two molecules are contacted. In some embodiments, the contacting occurs in vitro. In some embodiments, the contacting occurs prior to the cell's administration to the subject. In some embodiments, the measuring in step c. further comprises measuring at least one of iv. proliferation of the immune cell alone in culture;
v. expression of CD3 zeta-chain in the immune cell;
vi. migration of the immune cell;
vii. adhesion of the immune cell;
viii. homing of the immune cell;
ix. penetration of the immune cell;
x. secretion of cytokines by said immune cell;
xi. secretion of therapeutic proteins by said immune cell; and
xii. expression levels and functional levels in the immune cell of at least one protein or gene involved in the processes of i to xi;

and wherein at least one of an increase in proliferation, an increase in zeta-chain expression, an increase in migration, an increase in adhesion, an increase in homing, an increase in penetration, an increase in cytokine secretion, an increase in secretion of therapeutic proteins, a decrease in expression or function of at least one protein and gene involved in the process of i, or an increase in expression or function of at least one protein and gene involved in the process of ii to xi, indicates the molecule or combination of molecules improves therapeutic potential of the immune cell. In some embodiments, the methods of the invention comprise measuring PD-1 cell surface expression on an immune cell and measuring at least one of: proliferation of the immune cells in coculture with a cancerous cell associated with the cancer, cell death of cancerous cells associated with the cancer in coculture with the immune cells, proliferation of the immune cells alone in culture, zeta-chain expression in the immune cells, chemotactic migration of the immune cells, cytokine secretion by the immune cells, adhesion of the immune cells and homing or migration of the immune cells.

In some embodiments, the administering of contacted immune cells comprises administering at least $10^{-6}$, $5\times10^{-6}$, $10^{-7}$, $5\times10^{-7}$, $10^{-8}$, $5\times10^{-8}$ or $10^{-9}$ immune cells. Each possibility represents a separate embodiment of the invention. In some embodiments, the administering of contacted immune cells comprises administering at least $10^{-8}$ immune cells. In some embodiments, the administering of contacted immune cells comprises administering about $10^{-8}$ immune cells. In some embodiments, the administering of contacted immune cells comprises administering between $10^{-6}$ and $10^{-10}$, $2\times10^{-6}$ and $10^{-10}$, $5\times10^{-6}$ and $10^{-10}$, $7\times10^{-6}$ and $10^{-10}$, $10^{-7}$ and $10^{-10}$, $5\times10^{-7}$ and $10^{-10}$, $10^{-8}$ and $10^{-10}$, $5\times10^{-8}$ and $10^{-10}$, $10^{-6}$ and $10^{-9}$, $2\times10^{-6}$ and $10^{-9}$, $5\times10^{-6}$ and $10^{-9}$, $7\times10^{-6}$ and $10^{-9}$, $10^{-7}$ and $10^{-9}$, $5\times10^{-7}$ and $10^{-9}$, $10^{-8}$ and $10^{-9}$, or $5\times10^{-8}$ and $10^{-9}$ immune cells. Each possibility represents a separate embodiment of the invention. In some embodiments, about $10^{-8}$ contacted immune cells are administered twice a week. In some embodiments, the administering comprises selecting the most beneficial immune cells, and/or the immune cells with the highest immunotherapeutic potential to a given subject and administering the selected cells to the subject. In some embodiments, effector cells and not regulator cells are administered. In some embodiments, effector T cells and not regulator T cells are administered. In some embodiments, regulatory and not effector cells are administered. In some embodiments, the adoptive NeuroImmunotherapy is continued for the life of the patient. In some embodiments, the adoptive NeuroImmunotherapy is continued indefinitely. In some embodiments, the adoptive NeuroImmunotherapy is continued for as long as it is beneficial to the subject. In some embodiments, the adoptive NeuroImmunotherapy is performed prophylactically. In some embodiments, the adoptive NeuroImmunotherapy is performed to prevent reoccurrence.

In some embodiments, the provided immune cells are in cell culture media comprising human serum or plasma. In some embodiments, the human is the subject. In some embodiments, the human serum or plasma underwent a process of heat inactivation prior to being added to the media. In some embodiments, the human is a relative of the subject. In some embodiments, the human is allogenic to the subject. In some embodiments, the plasma or serum is allogenic to the provided immune cells. In some embodiments, the plasma or serum is autologous to the provided immune cells. In some embodiments, in any of the steps of the invention the media used for in vitro cell culture or coculture contains human serum or plasma. In some embodiments, the cell culture media contains fetal calf serum (FCS). In some embodiments, the FCS in the media has been replaced by human serum or plasma. In some embodiments, the human serum or plasma is the subject's serum or plasma. In some embodiments, all of the FCS, some of the FCS or a majority of the FCS has been replaced. Each possibility represents a separate embodiment of the invention. In some embodiments, the contacting occurs in media comprising the human serum or plasma. In some embodiments, the measuring occurs in media comprises human serum or plasma. In some embodiments, the contacted-immune cells are administered in a composition comprising the human serum or plasma. In some embodiments, all steps of the method are performed in media comprising human serum or plasma. In some embodiments, the cells are frozen, and the freezing media comprises human serum or plasma.

In some embodiments, the treating is first-line treatment of the disease or condition. In some embodiments, the subject has not received treatment for the disease or condition prior to the performance of the methods of the invention. In some embodiments, the subject has received treatment for the disease, condition, injury or wound before being treated with the methods of the invention. In some embodiments, the subject has already received a PD-1 based therapy. In some embodiments, the PD-1 based therapy is a checkpoint inhibitor. In some embodiments, the checkpoint inhibitor is an anti-PD-1 or anti PD-1L antibody. In some embodiments, the PD-abased therapy comprises other PD-1/PD-1L targeted therapies. In some embodiments, the administering comprises administering another therapy. In some embodiments, the other therapy is any treatment for any of the diseases, conditions, injuries, or wounds that are treated with the methods of the invention. In some embodiments, the other therapy does not target PD-1 or PD-1L. In some embodiments, the other therapy is an anti-cancer therapy. In some embodiments, the methods of the invention further comprise administering another therapy. In some embodiments, the other therapy is standard therapy for the disease or condition. One skilled in the art will appreciate that the standard care for a disease will depend on many factors such as the type of disease, the stage/severity of the disease, the age and health of the patients and other information as may be available to the physician at the time of treatment.

In some embodiments, administering comprises administering a pharmaceutical composition comprising the contacted cells. In some embodiments, the pharmaceutical composition comprises a therapeutically effective amount of the contacted cells. In some embodiments, the pharmaceutical composition comprises a carrier, excipient or adjuvant.

As used herein, the terms "administering", "administration" and like terms refer to any method which, in sound medical practice, delivers a composition containing an active agent to a subject in such a manner as to provide a therapeutic effect. One aspect of the present subject matter provides for intravenous administration of a therapeutically effective amount of augmented NeuroImmunotherapeutic immune cells to a subject in need thereof. Other suitable routes of administration can include parenteral, subcutaneous, intracranial, intramuscular, intratumor, oral, topical, intravesical, intraspinal or intraperitoneal. In some embodiments, the administration is to a site of the disease, condition or injury. In some embodiments, the administration is to more than one site. In some embodiments, the administration is sequential to more than one site. In some embodiments, the administration is by at least one of the following methods: intravenous, parenteral, subcutaneous, intracranial, intramuscular, intratumor or intraperitoneal. In some embodiments, multiple administrations of immune cells are administered to multiple locations or by multiple avenues. The dosage administered will be dependent upon the age, health, and weight of the recipient, type and severity/stage of the disease, kind of concurrent treatment, if any, frequency of treatment, and the nature of the effect desired. In some embodiments, administering comprises at least one of intravenous administration, intramuscular administration, intranasal administration, intrathecal administration, intrastriatal administration, intracranial administration, intraarterial administration, intratumor administration and subcutaneous administration. In some embodiments, the contacted cells are administered by at least one mode of administration. In some embodiments, the contacted cells are administered by multiple modes of administration sequentially. In some embodiments, the sequential administration is to at least one site in the subject and by at least one mode of administration.

The term "therapeutically effective amount" refers to an amount of a drug effective to treat a disease or disorder in a mammal. In some embodiments, a therapeutically effective amount is an amount effective, at dosages and for periods of time necessary, to achieve the desired therapeutic or prophylactic result. The exact dosage form and regimen would be determined by the physician according to the patient's condition.

As used herein, the term "carrier," "excipient," or "adjuvant" refers to any component of a pharmaceutical composition that is not the active agent. As used herein, the term "pharmaceutically acceptable carrier" refers to a non-toxic, inert solid, semi-solid liquid filler, diluent, encapsulating material, formulation auxiliary of any type, or simply a sterile aqueous medium, such as saline. Some examples of the materials that can serve as pharmaceutically acceptable carriers are sugars, such as lactose, glucose and sucrose, starches such as corn starch and potato starch, cellulose and its derivatives such as sodium carboxymethyl cellulose, ethyl cellulose and cellulose acetate; powdered tragacanth; malt, gelatin, talc; excipients such as cocoa butter and suppository waxes; oils such as peanut oil, cottonseed oil, safflower oil, sesame oil, olive oil, corn oil and soybean oil; glycols, such as propylene glycol, polyols such as glycerin, sorbitol, mannitol and polyethylene glycol; esters such as ethyl oleate and ethyl laurate, agar; buffering agents such as magnesium hydroxide and aluminum hydroxide; alginic acid; pyrogen-free water; isotonic saline, Ringer's solution; ethyl alcohol and phosphate buffer solutions, as well as other non-toxic compatible substances used in pharmaceutical formulations.

The carrier may comprise, in total, from about 0.1% to about 99.99999% by weight of the pharmaceutical compositions presented herein.

It should be noted that the contacted immune cells can be administered as a composition and can be administered alone or as an active ingredient in combination with pharmaceutically acceptable carriers, diluents, adjuvants, and vehicles. The composition can also be administered subcutaneously, or parenterally including intravenous, intraarterial, intramuscular, intratumor, intraperitoneal, intratonsillar, and intranasal administration as well as intrathecal and infusion techniques. Implants of the compositions are also useful. The patient being treated is a warm-blooded animal and, in particular, mammals including man. The pharmaceutically acceptable carriers, diluents, adjuvants, and vehicles as well as implant carriers generally refer to inert, non-toxic solid or liquid fillers, diluents or encapsulating material not reacting with the active ingredients of the invention.

The doses can be single doses or multiple doses over a period of several days, weeks, months or even years or for as long as it is beneficial to the subject. The treatment generally has a length proportional to the length of the disease process and treatment effectiveness and the patient species being treated.

By another aspect, there is provided a pharmaceutical composition comprising the improved NeuroImmunotherapeutic immune cells of the invention and a pharmaceutically acceptable carrier, adjuvant or excipient By another aspect, there is provided a method of adoptive cell therapy comprising administering to a subject in need thereof at least $10^8$ immune cells. By another aspect, there is provided use of at least $10^8$ immune cells for adoptive cell therapy. In some embodiments, the immune cells are administered twice a week. In some embodiments, the therapy is continued for the life of the patient. In some embodiments, the immune cells are administered indefinitely. In some embodiments, the adoptive cell therapy is improved immune cell therapy. In some embodiments, the improved immune cell therapy comprises any of the treatment methods of the invention.

By another aspect, there is provided a method of selecting a subject suitable for immunotherapy, the method comprising,
  a. providing a healthy immune cell;
  b. contacting the healthy immune cell with plasma or serum from the subject; and
  c. measuring survival of the immune cell;
wherein a decrease in survival of the immune cell indicates the subject is suitable for immunotherapy. In some embodiments, the method is performed in vitro.

In some embodiments, the subject suffers from a disease, condition, wound or injury in which there is, or is suspected to be, suboptimal T cell activity and/or number. In some embodiments, the subject suffers from a disease wherein a clinical benefit can be achieved by augmenting beneficial T cell number and/or function. In some embodiments, the subject suffers from a disease characterized by suboptimal T cell activity and/or number. In some embodiments, the subject suffers from cancer.

In some embodiments, the contacting comprises culturing the healthy immune cell in cell culture media comprising plasma or serum of the subject. In some embodiments, the contacting comprises culturing the healthy immune cell in media in which the FCS is replaced with plasma or serum of the subject. In some embodiments, all the FCS is replaced. In some embodiments, at least 10, 20, 30, 40, 50, 60, 70, 80, 90, 95, 97, or 99% of the serum is replaced. Each possibility represents a separate embodiment of the invention. In some embodiments, the human serum or plasma was heat inactivated prior to addition to the cell culture media.

In some embodiments, a decrease in survival of the immune cell is as compared to a healthy immune cell not contacted with plasma or serum of the subject. In some embodiments, a decrease in survival is as compared to a healthy immune cell grown in culture with media containing FCS and no plasma or serum of the subject. In some embodiments, a decrease in survival is as compared to a healthy immune cell grown in culture with media containing plasma or serum of a healthy donor.

By another aspect, there is provided a method of storing immune cells for adoptive cell therapy the method comprising culturing or freezing immune cells in media comprising human serum or plasma. By another aspect, there is provided a method of storing immune cells for immunotherapy the method comprising culturing or freezing immune cells in media comprising human serum or plasma.

By another aspect, there is provided a method of selecting a subject suitable for immunotherapy, the method comprising:
a. providing an immune cell;
b. culturing the immune cell in media comprising plasma or serum from the subject;
c. monitoring survival of the immune cell;
wherein a decrease in survival of the immune cell indicates the subject is suitable for immunotherapy.

In some embodiments, the decrease in survival is as compared to survival of the immune cell culture in media not comprising plasma or serum of the subject. In some embodiments, the media not comprising the plasma or serum of the subject comprises FCS. In some embodiments, the media not comprising the plasma or serum of the subject comprises plasma or serum from an allogenic healthy subject. In some embodiments, the provided immune cell is from a healthy donor. In some embodiments, the provided immune cell is from the subject. In some embodiments, the immune cell is a large proliferating immune cell.

In some embodiments, the immune cell is multiple immune cells, and the decrease in survival comprises at least a 20%, 25%, 30%, 35%, 40%, 45%, or 50% reduction in the number of surviving immune cells. Each possibility represents a separate embodiment of the invention. In some embodiments, the decrease in survival is at least a 30% reduction in the number of surviving cells. In some embodiments, the decrease in survival is at least a 50% reduction in the number of surviving cells.

By another aspect, there is provided a method of immunotherapy in a subject in need thereof, the method comprising:
a. providing an immune cell of the subject;
b. culturing the immune cell in media comprising plasma or serum of a healthy allogenic individual;
c. returning the cultured immune cell back to the subject;
thereby performing immunotherapy in the subject in need thereof.

By another aspect, there is provided a use of an immune cell culture in media comprising plasma or serum from a healthy individual for immunotherapy in a subject in need thereof. In some embodiments, the healthy individual is allogenic to the subject.

In some embodiments, the immunotherapy is adoptive NeuroImmunotherapy. In some embodiments, the adoptive cell therapy is adoptive NeuroImmunotherapy. In some embodiments, the immunotherapy is any immunotherapy. In some embodiments, the NeuroImmunotherapy comprises any of the methods of the invention.

In some embodiments, the immune cells are in media comprising human serum or plasma. In some embodiments, the human is the subject. In some embodiments, the human is a relative of the subject. In some embodiments, the human is allogenic to the subject. In some embodiments, the plasma or serum is allogenic to the immune cells. In some embodiments, the plasma or serum is autologous to the immune cells. In some embodiments, the fetal calf serum (FCS) in the media has been replaced by human serum or plasma. In some embodiments, the human serum or plasma is the subject's serum or plasma. In some embodiments, all of the FCS, some of the FCS or a majority of the FCS has been replaced. Each possibility represents a separate embodiment of the invention. In some embodiments, the FCS, human serum or plasma underwent heat inactivation.

In some embodiments, the human plasma or serum is from the subject that provided the immune cells. In some embodiments, the human plasma or serum is from a healthy allogenic individual.

In some embodiments, the culturing is for at least 1, 2, 3, 4, 5, 6, 7, 8, or 9 days. Each possibility represents a separate embodiment of the invention. In some embodiments, the culturing is for between 2.5 and 9, 2.5 and 8, 2.5 and 7 or 2.5 and 6 days. Each possibility represents a separate embodiment of the invention. In some embodiments, the culturing is for at least 2.5 days. In some embodiments, the culturing is for at least 6 days. In some embodiments, the culturing is for at least 2.5 days and the decrease in survival of the immune cells is at least 30%. In some embodiments, the culturing is for at least 6 days and the decrease in survival of the immune cells is at least 50%.

Kits

By another aspect, there is provided a kit comprising at least one neurotransmitter or analog thereof, at least one neuropeptide or analog thereof and at least one modulator of a voltage gated ion channel. By another aspect, there is provided a kit comprising at least one neurotransmitter or analog thereof, and at least one neuropeptide and analog thereof, and combinations of the at least one neuropeptide and at least one neurotransmitter.

By another aspect, there is provided a kit comprising a PD-1 detecting agent and at least one molecule selected from a neurotransmitter or analog thereof, a neuropeptide or mimic thereof, or a modulator of a voltage gated ion channel.

In some embodiments, the kit is for use in selecting a molecule for increasing suitability of immune cells for adoptive NeuroImmunotherapy. In some embodiments, the kit is for use in selecting a molecule for increasing therapeutic immune cell potential. In some embodiments, the kit is for use in improving immune cell function during immunotherapy. In some embodiments, the kit is for use in improving immune cell function for immunotherapy. In some embodiments, the kit is for use in determining if a subject in need thereof is suitable for adoptive NeuroImmunotherapy. In some embodiments, the kit is for use in treating, preventing or preventing reoccurrence of a disease, wound, injury or condition that has, or is suspected to have, suboptimal T cell activity and/or number in a subject in need thereof. In some embodiments, the kit is for use in repairing, regenerating or compensating for a loss or deficiency due to the disease, would, injury or condition. In some embodiments, the kit is for use in revealing and selecting which of the molecules or their combinations induce the greatest beneficial effects on a subject's immune cells, and thereby improve/augment the immunotherapeutic potential for the subject.

In some embodiments, the PD-1 detecting agent is not a PD-1 inhibitor. In some embodiments, the PD-1 detecting agent comprises an anti-PD-1 antibody. In some embodiments, the PD-1 detecting agent is an anti-PD-1 antibody. In some embodiments, the anti-PD-1 antibody is not a PD-1 blocking antibody. In some embodiments, the PD-1 detecting agent comprises a tag. In some embodiments, the tag is a fluorescent tag. In some embodiments, the anti-PD-1 antibody is a FACS antibody. In some embodiments, the PD-1 detecting agent is a PD-1 sensor which is not an antibody.

In some embodiments, the kit comprises at least 2, 3, 4, 5, 6, 7, 8, 9 or 10 molecules. Each possibility represents a separate embodiment of the invention. In some embodiments, the kit comprises at least 2 neurotransmitters or analogs thereof. In some embodiments, the kit comprises at least 2 neuropeptides or mimics thereof. In some embodiments, the kit comprises at least one neurotransmitter or analog thereof and one neuropeptide or mimic thereof. In some embodiments, the kit comprises at least one neurotransmitter or analog thereof and one modulator of a voltage gated ion channel. In some embodiments, the kit comprises at least one neuropeptide or mimic thereof and one modulator of a voltage gated ion channel. In some embodiments, the kit comprises at least two of a neurotransmitter or analog thereof, a neuropeptide or mimic thereof, or a modulator of a voltage gated ion channel and wherein the two are from different categories. Examples and embodiments of the molecules that may be used for the kits of the invention can be found hereinabove. In some embodiments, the kit comprises a neurotransmitter or neurotransmitter agonist, a neurotransmitter antagonist, a neuropeptide or neuropeptide agonist, a neuropeptide antagonist, and a modulator of a voltage-gated ion channel. In some embodiments, the kit comprises a neurotransmitter or neurotransmitter agonist, a neurotransmitter antagonist, a neuropeptide or neuropeptide agonist and a voltage gated ion channel blocker.

In some embodiments, the molecules in the kit are provided at a concentration of at most $10^{-7}$ M. In some embodiments, the molecule in the kit are provided at a concentration described herein that is suitable for performing the methods of the invention. In some embodiments, combinations of the molecules described herein are provided. In some embodiments, a combination is a mixture of the molecules. In some embodiments, at least two neurotransmitters or analogs thereof are mixed. In some embodiments, at least two neuropeptides or analogs thereof are mixed. In some embodiments, at least one neurotransmitter or analog thereof, at least one neuropeptide or analog thereof and at least one modulator of a voltage-gated ion channel are mixed.

In some embodiments, a kit of the invention further comprises a tissue culture plate, wherein a separate well of the plate contains a separate molecule or combination of molecules. Such a plate could be used for rapid testing of the most beneficial molecule/s, as cells in media could be pipetted into each well which already contains the molecule to be tested and at the proper concentration. The most beneficial molecule/s would be the ones that induce the best beneficial effects on a subject's immune cells, or on the immune cells of a non-subject donor and would increase their therapeutic potential for the subject. As very low concentrations of molecules are used, and as the molecules need to be prepared each time freshly in the desired concentration from frozen stocks of high concentration or from lyophilized powder, it can be difficult and time consuming to add each time the proper amount to a small tissue culture well. A skilled artisan will appreciate the benefit of having wells preloaded with the molecules. In some embodiments, the wells are individually sealed. In some embodiments, the molecules at the right amount are adhered to a wall of the well so as not to be lost upon opening the dish. In some embodiments, the molecules are provided as a film that is in the well that can dissolve in media to reach the desired concentration but does not aerosolize. In some embodiments, the molecules can be provided in the well in any manner that assures that the molecules will not be lost, or the concentration of the molecules changed, but that will allow the molecules to dissolve and disperse into media when it is added to the well in order to reach the desired concentration. In some embodiments, the molecules may be configured such that they are retained on the walls of the well and do not disperse into media. In some embodiments, the molecules are anchored or imbedded or in any other way tethered to the walls and do not disperse into media. In some embodiments, the molecules at the right concentration are on or in a carrier that upon contact with the media or desired buffer releases the molecules into the media or buffer. Examples of such a carrier could be filter paper, or cellulose, or any carrier from which the molecules can dissociate.

In some embodiments, the kit consists of or comprises the following molecules and combinations: dopamine, dopamine+glutamate, dopamine+GnRH-II, dopamine+NPY, dopamine+somatostatin, dopamine+CGRP, glutamate, glutamate+GnRH-II, glutamate+NPY, glutamate+somatostatin, glutamate+CGRP, GnRH-II, GnRH-II+NPY, GnRH-II+somatostatin, GnRH-II+CGRP, NPY, NPY+somatostatin, NPY+CGRP, somatostatin, somatostatin+CGRP, CGRP, and dopamine+glutamate+GnRH-II+NPY+somatostatin+CGRP.

As used herein, the term "about" when combined with a value refers to plus and minus 10% of the reference value. For example, a length of about 1000 nanometers (nm) refers to a length of 1000 nm+−100 nm.

It is noted that as used herein and in the appended claims, the singular forms "a," "an," and "the" include plural referents unless the context clearly dictates otherwise. Thus, for example, reference to "a polynucleotide" includes a plurality of such polynucleotides and reference to "the polypeptide" includes reference to one or more polypeptides and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. All combinations of the embodiments pertaining to the invention are specifically embraced by the present invention and are disclosed herein just as if each and every combination was individually and explicitly disclosed. In addition, all sub-combinations of the various embodiments and elements thereof are also specifically embraced by the present invention and are disclosed herein just as if each and every such sub-combination was individually and explicitly disclosed herein.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

Various embodiments and aspects of the present invention as delineated hereinabove and as claimed in the claims section below find experimental support in the following examples.

EXAMPLES

Generally, the nomenclature used herein and the laboratory procedures utilized in the present invention include molecular, biochemical, microbiological, and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994 Mishell and Shiigi (eds)), "Strategies for Protein Purification and Characterization—A Laboratory Course Manual" CSHL Press (1996); all of which are incorporated by reference. Other general references are provided throughout this document.

Example 1: Neurotransmitters Reduce PD-1 Expression in T Cells of Healthy Donors Peripheral blood lymphocytes (PBLs) were separated from normal human leukocytes of healthy donors by Ficol separation and CD3 positive T cells were separated by anti-CD3 antibody-coupled magnetic beads. The CD3+ T cells were cultured in RPMI 1640 medium supplemented with 10% heat inactivated fetal calf serum (FCS), 1% L-Glutamine, 1% sodium pyruvate, 1% non-essential amino acids, and 1% antibiotics. The cells were usually maintained for, for on average 24 hours after their separation before various molecules were added and their effects on the T cells were measured. Many tumors are able to evade immune surveillance by expressing PD-1 ligand (PD-1L). PD-1L binds to PD-1 expressed on T cells and by so doing does not allow the T cells to become activated, functional, and attach the cancer cells. It was therefore tested if neurotransmitters, neuropeptides, and/or modulators of voltage-gated ion channels can reduce PD-1 on the cell surface of T cells. Such a reduction would allow the T cells to escape the tumor-induced T cell suppression, and the activated T cells could then attach the cancer cells. As such, the expression of PD-1 on the surface of these treated and untreated T cells was monitored. The results from treatment with the neurotransmitters for 1 hour (Table 1), 18 hours (Table 2) and 24 hours (Table 3) on PD-1 surface expression are provided. Every neurotransmitter tested produced a reduction in both the total expression level of PD-1 on the surface of the T cells, as well as in the total number of PD-1 expressing T cells, however, depending on the neurotransmitter, the optimal concentration and duration of treatment varied. For instance, Dopamine D4 receptor agonist PD168077 at a concentration of $10^{-7}$ M induced its greatest reduction in mean percentage of PD-1 expressing T cells after 24 hours of treatment. By contrast, Glutamate produced a stronger effect after shorter treatment times (33.0 vs. 20.2% reduction, 1 vs. 24 hours at $10^{-8}$ M; 31.7 vs. 22.64, 18 vs. 24 hours at $10^{-7}$M). Indeed, there were cases in which neurotransmitters or their receptor agonists (Dopamine, Fenoldopam, SKF38393) caused a strong reduction at lower incubation times but did not have a positive effect when incubated for 24 hours. Shorter in vitro incubation times are frequently preferable when cells are going to subsequently be returned to a subject, as they end to decrease the risk of an adverse reaction. These results demonstrate, that treatment with neurotransmitters, neurotransmitter receptor agonists, and molecules that block the Kv1.1 ion channel, are effective in reducing surface PD-1 expression in T cells and reducing the number of PD-1 expressing T cells, and also that PD-1 expression can be used as an effective readout for optimizing enhancement or activation of T cells.

TABLE 1

Effect of neurotransmitters, neurotransmitter receptor agonists, and modulators of the Kv1.1 ion channel treatment (1 Hr) on percentage of PD-1 expressing CD3+ normal human T cells

| Treatment | % of T cells expressing PD-1 | % reduction in % of T cells expressing PD-1 |
|---|---|---|
| Untreated | 36.4% | |
| Dopamine $10^{-8}$M | 30.3% | 17% |
| A77636 - Dopamine D1/5 receptor agonist -$10^{-8}$M | 27.25% | 25% |
| SKF38393 - Dopamine D1/5 receptor agonist - $10^{-8}$M | 26.2% | 28% |
| Sumanirole - Dopamine D2 receptor agonist - $10^{-8}$M | 25.65% | 30% |
| 7-OH- DPAT - Dopamine D3 receptor agonist - $10^{-8}$M | 21.65% | 42% |
| PD 128907 - Dopamine D3 receptor agonist - $10^{-8}$M | 26.15% | 29% |
| PD168077 - Dopamine D4 receptor agonist - $10^{-8}$M | 15.1% | 59% |
| A412997 - Dopamine D4 receptor agonist - $10^{-8}$M | 17.4% | 52% |
| Glutamate - $10^{-8}$M | 24.65% | 33% |
| AMPA - Glutamate AMPA receptor agonist - $10^{-8}$M | 26.4% | 28% |
| NMDA - Glutamate NMDA receptor agonist - $10^{-8}$M | 30.35% | 17% |
| GnRH-I - $10^{-8}$M | 34.27% | 6% |
| GnRH-II - $10^{-8}$M | 31.6% | 14% |
| Dopamine + Glutamate + GnRH-I - all at $10^{-8}$M | 14.5% | 62% |
| Dopamine + Glutamate + GnRH-II - all at $10^{-8}$M | 15.75% | 57% |
| Dopamine + Glutamate - both at $10^{-8}$M | 24.9% | 32% |
| Dopamine + GnRH-II - both at $10^{-8}$M | 27.3% | 25% |
| Glutamate + GnRH-II - both at $10^{-8}$M | 25.85% | 29% |
| Dendrotoxin K - Blocker of Kv1.1 voltage-gated K channels - $10^{-8}$M | 34.6% | 25% |
| Anti-Kv1.1 antibody - 1:100 of original stock | 17.45% | 57% |

TABLE 2

Effect of neurotransmitters, neurotransmitter receptor agonists, and modulators of the Kv1.1 ion channel treatment (18 Hr) on percentage of PD-1 expressing CD3+ normal human T cells

| Treatment | % of T cells expressing PD-1 | % reduction in % of T cells expressing PD-1 |
|---|---|---|
| Untreated | 34.70% | |
| Dopamine $10^{-7}$M | 24.90% | 28.40% |
| Fenoldopam - Corlopam, selective dopamine D1/5 receptor agonist, $10^{-7}$M | 27.87% | 19.74% |
| Fenoldopam (powder), selective dopamine D1/5 receptor agonist, $10^{-7}$M | 25.75% | 25.79% |
| A77636, selective dopamine D1/5 receptor agonist, $10^{-7}$M | 27.10% | 21.90% |
| SKF38393, selective dopamine D1/5 receptor agonist, $10^{-7}$M | 26.40% | 23.90% |
| Sumanirole, selective dopamine D2 receptor agonist, $10^{-7}$M | 26.15% | 24.64% |
| PD 128907, selective dopamine D3 receptor agonist, $10^{-7}$M | 27.25% | 21.47% |
| PD 168077, selective dopamine D4 receptor agonist, $10^{-7}$M | 24% | 30.84% |
| Glutamate $10^{-7}$M | 23.70% | 31.70% |
| AMPA, selective glutamate/AMPA receptor agonist, $10^{-7}$M | 28.55% | 17.72% |
| NMDA, selective glutamate/NMDA receptor agonist, $10^{-7}$M | 24.75% | 28.67% |
| Dendrotoxin K (DTX-K), a selective blocker of voltage-gated Kv1.1 ion channels, $10^{-7}$M | 23.30% | 32.85% |
| Anti Kv1.1 antibody that blocks that voltage-gated Kv1.1 ion channels, (1:100 of original stock) | 24.45% | 29.54% |

TABLE 3

Effect of neurotransmitters, neurotransmitter receptor agonists, and modulators of the Kv1.1 ion channel treatment (24 Hr) on percentage of PD-1 expressing CD3+ normal human T cells

| Treatment | % of T cells expressing PD-1 | % reduction in % of T cells expressing PD-1 |
|---|---|---|
| Untreated | 20.43 | |
| Dopamine $10^{-7}$M | 10 | 51.05 |
| Dopamine $10^{-8}$M | 22.4 | −9.64 |
| Fenoldopam (powder), selective dopamine D1/5 receptor agonist, $10^{-7}$M | 21.3 | −4.26 |
| Fenoldopam (powder), selective dopamine D1/5 receptor agonist, $10^{-8}$M | 14.7 | 28.05 |
| A77636, selective dopamine D1/5 receptor agonist, $10^{-7}$M | 12.7 | 37.84 |
| A77636, selective dopamine D1/5 receptor agonist, $10^{-8}$M | 14.7 | 28.05 |
| SKF38393, selective dopamine D1/5 receptor agonist, $10^{-7}$M | 21.8 | −6.73 |
| SKF38393, selective dopamine D1/5 receptor agonist, $10^{-8}$M | 20.3 | 0.61 |
| Sumanirole, selective dopamine D2 receptor agonist, $10^{-7}$M | 16.4 | 19.71 |
| Sumanirole, selective dopamine D2 receptor agonist, $10^{-8}$M | 16 | 21.66 |
| 7-OH- DPAT, selective dopamine D3 receptor agonist, $10^{-7}$M | 5.12 | 75.85 |
| 7-OH- DPAT, selective dopamine D3 receptor agonist, $10^{-8}$M | 13.6 | 35.85 |
| PD 128907, selective dopamine D3 receptor agonist, $10^{-7}$M | 13.6 | 33.41 |
| PD 128907, selective dopamine D3 receptor agonist, $10^{-8}$M | 16.3 | 20.20 |
| PD 168077, selective dopamine D4 receptor agonist, $10^{-7}$M | 5.3 | 74.05 |
| PD 128907, selective dopamine D3 receptor agonist, $10^{-8}$M | 10.7 | 47.61 |
| Glutamate $10^{-7}$M | 15.8 | 22.64 |
| Glutamate $10^{-8}$M | 16.3 | 20.20 |
| CNQX, selective glutamate/AMPA receptor antagonist, $0.5*10^{-5}$M | 12.9 | 36.84 |
| CNQX, selective glutamate/AMPA receptor antagonist, $0.5*10$-6M | 13.7 | 32.93 |
| MK 801 + CNQX, selective glutamate/NMDA and glutamate/AMPA receptor antagonists, $10^{-5}$M | 12.2 | 40.27 |
| MK 801 + CNQX, selective glutamate/NMDA and glutamate/AMPA receptor antagonists, $10^{-6}$M | 12.9 | 36.84 |
| Dendrotoxin K (DTX-K), a selective blocker of voltage-gated Kv1.1 ion channels, $10^{-7}$M | 16.2 | 20.69 |
| Dendrotoxin K (DTX-K), a selective blocker of voltage-gated Kv1.1 ion channels, $10^{-8}$M | 16.2 | 20.69 |
| Anti Kv1.1 antibody that blocks that voltage-gated Kv1.1 ion channels (1:100 of original stock) | 10.1 | 50.55 |
| Anti Kv1.1 antibody that blocks that voltage-gated Kv1.1 ion channels (1:100 of original stock) | 3.66 | 82.08 |

Example 2: Neurotransmitters, Neuropeptides, their Analogs and Combinations Thereof Reduce PD-1 is Both Large Proliferating and Small Non-Proliferating T Cells CD3 positive T cells of patients are a heterogenous mix of different types of T cells. Flow cytometry analysis, even without any staining, shows the cell's size by a parameter called Forward Scatter (FSC), and the cell's granularity by a parameter called Side Scatter (SSC). Using this FCS and SSC analysis, T cells can be distinguished and separated by size into large proliferating T cells and smaller non-proliferating T cells. A larger portion of the smaller T cells were found to be PD-1 positive than the large proliferating T cells, and the effect of the neurotransmitter and neuropeptide was examined on the two populations separately. Table 4 summarizes the effects of a 1-hour treatment of large proliferating T cells with various molecules and combinations of molecules. Table 5 summarizes the effect of the same treatments on smaller non-proliferating T cells. Smaller T cells, that had higher PD-1 levels than the bigger T cells before treatment, had a reduced response to the various molecules as measured by percent reduction in PD-1 expressing cells, however, the trend of which molecules were most effective was generally consistent between the two populations, suggesting that examination of either population is informative as to determining the most beneficial molecules.

TABLE 4

Effect of neurotransmitters, neuropeptides, their analogues, and combinations thereof treatment (1 Hr) on percentage of PD-1 expressing large proliferating CD3+ normal human T cells

| Treatment | % of large T cells expressing PD-1 | % reduction in % of large T cells expressing PD-1 |
|---|---|---|
| Untreated | 21.5% | |
| Dopamine $10^{-8}$M | 19.1% | 11.2% |
| A77636 - Dopamine D1/5 receptor agonist - $10^{-8}$M | 20.5% | 4.7% |
| SKF38393 - Dopamine D1/5 receptor agonist - $10^{-8}$M | 15.6% | 27.4% |
| Sumanirole - Dopamine D2 receptor agonist - $10^{-8}$M | 13.6% | 36.7% |
| PD 128907 - Dopamine D3 receptor agonist - $10^{-8}$M | 16.1% | 25.1% |
| PD168077 - Dopamine D4 receptor agonist - $10^{-8}$M | 15.6% | 27.4% |
| SCH 39166 - selective dopamine D1R antagonist | 19.8% | 7.9% |
| L-741,626 - selective dopamine D2R antagonist | 19.0% | 11.6% |
| NGB 2904 - selective dopamine D3R antagonist | 22.5% | -4.7% |
| L-741,742 - selective dopamine D3R antagonist | 19.3% | 10.2% |
| Dopamine + SCH 39166 - selective dopamine D1R antagonist | 12.1% | 43.7% |
| Dopamine + L-741,626 - selective dopamine D2R antagonist | 15.7% | 27.0% |
| Dopamine + NGB 2904 - selective dopamine D3R antagonist | 12.5% | 41.9% |
| Dopamine + L-741,742 - selective dopamine D4R antagonist | 14.8% | 31.2% |
| Glutamate 10-8M | 13.0% | 39.5% |
| GnRH-I 10-8M | 16.1% | 25.1% |
| GnRH-II 10-8M | 9.5% | 55.8% |
| Somatostatin 10-8M | 12.6% | 41.4% |
| CGRP 10-8M | 16.5% | 23.3% |
| Dopamine + Glutamate, both at $10^{-8}$M | 15.1% | 29.8% |
| Dopamine + Somatostatin, both at $10^{-8}$M | 14.9% | 30.7% |
| Dopamine + CGRP, both at $10^{-8}$M | 9.7% | 54.9% |
| Dopamine + GnRH-II, both at $10^{-8}$M | 11.1% | 48.4% |
| Dopamine + GnRH-I + GnRH-II, all at $10^{-8}$M | 9.9% | 54.0% |
| Dopamine + Glutamate + GnRH-I + GnRH-II + Somatostatin + CGRP, all at $10^{-8}$M | 2.5% | 88.4% |

TABLE 5

Effect of neurotransmitters, neuropeptides, their analogues, and combinations thereof treatment (1 Hr) on percentage of PD-1 expressing smaller non-proliferating CD3+ normal human T cells

| Treatment | % of smaller T cells expressing PD-1 | % reduction in % of smaller T cells expressing PD-1 |
|---|---|---|
| Untreated | 43.9% | |
| Dopamine 10-8M | 40.4% | 8.0% |
| A77636 - Dopamine D1/5 receptor agonist - 10-8M | 40.8% | 7.1% |
| SKF38393 - Dopamine D1/5 receptor agonist - 10-8M | 36.7% | 16.4% |
| Sumanirole - Dopamine D2 receptor agonist - 10-8M | 36.2% | 17.5% |
| PD 128907 - Dopamine D3 receptor agonist - 10-8M | 38.4% | 12.5% |
| PD168077 - Dopamine D4 receptor agonist - 10-8M | 40.3% | 8.2% |
| SCH 39166 - selective dopamine D1R antagonist | 40.1% | 8.7% |
| L-741,626 - selective dopamine D2R antagonist | 38.6% | 12.1% |
| NGB 2904 - selective dopamine D3R antagonist | 40.2% | 8.4% |
| L-741,742 - selective dopamine D3R antagonist | 37.8% | 13.9% |
| Dopamine + SCH 39166 - selective dopamine D1R antagonist | 29.7% | 32.3% |
| Dopamine + L-741,626 - selective dopamine D2R antagonist | 36.1% | 17.8% |
| Dopamine + NGB 2904 - selective dopamine D3R antagonist | 33.3% | 24.1% |
| Dopamine + L-741,742 - selective dopamine D4R antagonist | 35.4% | 19.4% |
| Glutamate 10-8M | 32.8% | 25.3% |
| GnRH-I 10-8M | 36.6% | 16.6% |
| GnRH-II 10-8M | 29.3% | 33.3% |
| Somatostatin 10-8M | 33.9% | 22.8% |
| CGRP 10-8M | 35.9% | 18.2% |
| Dopamine + Glutamate, both at $10^{-8}$M | 37.1% | 15.5% |
| Dopamine + Somatostatin, both at $10^{-8}$M | 37.5% | 14.6% |
| Dopamine + CGRP, both at $10^{-8}$M | 29.7% | 32.3% |
| Dopamine + GnRH-II, both at $10^{-8}$M | 31.2% | 28.9% |
| Dopamine + GnRH-I + GnRH-II, all at $10^{-8}$M | 33.1% | 24.6% |
| Dopamine + Glutamate + GnRH-I + GnRH-II + Somatostatin + CGRP, all at $10^{-8}$M | 16.3% | 62.9% |

Example 3: Neurotransmitters, Neuropeptides and Combinations Thereof Augment the Proliferation of CD3+ T Cells of Liver Cancer Patients Having established the efficacy of neurotransmitters, neuropeptides, their analogs, Kv1.1 ion channel blockers and combinations thereof on reducing expression of PD-1 in normal human T cells of healthy subjects, and augmenting their proliferation, these molecules were tested on T cells of cancer patients. Blood was drawn from two patients suffering from liver cancer, patient L.F. and patient A.G. who both suffer from hepatocellular carcinoma. 15 mLs of blood yielded roughly 2.5×10^7 peripheral blood leucocytes, from which approximately 6×10⁶ CD3 positive T cells were isolated. The cells were cultured as described above, and the effects of various molecules and their combinations on those T cells were examined.

Cell proliferation was monitored in culture for 60 hours after administration of the molecule/s (FIG. 1). All of the neurotransmitters and neuropeptides tested (Dopamine, Glutamate, GnRH-II, CGRP, Neuropeptide Y [NPY]) and all of the combinations (GnRH-II+Dopamine, GnRH-II+CGRP, GnRH-II+Neuropeptide Y, all neurotransmitters) increased the number of T cells present in culture. Dopamine, Glutamate and GnRH-II+NPY were the most effective. Interestingly, the combination of all the molecules was ineffective on the T cells of these patients, resulting in a lower increase in proliferation than any of the neurotransmitters on their own. This strengthens the logic and need to test for each patient, which molecules or their combinations induce the best beneficial effect on his/her own T cells.

Figure 2A:
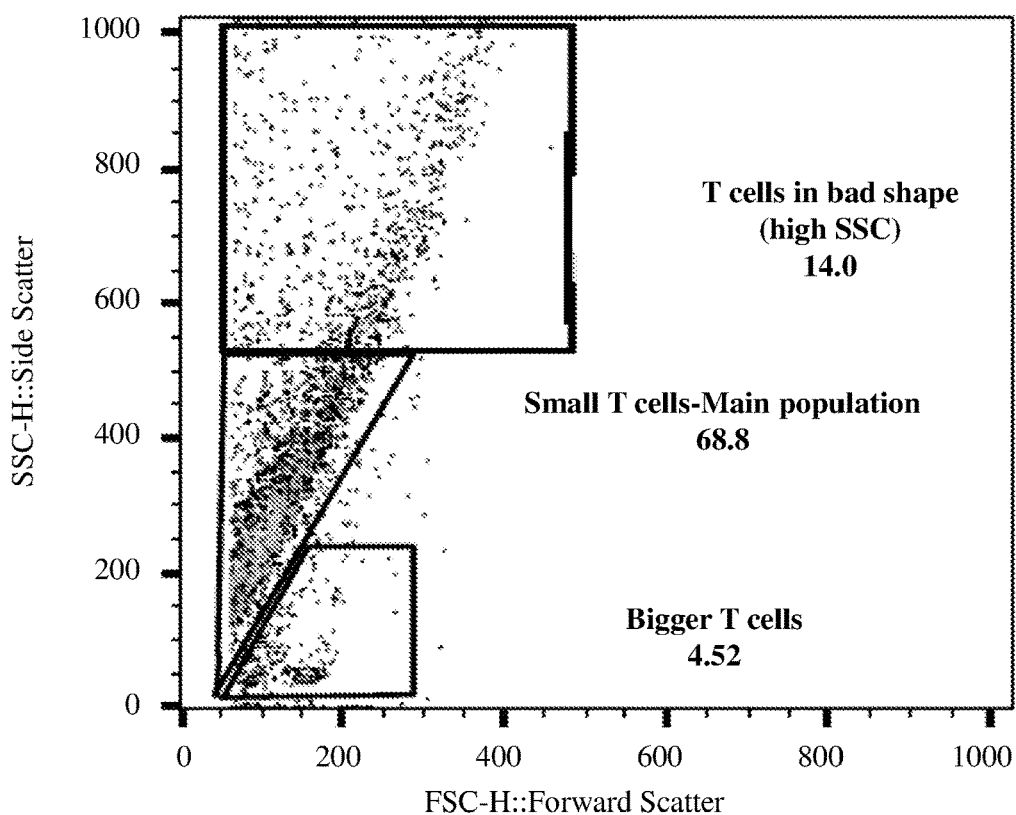
FIGS. 2A-E: Neurotransmitters augment the number of T cells of cancer patients. (A-C) Dot plots showing forward scatter (size) and side scatter (granularity) of T cells of patient L.F. Control untreated (2A), Glutamate treated (2B) and Dopamine+NPY treated (2C) T cells are shown. The percentages of cells that are non-healthy (upper box), small and likely non-activated and non-proliferating (middle triangle) and large and active (lower quadrilateral) are provided. (2D) A bar chart showing mean expression of CD25 on the surface of T cells of patient L.F. (2E) A bar chart showing the percent of T cells of patient A.G. which are big, likely activated and proliferating T cells.
Figure 2B:
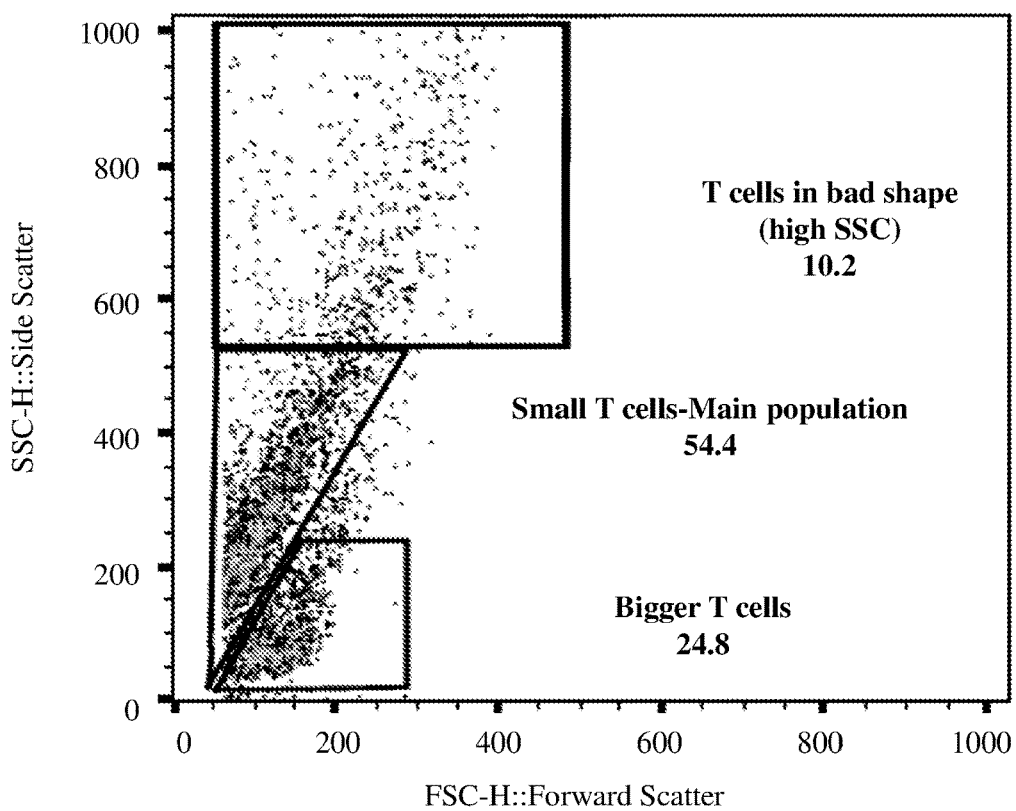
Figure 2C:
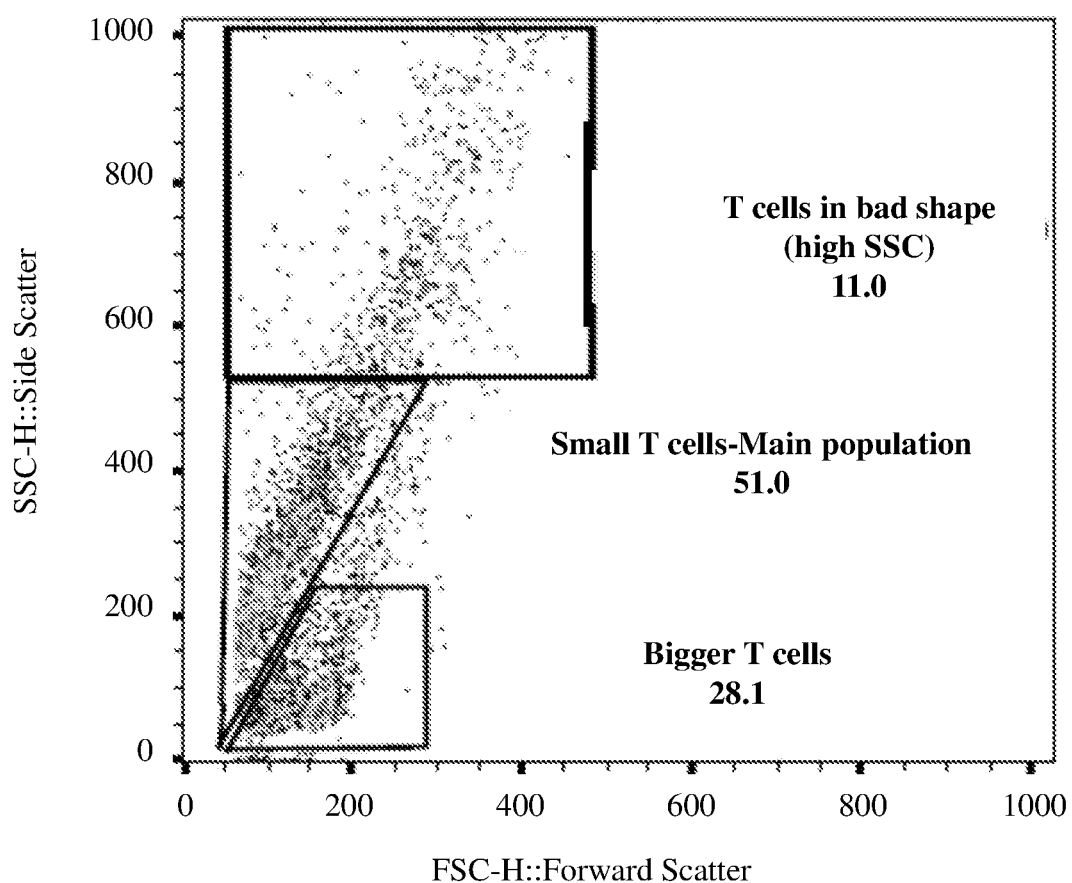
Figure 2D:
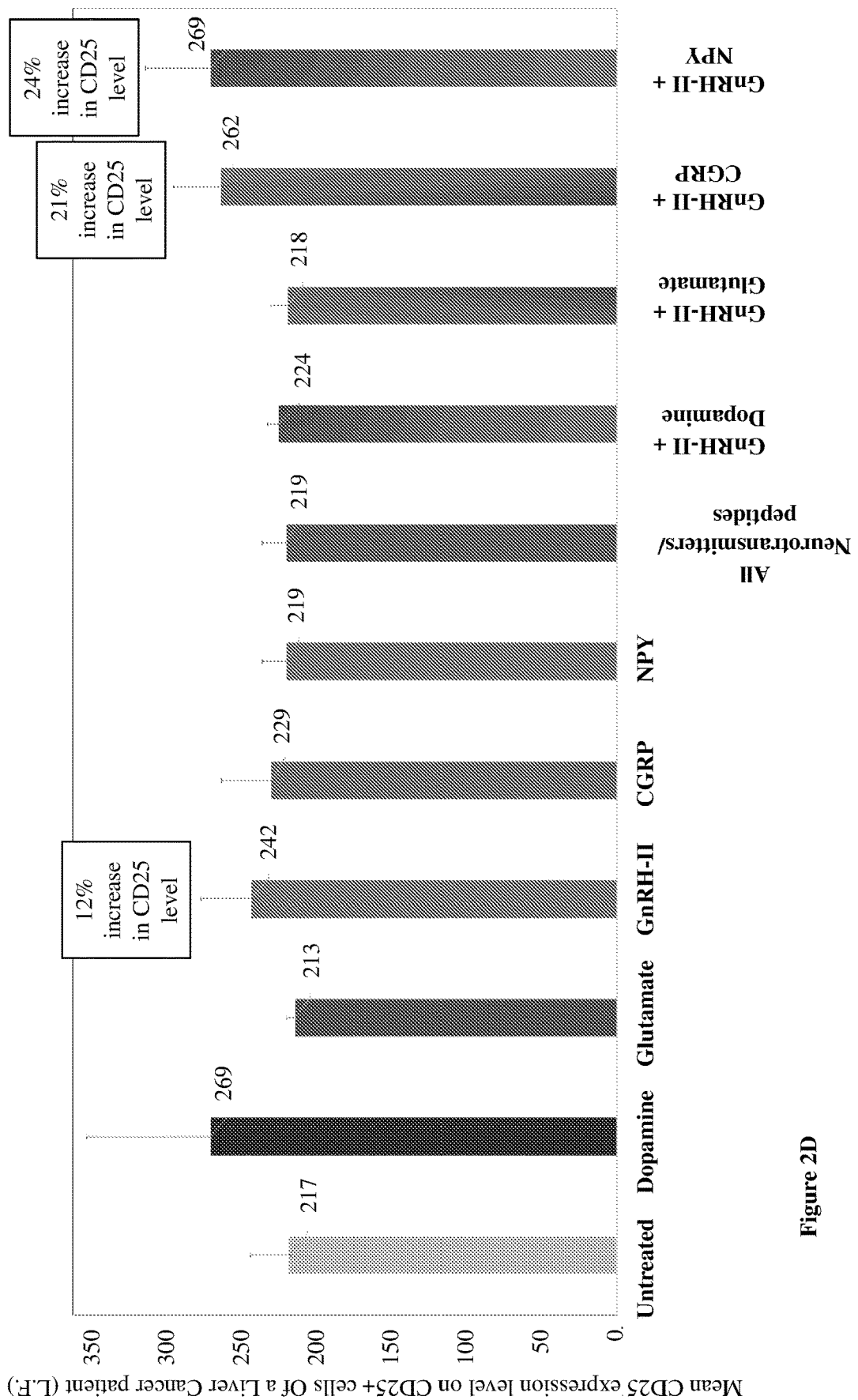

Not only were there more T cells present in the culture, but upon analyzing the cells in a flow cytometer it was observed that there was a major increase in the number of big, proliferating CD3 positive cells (Table 6). By this measure, Glutamate (FIG. 2A-B), GnRH-II, and GnRH-II+Dopamine or +NPY (FIG. 2C) were the most effective. The mix of all neurotransmitters was once again the least effective. It was also noted that GnRH-II alone, or in combination with several neuropeptides (CGRP, NPY) increased the surface expression of CD25, which is known to be upregulated upon T cell activation (FIG. 2D).

TABLE 6

Neurotransmitters, neuropeptides and combinations thereof increase the number of big, proliferating T cells of liver cancer patients

| Treatment | % big/activated/ proliferating T cells | Fold increase |
| --- | --- | --- |
| Untreated | 4.50% | |
| Dopamine | 14% | 3-fold |
| Glutamate | 24.80% | 5.4-fold |
| GnRH-II | 32.70% | 7.2-fold |
| CGRP | 19.20% | 4.3-fold |
| Neuropeptide Y | 16.40% | 3.6-fold |
| GnRH-II + Dopamine | 25.20% | 5.6-fold |
| GnRH-II + CGRP | 14.50% | 3.2-fold |
| GnRH-II + NPY | 28.10% | 6.2-fold |
| all neurotransmitters/neuropeptides (GnRH-II + Dopamine + Glutamate + CGRP + NPY) | 10.60% | 2.3-fold |

Figure 2E:
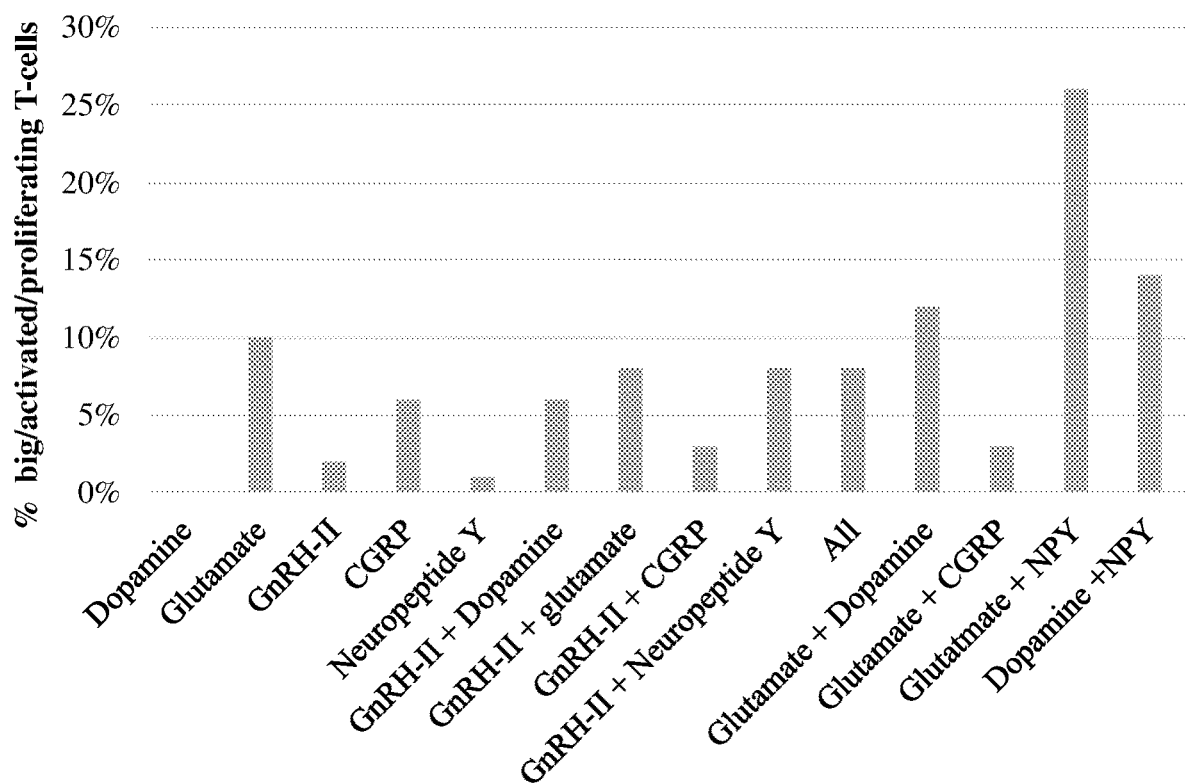

The same treatment with the various molecule/s was performed for T cells from patient A.G. Though some of the neurotransmitters and neuropeptides (Glutamate, CGRP) and their combinations (Glutamate+Dopamine, Glutamate+NPY) caused a small increase in the percentage of big, proliferating T cells, it was never greater than a 30% increase (FIG. 2E). The several fold increases seen for L.F., could not be achieved for A.G. These results strengthen the logic and need to test T cells of each patient for their response to these molecules, and for determining if the patient can benefit from, or is a candidate for, adoptive NeuroImmunotherapy.

Figure 3A:
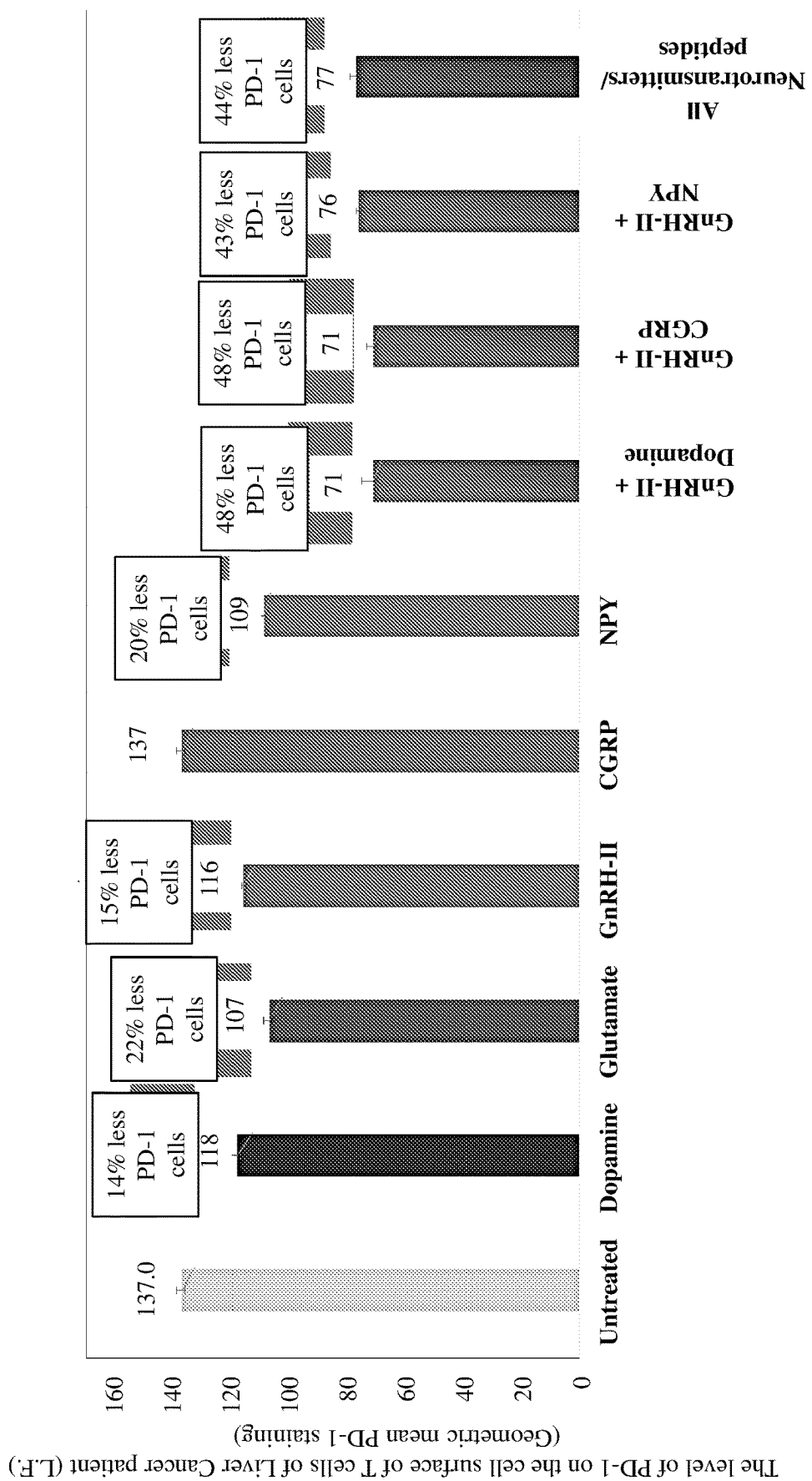
FIGS. 3A-C: Neurotransmitters decrease PD-1 on T cells from cancer patients. Bar charts showing (3A) the level of cell surface expression of PD-1 on T cells of patient L.F. (reflected by the geometric mean of the respective PD-1 fluorescent staining), (3B) the percentage of T cells from patient L.F. which are PD-1 positive, and (3C) relative expression of PD-1 on T cells from patient A.G.
Figure 3B:
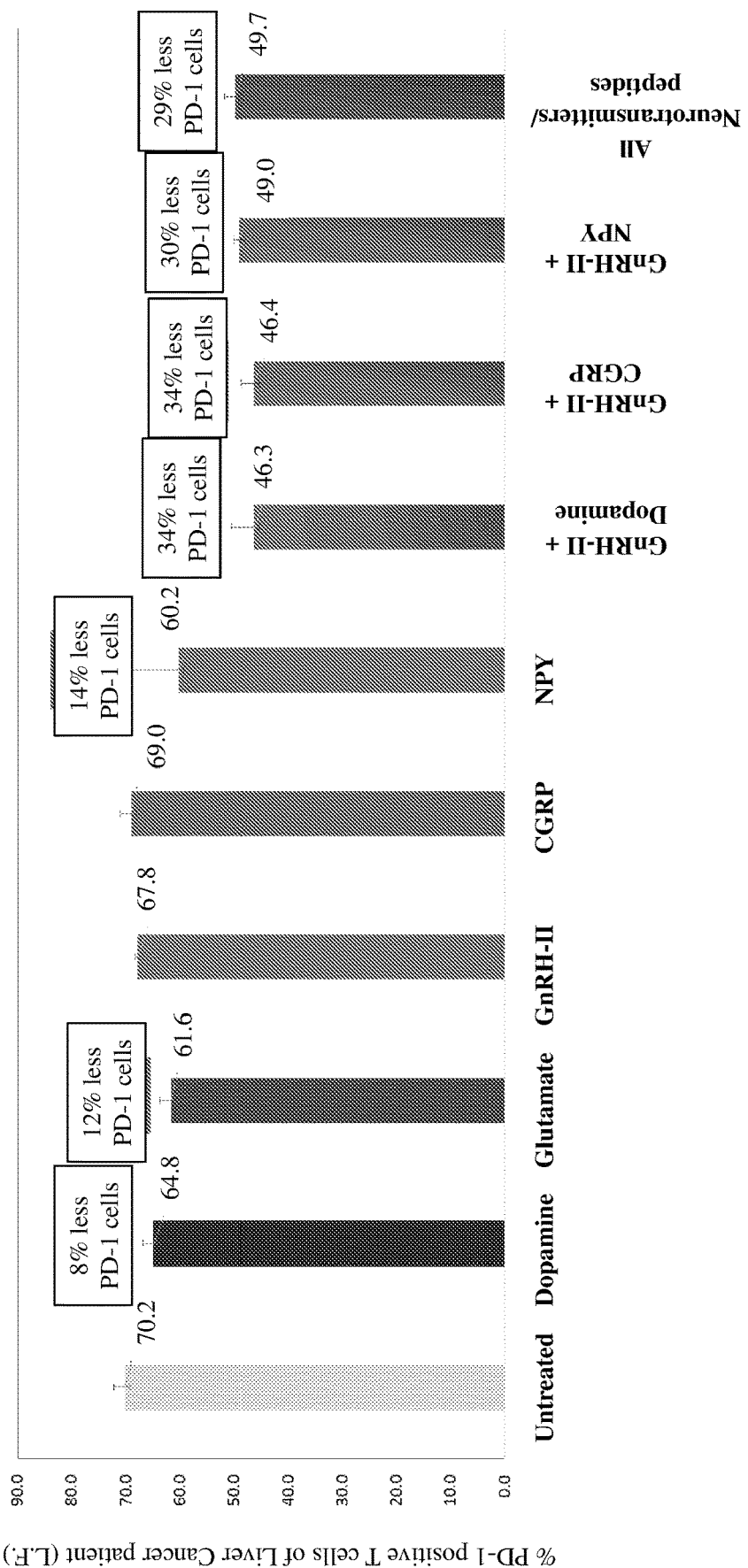

Example 4: Neurotransmitters, Neuropeptides and Combinations Thereof Decrease PD-1 on T Cells of Liver Cancer Patients The ability of neurotransmitters to decreases PD-1 expression on the T cells of the cancer patients was investigated next. The T cells of L.F in culture were exposed to various neurotransmitters, neuropeptides and their combinations for a total of 60 hours, and total PD-1 surface expression was measured by FACS analysis (FIG. 3A). Similar to the results with T cells of a healthy donor, the individual neurotransmitters and neuropeptides had varying levels of effectiveness, however, it was not the same neurotransmitters and neuropeptides that were the most or least effective, suggesting that the magnitude of the effects of the molecule/s may be person specific. Further, the T cells of L.F. showed a strong synergistic effect when neurotransmitters and neuropeptides were combined. Similar results were obtained when the percent of PD-1 positive cells were measured as opposed to total PD-1 expression (FIG. 3B).

Figure 3C:
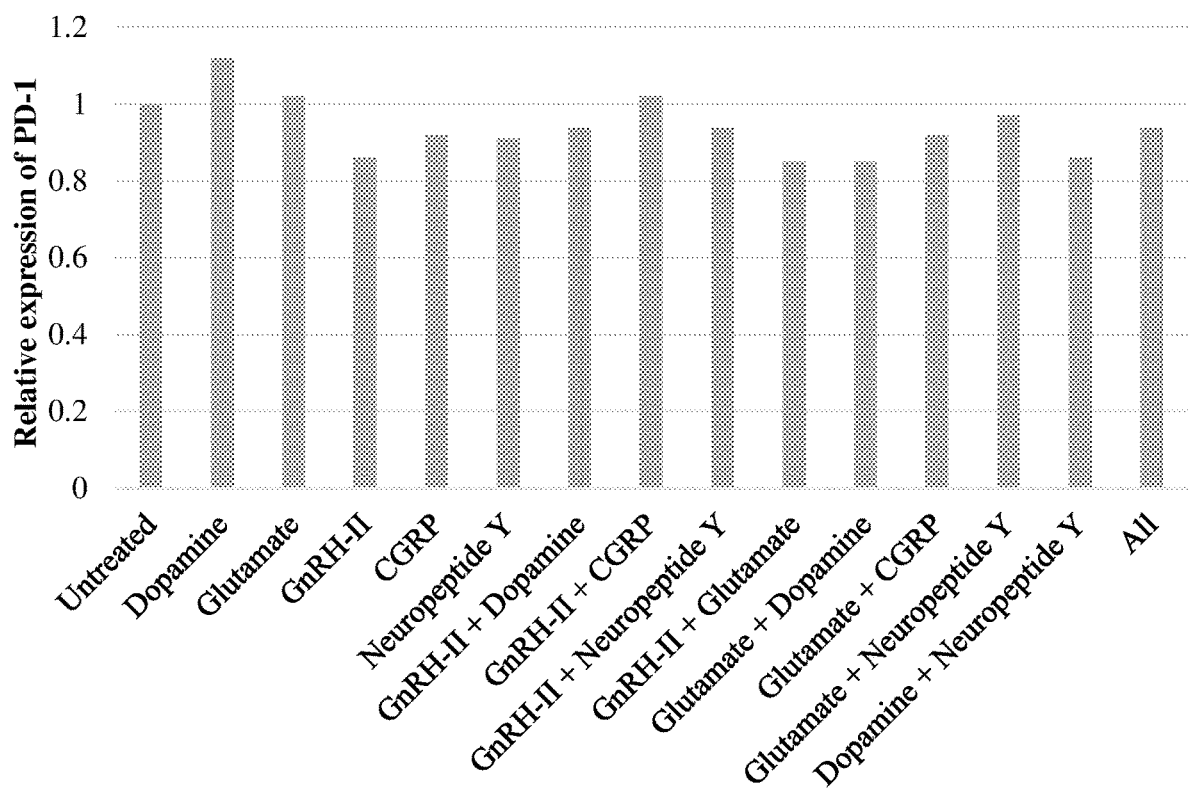

T cells of A.G. were tested in the same way. Once again several of the neuropeptides (GnRH-II), or combinations of molecules (GnRH-II+Glutamate, Glutamate+Dopamine, Dopamine+NPY), reduced the expression of PD-1 in the T cells of this liver cancer patient (FIG. 3C), however, also once again the decreases were not as great as was observed for patient L.F., with the greatest decrease amounting to a reduction of only 15%.

Figure 4A:
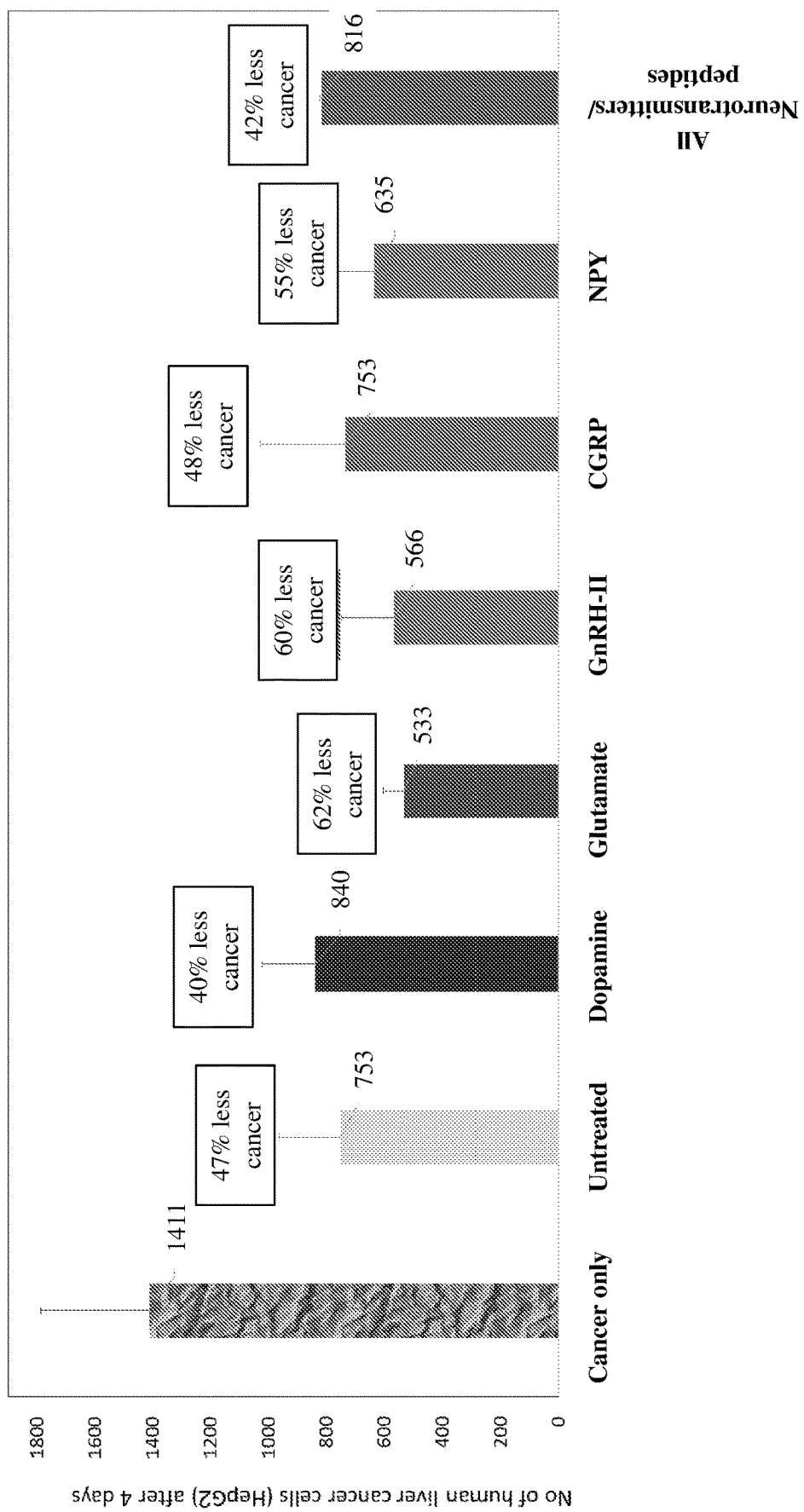
FIGS. 4A-E: Neurotransmitters increase the cancer killing abilities, i.e. the cytotoxicity against cancer of T cells of cancer patients. Bar charts showing (4A) the number of HepG2 cells in culture after 4 days of coculture with T cells of patient L.F., (4B) the number of Huh7 cells in culture after 1 week of coculture with T cells of patient L.F., (4C) the percentage of Huh7 cells that are alive after 1 week of coculture with T cells of patient L.F., (4D) the percentage of Huh7 cells that are necrotic after 1 week of coculture with T cells of patient L.F., and (4E) the number of T cells in culture after 1 week of coculture with Huh7 cells.

Example 5: Neurotransmitters, Neuropeptides and Combinations Thereof Increase the Cancer Killing Abilities of T Cells of Cancer Patients The ability of neurotransmitters, neuropeptides, and their combinations to increase the ability of T cells of cancer patients to kill cancer cells of the same cancer type from which the patient suffers was now investigated. T cells from patient L.F. with hepatocellular carcinoma were once again isolated from a blood sample, and then pretreated for 60 hours with various molecules, followed by cocultured with HepG2 hepatocellular carcinoma cells. After 4 days the total number of surviving HepG2 cells was counted (FIG. 4A). Untreated T cells reduced the total number of cancer cells by 47%, but treatment with neurotransmitters was able to increase the T cells cytotoxicity such that they reduced the number of cancer cells by as much as 62%.

Figure 4B:
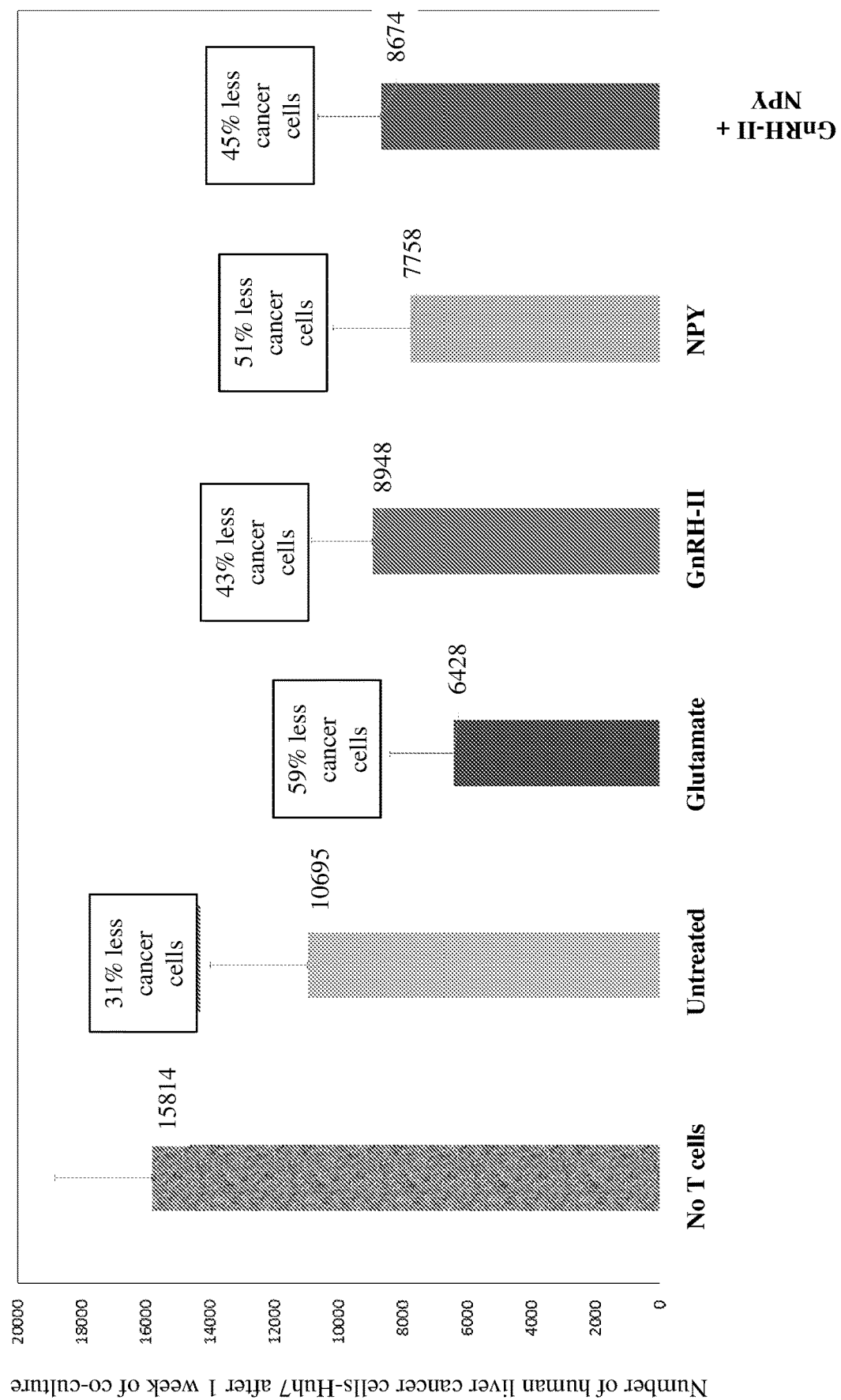
Figure 4C:
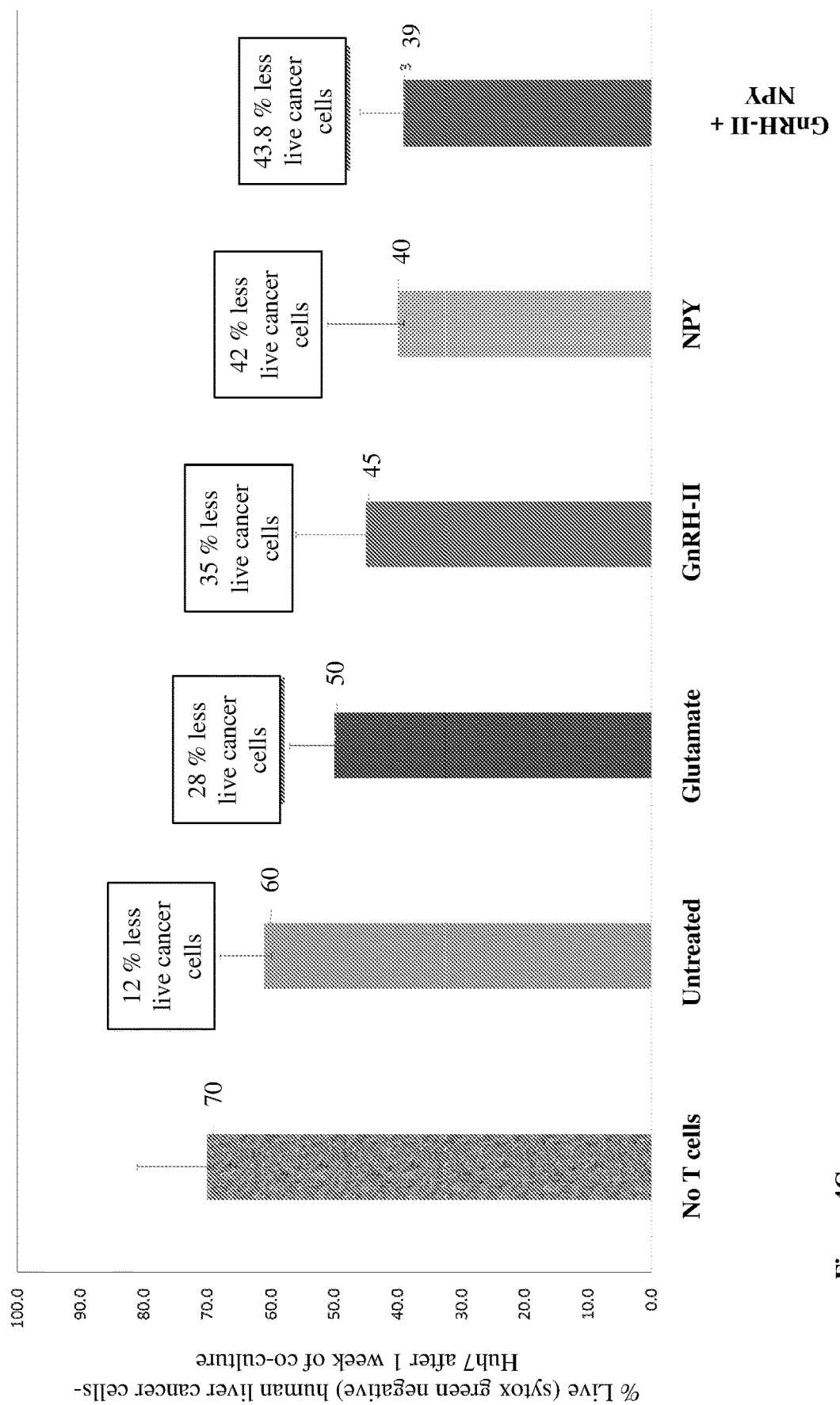
Figure 4D:
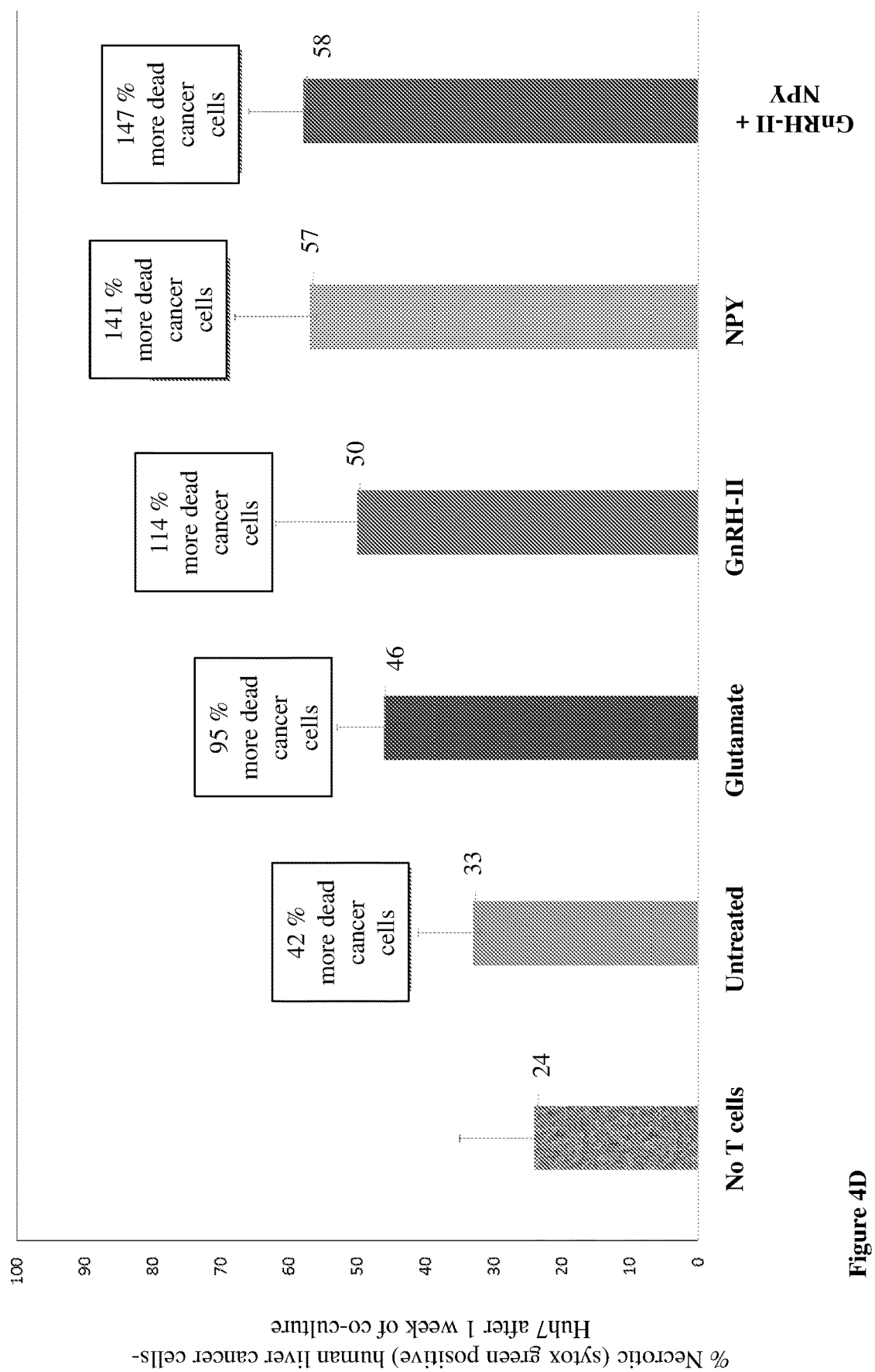
Figure 4E:
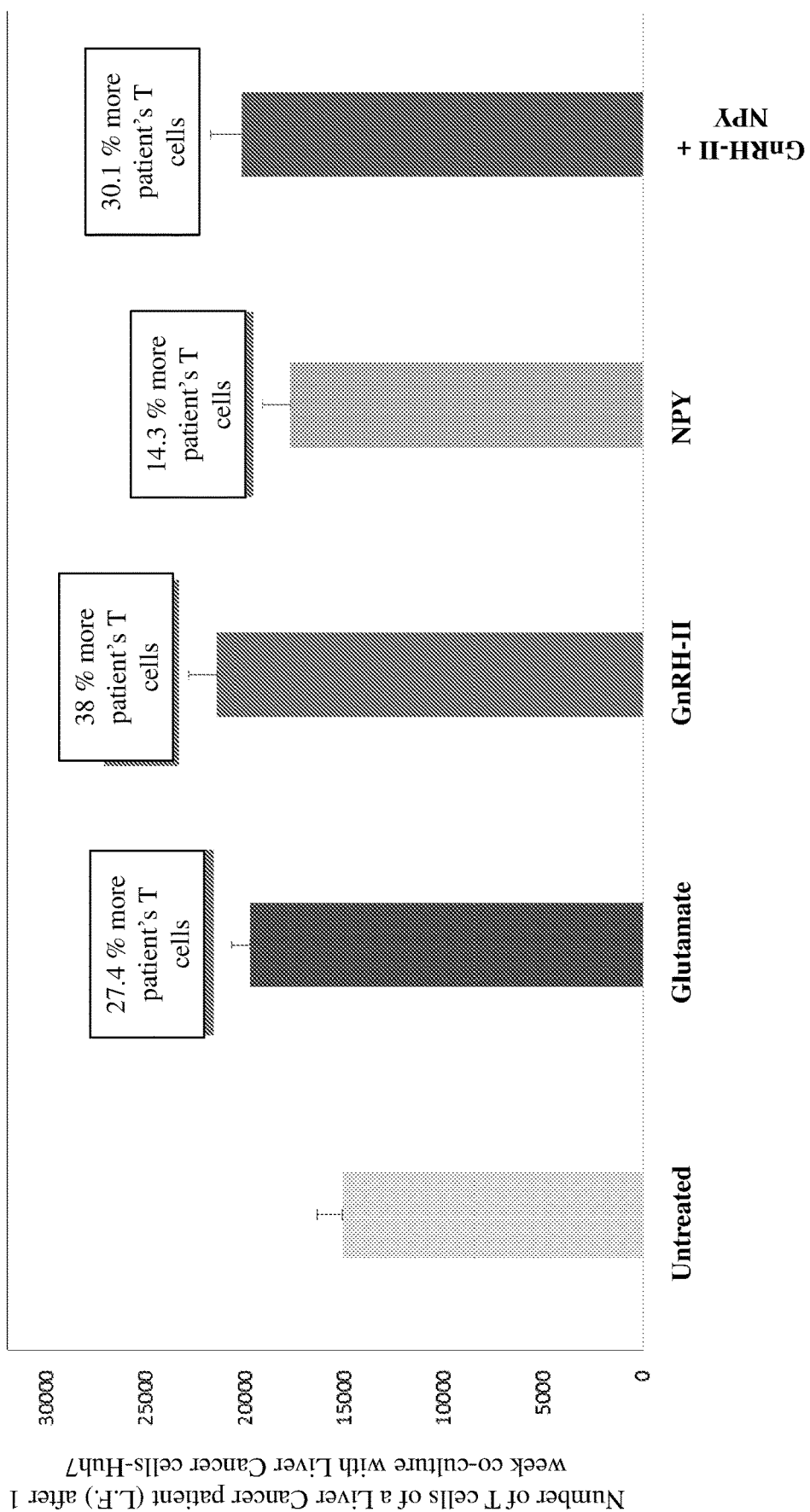

Similar results were obtained when the neurotransmitter/neuropeptide-enhanced T cells of L.F. were incubated with Huh7 liver cancer cells. After co-culture for a week, untreated T cells reduced the total number of surviving liver cancer cells by 31%, while treatment with molecule/s was able to increase the killing such that a reduction of 41% occurred (FIG. 4B). The liver cancer cells still in culture after 1 week were then stained with SYTOX green in order to determine the percent of live and necrotic cells. The decrease in survival also correlated with a decrease in live cells (FIG. 4C), an increase in necrotic cells (FIG. 4D). Excitingly, after the one-week coculture an increase in the number of T cells that survived the culture was observed (FIG. 4E). Specifically, approximately 15000 untreated T cells survived coculture with the Huh7 cells, but by contrast the neurotransmitter enhanced cells had as much as or more than 20000 cells remaining after coculture. These results were very good and encouraging since they showed that pre-treatment of T cells of a hepatocellular carcinoma patient with neurotransmitters, neuropeptides and their combinations increase their subsequent response to and proliferation due to encounter with hepatocellular carcinoma cells. Thus, the molecules enhanced the response of the T cells to the cancer cells.

Example 6: FCS can be Replaced with Human Plasma of a Healthy Human Subject for Culturing T Cells Culturing human cells in vitro, often referred to as "cell parking", has many detrimental effects if the cells are intended to be returned to a human subject. Specifically, the fetal calf serum (FCS) used in the cell culture media can be problematic due to its variability from batch to batch, tendency to stimulate undesired immunogenicity and possibility of contributing foreign undesired substances that are internalized by the cultured cells. As such it is beneficial to attempt to make the culturing media as similar to human physiological conditions as possible and replace FCS with human-derived materials/factors.

Figure 5A:
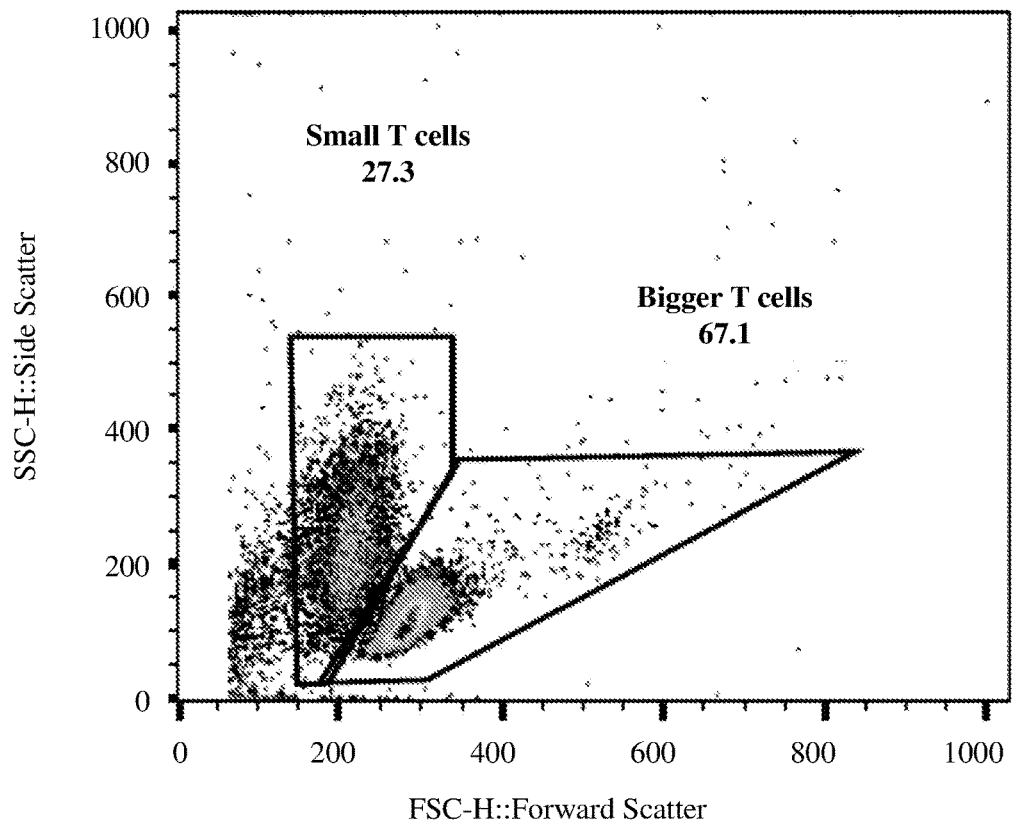
Figure 5B:
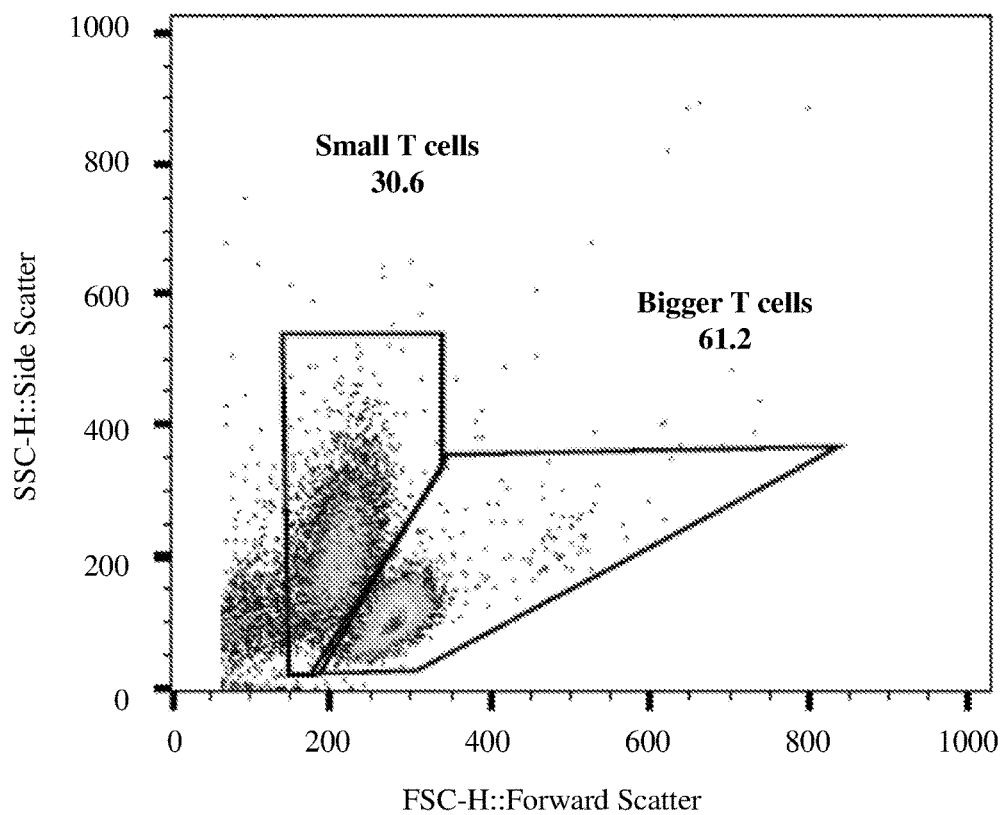
Figure 5C:
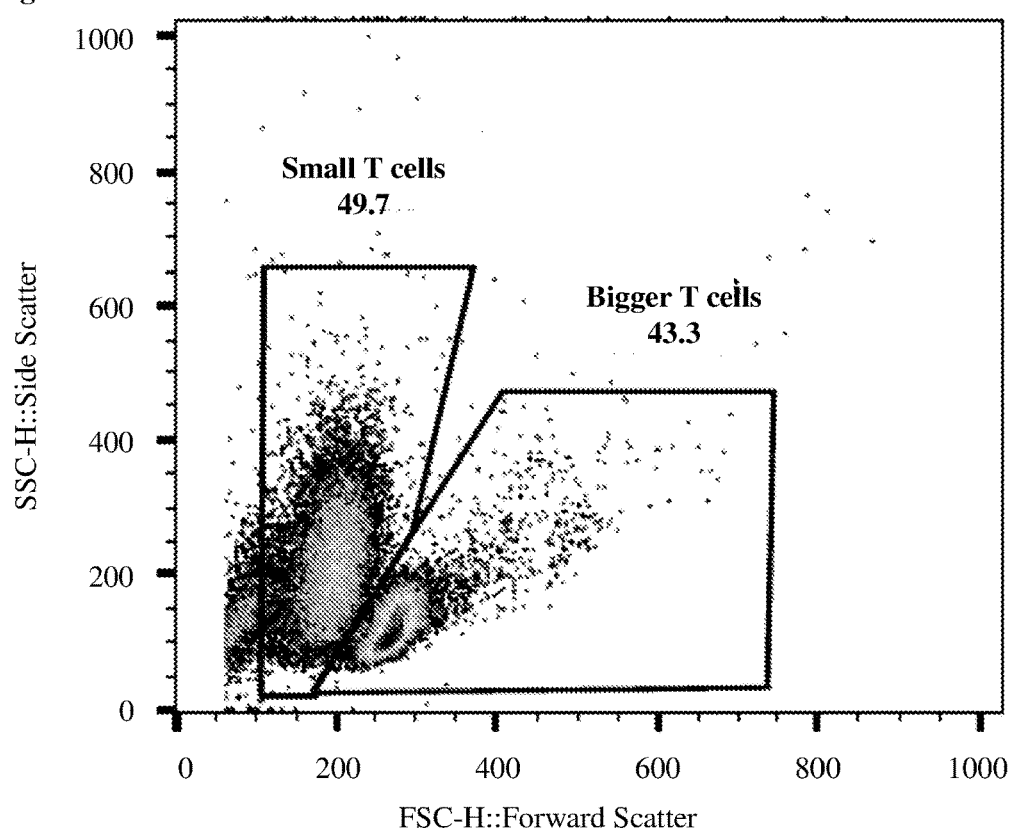
Figure 5D:
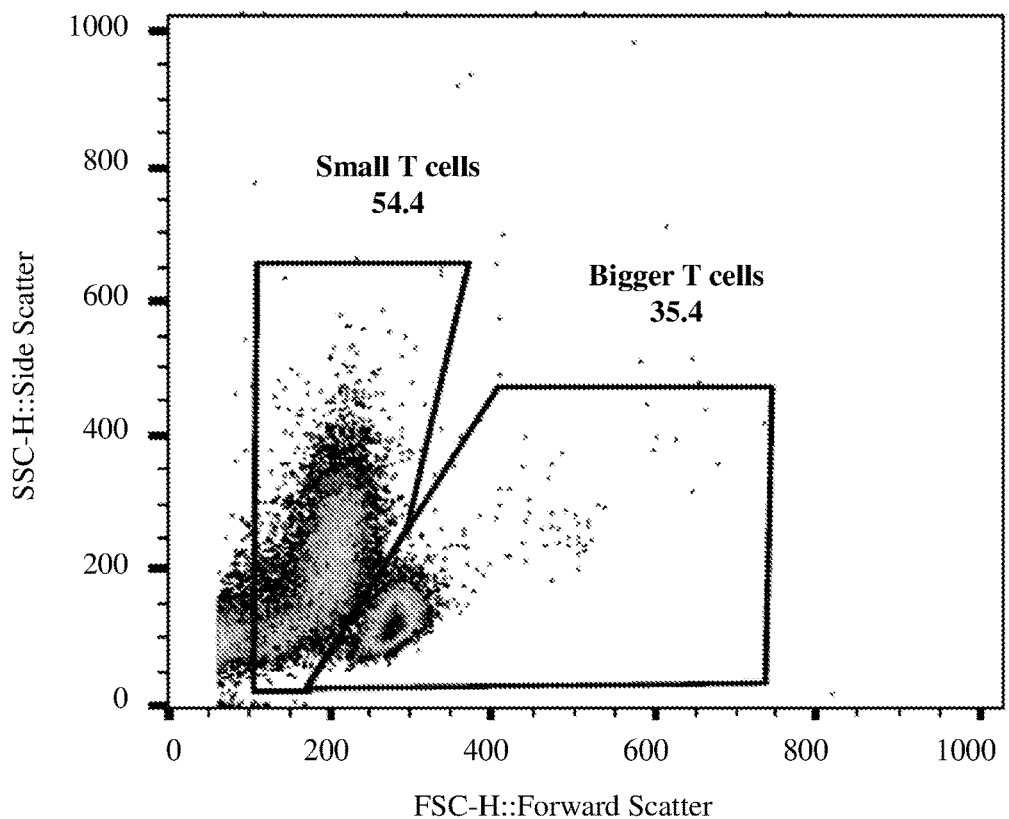

To this end healthy normal human primary CD3 positive T cells were isolated from blood of a healthy donor and cultured either in standard tissue culture media containing 10% heat inactivated FCS or in media containing 10% heat inactivated human plasma instead. The human plasma used in this experiment was from the same donor as the T cells. The viability of the cells and the distinction between big and small T cells was monitored after 5 and 9 days. After 5 days, an average (n=3) of 12218 large proliferating T cells and 4924 small T cells were present in the cultures with FCS (FIG. 5A). Cultures with human plasma had an average (n=3) of 13455 large proliferating and 5583 small T cells (FIG. 5B). After 9 days the numbers had changed to averages (n=4) of 10101 and 11672 in cultures with FCS (FIG. 5C) and averages (n=4) of 6012 and 9441 in cultures with human plasma (FIG. 5D).

These results confirm that replacement of FCS with human plasma of a healthy human subject is effective for short term in vitro culturing of normal human T cells, at least up to 9 days. For the culturing performed for neurotransmitter/neuropeptide/ion channel enhanced immunotherapy, which does not extend past 5 days, human plasma is a viable, and could indeed be a preferred alternative to FCS, due to the undesired effects of FCS.

Figure 5E:
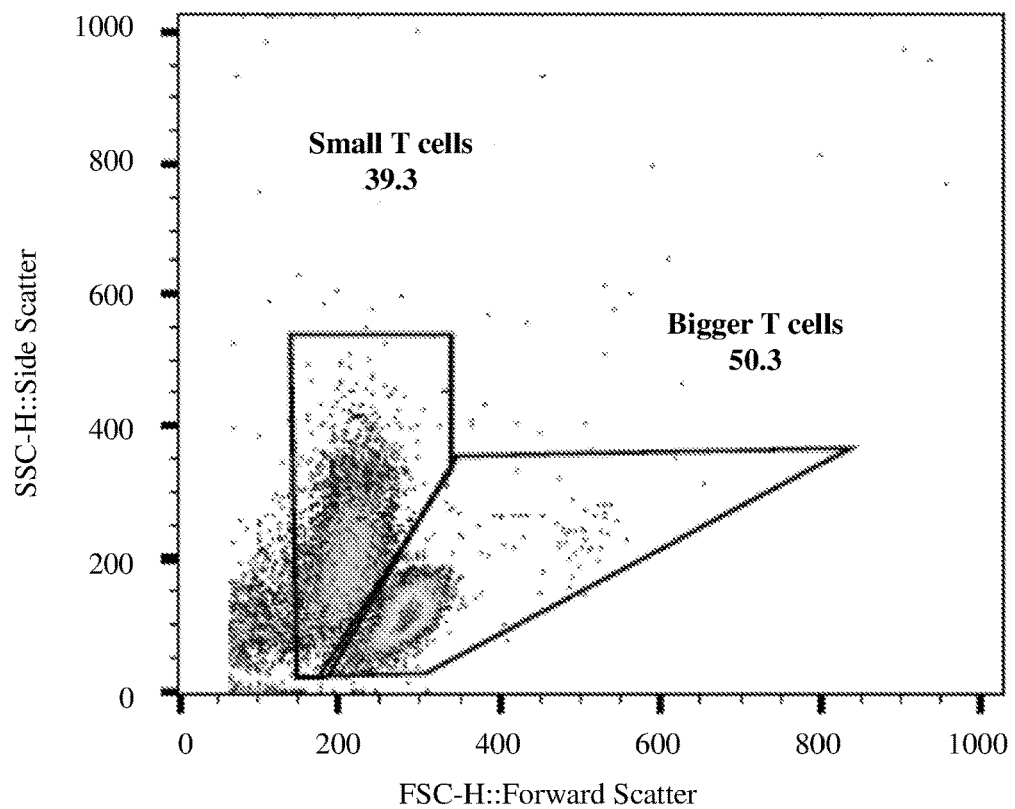
Figure 5F:
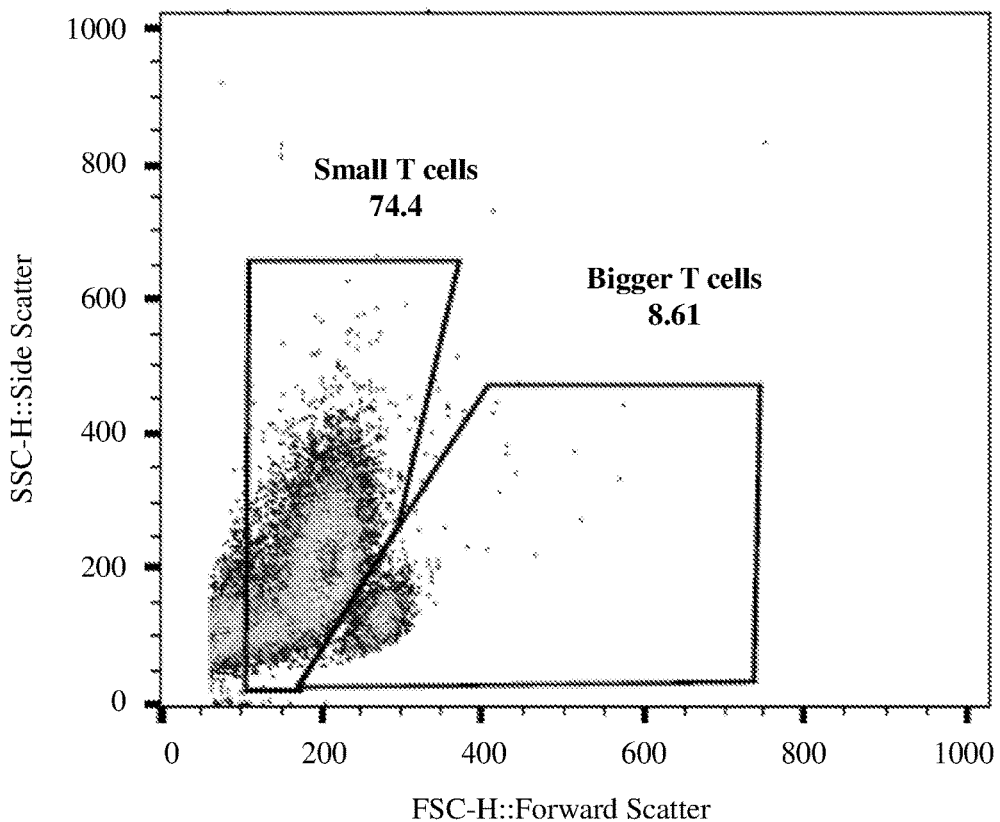

Example 7: Plasma of Patients in Need of Immunotherapy is not Suitable for Culturing T Cells In parallel to the above described experiment, the same normal human primary T cells of a healthy subject were incubated in media containing 10% heat inactivated human plasma of patient L.F. The viability of the cells and the distinction between small and large T cells was monitored after 5 and 9 days. After 5 days, an average (n=3) of 8392 large proliferating T cells and 6449 small T cells were present in the cultures (FIG. 5E). This was a 31% reduction in the number of large proliferating T cells. After 9 days the numbers had decreased even further to averages (n=4) of 1603 large proliferating T cells and 14366 small T cells in cultures (FIG. 5F). This represents an 84% reduction in large proliferating T cells.

In order to ensure that this reduction was not merely due to the plasma being from an allogenic human source and not specifically that it was cancer related, the following experiment was performed: CD3+ T cells were isolated from healthy subject #1. These cells were cultured in media containing either FCS, plasma of subject #1, plasma of another healthy subject #2, plasma of a third healthy subject #3, plasma of cancer patient L.F., plasma of cancer patient A.G. and plasma of a third cancer patient B.S. All types of serum/plasma were heat inactivated (56 degrees C., 30 minutes) prior to their addition to the cell culture media. The total number of T cells, as well as only the number of either small or big T cells were counted by FACS after 2.5 days (60 hours) and 6 days. Results are summarized in Table 7 and show that normal human T cells can survive in tissue culture for at least 6 days in media containing either syngeneic or allogenic heat inactivated plasma of a healthy human subject.

TABLE 7

Deleterious effect of the plasma of cancer patients on proliferating T cells

| Addition to media | Number of big T cells (2.5 days) | % reduction in big T cells (2.5 days) | Number of big T cells (6 days) | % reduction in big T cells (6 days) |
|---|---|---|---|---|
| FCS | 9501 | | 3556 | |
| Plasma of healthy syngeneic human Subject #1 | 7626 | 19.7% | 2945 | 17.2% |
| Plasma of healthy allogenic human Subject #2 | 7660 | 19.4% | 3671 | −3.2% |
| Plasma of healthy allogenic human Subject #3 | 8121 | 14.5% | 4429 | −24.6% |
| Plasma of cancer patient L.F. | 5009 | 47.3% | 1205 | 66.1% |
| Plasma of cancer patient A.G. | 6504 | 31.5% | 1723 | 51.5% |
| Plasma of cancer patient B.S. | 8066 | 15.1% | 1262 | 64.5% |

Figure 5I:
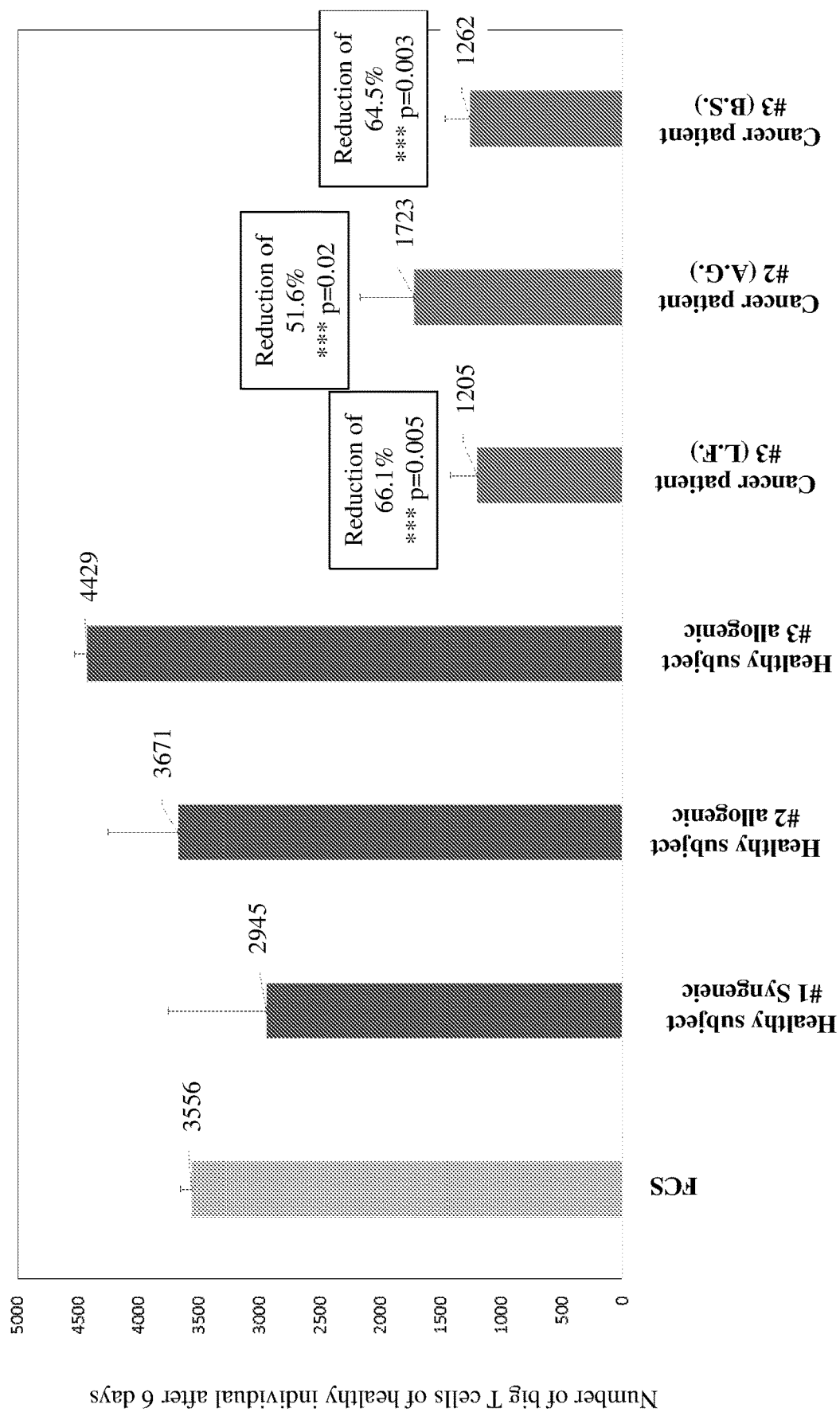

After 2.5 days the plasma of healthy human subjects (syngeneic or allogenic) was capable of replacing FCS with only a small decrease in large proliferating T cells, and indeed when the culture was extended to 6 days, plasma from healthy human subjects was just as good, if not better, than FCS for supporting the big proliferating T cells in culture (FIG. 5G-H). In contrast, plasma from cancer patients had a strong negative effect on the survival of large proliferating T cells, and after just 6 days plasma from all three cancer patients tested had reduced the number of large proliferating T cells by more than 50% (FIG. 5I).

Taken together these results suggest that the plasma of liver cancer patients itself may be detrimental to T cell survival. This reinforces the need for cancer patients to receive immunotherapy to compensate for their own general lack of T cells and/or for those T cells being suboptimal. Further, this will allow their 'rejuvenated' T cells to fight to overcome their cancer, which may be the origin of the hostile/harmful anti-T cell factors present in their plasma. Lastly, it further reinforces the need for continued immunotherapy over time, as this detrimental environment may start to harm the administered T cells in as little as a week.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:
1. A method of person-specific adoptive neuroimmunotherapy in a subject in need thereof, the method comprising:
 (I) a diagnostic stage, comprising:
  (a) providing a T cells sample from the subject;
  (b) contacting ex vivo the T cells with one or more combinations of molecules selected from the group consisting of glutamate+neuropeptide Y; dopamine+neuropeptide Y; glutamate+dopamine; dopamine+GnRH-II; glutamate+GnRH-II; neuropeptide Y+GnRH-II: dopamine+glutamate+GnRH-I; dopamine+glutamate+GnRH-II; glutamate+calcitonin gene-related peptide (CGRP); GnRH-II+CGRP; and neuropeptide Y+CGRP;

(c) measuring the expression level and/or the functional level of the Programmed Cell Death 1 (PD-1) protein and/or the PD-1 gene in the T cells;
(d) testing and measuring in the T cells at least one T cell function selected from the group consisting of:
  (i) the ability to proliferate when cultured alone;
  (ii) the ability to kill disease-causing cells;
  (iii) the ability to kill an infectious organism;
  (iv) the expression level of CD3 zeta-chain;
  (v) migration ability;
  (vi) adhesion ability;
  (vii) homing ability;
  (viii) penetration ability;
  (ix) secretion of therapeutic proteins ability; and
  (x) expression levels and functional levels of proteins
and/or genes involved and needed in T cell functions (i)-(ix);
(e) selecting at least one combination of molecules of (b) that induced in the contacted T cells a decreased expression and/or function of the PD-1 protein and/or the PD-1 gene compared to non-contacted cells of the same T cells sample, and optionally further induced in the contacted T cells one or more of: increased proliferation ability when cultured alone: increased killing of disease causing cells: increased ability to kill an infectious organism: increased expression of CD3 zeta-chain; increased migration ability; increased adhesion ability; increased homing ability; increased penetration ability; increased secretion ability of at least one therapeutic protein; or increased expression or function of at least one protein or gene involved in T cell functions (i)-(ix); and
(II) a therapeutic stage comprising:
  (a) providing a therapeutically effective amount of autologous T cells whose origin is the same as the sample T cells;
  (b) contacting the T cells with at least one combination of molecules selected in diagnostic stage (I)(e); and
  (c) administering the contacted second T cells of (b) to the subject;
thereby performing person-specific adoptive neuroimmunotherapy in said subject.

2. The method of claim 1, wherein said subject suffers from a disease, condition, injury or wound that may benefit from improved immunotherapeutic potential of its T cells, said disease, condition, injury or wound being selected from the group consisting of a cancer, an infectious disease, a genetic immunodeficiency, an acquired immunodeficiency, a degenerative disease, an autoimmune disease, a metabolic disease, a genetic disease, a neurological or neuropsychiatric disease, and post-organ transplant accompanied by immune incompetence.

3. The method of claim 2, wherein the disease, condition, injury or wound is associated with suboptimal T cell number, activity or both.

4. The method of claim 1, wherein:
the T cells are selected from the group consisting of effector T cells, helper T cells, cytotoxic T cells, regulator T cells, suppressor T cells, natural killer T cell, inflammatory T cells, memory T cells, gamma delta T cells, tissue/organ-infiltrating T cells, tumor-infiltrating T cells, mucosal associated T cells, repairing T cells, pro-regenerative T cells, activated T cells, and inactivated T cells; or any combination thereof.

5. The method of claim 1, wherein:
the administration in the therapeutic stage (II)(c) comprises administering an amount of between $2\times10^6$ and $10^9$ of the contacted T cells; or
said administering comprises repeated administration of the contacted second T cells; or
said administering comprises administration of the contacted second T cells indefinitely; or
any combination thereof.

6. The method of claim 1, wherein the administered contacted second T cells perform at least one of the following functions in the subject:
  (a) kill disease-causing cells;
  (b) kill an infectious organism;
  (c) cure said disease or condition;
  (d) improve the subject's condition;
  (e) repair a tissue or organ;
  (f) replace damaged cells, or tissue;
  (g) compensate for a loss or deficiency;
  (h) prevent said disease or condition; and
  (i) regenerate a tissue or organ.

7. The method of claim 1, wherein the selecting step (e) further requires that the selected combination of molecules induces a synergistic effect in decreasing the expression level of PD-1 gene or the function of the PD-1 protein in the first T cells.

8. The method of claim 1, wherein the T cells provided from the subject are exhausted T cells.

9. The method of claim 1, wherein the steps of the diagnostic stage are performed one or more times, at different time points and conditions.

10. A method of person-specific adoptive neuroimmunotherapy of cancer in a subject in need thereof, the method comprising:
(I) a diagnostic stage, comprising:
  (a) providing a T cells sample from the subject;
  (b) contacting ex vivo the T cells with one or more of combination of molecules selected from the group consisting of glutamate+neuropeptide Y; dopamine+neuropeptide Y; glutamate+dopamine; dopamine+GnRH-II; glutamate+GnRH-II; neuropeptide Y+GnRH-II; dopamine+glutamate+GnRH-I; dopamine+glutamate+GnRH-II; glutamate+calcitonin gene-related peptide (CGRP); GnRH-II+CGRP; and neuropeptide Y+CGRP;
  (c) measuring the expression level and/or the functional level of the Programmed Cell Death 1 (PD-1) protein and/or the PD-1 gene in the T cells;
  (d) testing and measuring in the T cells at least one T cell function selected from the group consisting of:
    (i) the ability to proliferate when cultured alone;
    (ii) the ability to proliferate when cocultured with cancerous cells associated with the cancer;
    (iii) the ability to kill cancerous cells associated with the cancer;
    (iv) the expression level of CD3 zeta-chain;
    (v) migration ability;
    (vi) adhesion ability;
    (vii) homing ability;
    (viii) penetration ability;
    (ix) secretion of therapeutic proteins ability; and
    (x) expression levels and functional levels of proteins and/or genes involved and needed in T cell functions (i)-(ix);
  (e) selecting at least one combination of molecules of (b) that induced in the contacted T cells a decreased expression and/or function of the PD-1 protein and/or the PD-1 gene compared to non-contacted cells of the same T cells sample, and optionally further induced in the contacted T cells one or more of; and optionally further induced in the contacted T cells one or more of: increased proliferation ability when cultured alone or cocultured with the cancerous cells; increased killing of cancerous cells; increased expression of CD3 zeta-chain; increased migration ability; increased adhesion ability; increased homing ability; increased penetration ability; increased secretion ability of at least one therapeutic protein; or increased expression or function of at least one protein or gene involved in T cell functions (i)-(ix); and (II) a therapeutic stage comprising:
  (a) providing a therapeutically effective amount of autologous T cells whose origin is the same as the sample T cells;
  (b) contacting the T cells with at least one combination of molecules selected in diagnostic stage (I)(e); and
  (c) administering the contacted second T cells of (II)(b) to the subject;

thereby performing person-specific adoptive neuroimmunotherapy of cancer in the subject.

11. The method of claim 10, wherein the T cells provided from the subject are exhausted T cells.

12. The method of claim 10, wherein the steps of the diagnostic stage are performed one or more times, at different time points and conditions.

13. A method of selecting a subject suitable for person-specific adoptive neuroimmunotherapy, the method comprising,
  (a) providing a T cells sample from the subject;
  (b) contacting ex vivo the T cells with one or more combinations of molecules selected from the group consisting of glutamate+neuropeptide Y; dopamine+neuropeptide Y; glutamate+dopamine; dopamine+GnRH-II; glutamate+GnRH-II; neuropeptide Y+GnRH-II; dopamine+glutamate+GnRH-I; dopamine+glutamate+GnRH-II; glutamate+calcitonin gene-related peptide (CGRP); GnRH-II+CGRP; and neuropeptide Y+CGRP (c) measuring the expression level and/or the functional level of the programmed cell death 1 (PD-1) protein and/or the PD-1 gene in the T cells;
  (d) testing and measuring in the T cells at least one T cell function selected from the group consisting of:
    i. the ability to proliferate when cultured alone;
    ii. the ability to proliferate when cocultured with cancerous cells, in response to the cancerous cells;
    iii. the ability to kill cancerous cells when cocultured with cancerous cells, in response to the cancerous cells
    (iv) the ability to kill disease-causing cells;
    (v) the ability to kill an infectious organism;
    (vi) the expression level of CD3 zeta-chain;
    vii. migration ability;
    viii. adhesion ability;
    ix. homing ability;
    ix. penetration ability;
    xi. secretion of therapeutic proteins ability; and
    xii expression levels and functional levels of proteins and genes involved and needed in T cell functions xi;
  (e) determining that the subject is suitable for person-specific adoptive neuroimmunotherapy when one or more combinations of (b) induced in the subject's contacted T cells a decrease in expression and/or function of PD-1 protein and/or PD-1 gene compared to non-contacted cells of the same T cells sample, and optionally further induced in the contacted T cells one or more of increased proliferation ability when cultured alone or cocultured with cancerous cells, in response to the cancerous cells; increased killing ability of cancerous cells when cocultured with the cancerous cells, in response to the cancerous cells; increased killing of disease causing cells; increased ability to kill an infectious organism; increased adhesion ability; increased homing ability; increased secretion ability of at least one therapeutic protein; or increased expression or function of at least one protein or gene involved in T cell functions i-xi.

* * * * *